United States Patent
Beyerl et al.

(10) Patent No.: US 10,673,305 B2
(45) Date of Patent: Jun. 2, 2020

(54) BRUSHLESS MOTOR FOR A POWER TOOL

(71) Applicant: MILWAUKEE ELECTRIC TOOL CORPORATION, Brookfield, WI (US)

(72) Inventors: Andrew T. Beyerl, Pewaukee, WI (US); Keith Boulanger, Kenosha, WI (US); Alex Huber, Brookfield, WI (US); William A. Elger, West Bend, WI (US); Jeffrey M. Wackwitz, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/525,964

(22) Filed: Jul. 30, 2019

(65) Prior Publication Data
US 2019/0356197 A1 Nov. 21, 2019

Related U.S. Application Data

(63) Continuation of application No. 16/242,536, filed on Jan. 8, 2019, now Pat. No. 10,432,065, which is a
(Continued)

(51) Int. Cl.
*H02K 7/14* (2006.01)
*B25F 5/00* (2006.01)
(Continued)

(52) U.S. Cl.
CPC ............... *H02K 7/145* (2013.01); *B25F 5/00* (2013.01); *B25F 5/006* (2013.01); *B25F 5/008* (2013.01);
(Continued)

(58) Field of Classification Search
CPC ...... H02K 5/225; H02K 11/215; H02K 29/08; H02K 5/04; H02K 5/161; H02K 7/083
(Continued)

(56) References Cited

U.S. PATENT DOCUMENTS 1,965,669 A 7/1934 Robb
2,819,417 A 1/1958 Glass
(Continued)

FOREIGN PATENT DOCUMENTS

CN 101582606 A 11/2009
CN 103812258 A 5/2014
(Continued)

OTHER PUBLICATIONS

Choi et al., "Shape Optimization of Pole Shoes in Interior Permanent Magnet Synchronous Machines," 9th World Congress on Structural and Multidisciplinary Optimization Jun. 13-17, 2011, Shizuoka, Japan (6 pages).
(Continued)

*Primary Examiner* — Thanh Lam
(74) *Attorney, Agent, or Firm* — Michael Best & Friedrich LLP

(57) ABSTRACT

A power tool including a housing, a controller within the housing, and a brushless motor within the housing and controlled by the controller. The brushless motor including a stator assembly including a stator core having stator laminations with an annular portion and inwardly extending stator teeth. The stator assembly defines a stator envelope in an axial direction extending between axial ends of stator end caps of the stator assembly. The brushless motor further includes a rotor assembly including a rotor core having rotor laminations and defining a central aperture that extends in the axial direction and that receives a shaft, and a position sensor board assembly including position sensors and configured to provide position information of the rotor core to the controller. The rotor assembly and the position sensor board assembly are provided at least partially within the stator envelope.

20 Claims, 57 Drawing Sheets

US 10,673,305 B2
Page 2

Related U.S. Application Data continuation of application No. 15/474,358, filed on Mar. 30, 2017, now Pat. No. 10,205,365.

(60) Provisional application No. 62/315,479, filed on Mar. 30, 2016.

(51) Int. Cl.
| | | |
|---|---|---|
| *H02K 29/08* | (2006.01) | |
| *H02K 1/18* | (2006.01) | |
| *H02K 5/15* | (2006.01) | |
| *H02K 7/08* | (2006.01) | |
| *H02K 11/21* | (2016.01) | |
| *H02K 5/16* | (2006.01) | |
| *H02K 7/116* | (2006.01) | |
| *H02K 21/14* | (2006.01) | |
| *H02K 9/06* | (2006.01) | |
| *H02K 11/215* | (2016.01) | |

(52) U.S. Cl.
CPC ............ *H02K 1/185* (2013.01); *H02K 1/187* (2013.01); *H02K 5/15* (2013.01); *H02K 5/161* (2013.01); *H02K 7/083* (2013.01); *H02K 7/086* (2013.01); *H02K 7/116* (2013.01); *H02K 11/21* (2016.01); *H02K 21/14* (2013.01); *H02K 29/08* (2013.01); *H02K 9/06* (2013.01); *H02K 11/215* (2016.01)

(58) Field of Classification Search
USPC .......................................................... 310/50
See application file for complete search history.

(56) References Cited

U.S. PATENT DOCUMENTS

| | | | |
|---|---|---|---|
| 2,922,902 A | 1/1960 | Hargreaves | |
| 2,996,632 A | 8/1961 | Ward, Jr. et al. | |
| 3,143,897 A | 8/1964 | Kohn | |
| 3,161,794 A | 12/1964 | Lindgren | |
| 3,518,471 A | 6/1970 | Wightman et al. | |
| 3,544,820 A | 12/1970 | Wightman | |
| 3,673,445 A | 6/1972 | Rutz | |
| 3,885,175 A | 5/1975 | Palloch | |
| 4,092,946 A | 6/1978 | Kappas | |
| 4,188,605 A | 2/1980 | Stout | |
| 4,244,099 A | 1/1981 | Haydon | |
| 4,245,870 A | 1/1981 | Punshon et al. | |
| 4,482,829 A | 11/1984 | Tardieu et al. | |
| 4,585,963 A | 4/1986 | Wilkinson, Jr. et al. | |
| 4,763,031 A | 8/1988 | Wang | |
| 4,893,041 A | 1/1990 | Snider et al. | |
| 4,952,830 A | 8/1990 | Shirakawa | |
| 4,964,210 A | 10/1990 | Takagi | |
| 4,982,124 A | 1/1991 | Cummings et al. | |
| 4,992,686 A | 2/1991 | Heine et al. | |
| RE33,813 E | 2/1992 | Von Der Heide et al. | |
| 5,113,104 A | 5/1992 | Blaettner et al. | |
| 5,345,129 A | 9/1994 | Molnar | |
| 5,394,043 A | 2/1995 | Hsia | |
| 5,532,535 A | 7/1996 | Oltmanns | |
| 5,731,651 A | 3/1998 | Hyodo | |
| 5,818,133 A | 10/1998 | Kershaw et al. | |
| 5,892,339 A | 4/1999 | Park et al. | |
| 5,939,807 A | 8/1999 | Patyk et al. | |
| 6,133,658 A | 10/2000 | Fisher et al. | |
| 6,153,957 A | 11/2000 | Takano | |
| 6,157,112 A | 12/2000 | Suzuki et al. | |
| 6,225,716 B1 * | 5/2001 | Sies ...................... | G01D 5/145 310/68 B |
| 6,300,739 B1 | 10/2001 | Ratliff et al. | |
| 6,462,443 B2 | 10/2002 | Horng | |
| 6,497,035 B1 | 12/2002 | Ratliff | |
| 6,700,278 B1 | 3/2004 | Ehrfeld et al. | |
| 6,809,442 B2 | 10/2004 | Kaneko et al. | |
| 6,815,853 B2 | 11/2004 | Koyama et al. | |
| 6,831,382 B1 | 12/2004 | Lyle et al. | |
| 6,849,976 B2 | 2/2005 | Yoon et al. | |
| 6,933,636 B2 | 8/2005 | Miya et al. | |
| 6,956,315 B2 | 10/2005 | Yoon et al. | |
| 7,012,346 B2 | 3/2006 | Hoffman et al. | |
| 7,112,902 B2 | 9/2006 | Schunk et al. | |
| 7,215,052 B2 | 5/2007 | Blase et al. | |
| 7,262,529 B2 | 8/2007 | Klappenbach et al. | |
| 7,411,326 B2 | 8/2008 | Achor et al. | |
| 7,430,796 B2 | 10/2008 | Baumgartner et al. | |
| 7,508,102 B2 | 3/2009 | Sugiyama et al. | |
| 7,560,838 B2 | 7/2009 | Van Der Woude | |
| 7,567,009 B2 | 7/2009 | Gu | |
| 7,586,660 B2 | 9/2009 | Itami | |
| 7,598,641 B2 | 10/2009 | Baumgartner et al. | |
| 7,687,966 B2 | 3/2010 | Takahashi et al. | |
| 7,696,660 B2 | 4/2010 | Koike et al. | |
| 7,739,788 B1 | 6/2010 | Prochazka et al. | |
| 7,755,231 B2 | 7/2010 | Kataoka et al. | |
| 7,786,635 B2 | 8/2010 | Gasser et al. | |
| 7,804,213 B2 | 9/2010 | Hoffman et al. | |
| 7,812,488 B2 | 10/2010 | Cosco et al. | |
| 7,827,673 B2 | 11/2010 | Kataoka et al. | |
| 7,847,449 B2 | 12/2010 | Oberle et al. | |
| 7,859,155 B2 | 12/2010 | Sahara et al. | |
| 7,863,788 B2 | 1/2011 | Konetzka et al. | |
| 7,977,835 B2 | 7/2011 | Simofi-Ilyes et al. | |
| 8,110,958 B2 | 2/2012 | Kalavsky et al. | |
| 8,129,872 B2 | 3/2012 | Hoffman et al. | |
| 8,141,231 B2 | 3/2012 | Wolfe, Jr. et al. | |
| 8,188,624 B2 | 5/2012 | Noh et al. | |
| 8,227,948 B1 | 7/2012 | Fox et al. | |
| 8,242,656 B1 | 8/2012 | Lin | |
| 8,314,523 B2 | 11/2012 | Lin | |
| 8,378,540 B2 | 2/2013 | Furukawa et al. | |
| 8,405,271 B2 | 3/2013 | Lee et al. | |
| 8,497,610 B2 | 7/2013 | Yao et al. | |
| 8,558,422 B2 | 10/2013 | Baumann et al. | |
| 8,581,452 B2 | 11/2013 | Roopnarine | |
| 8,629,592 B2 | 1/2014 | Johnson et al. | |
| 8,638,014 B2 | 1/2014 | Sears et al. | |
| 8,674,578 B2 | 3/2014 | Aono et al. | |
| 8,710,707 B2 | 4/2014 | Lau et al. | |
| 8,810,085 B2 | 8/2014 | Matsunaga et al. | |
| 8,894,291 B2 | 11/2014 | Neuhaus et al. | |
| 8,907,537 B2 | 12/2014 | Sekertzis et al. | |
| 8,970,076 B2 | 3/2015 | Isoda | |
| 9,048,699 B2 | 6/2015 | Omori et al. | |
| 9,054,561 B2 | 6/2015 | Villegas | |
| 9,225,223 B2 | 12/2015 | Bekavac et al. | |
| 9,318,932 B2 * | 4/2016 | Purohit .................. | H02K 3/522 |
| 9,397,535 B2 | 7/2016 | Yamaguchi et al. | |
| 9,422,779 B1 | 8/2016 | Bunch | |
| 9,450,471 B2 * | 9/2016 | Mergener .................. | B25F 5/00 |
| 9,461,515 B2 | 10/2016 | Furukawa et al. | |
| 9,787,159 B2 | 10/2017 | Beyerl | |
| 9,847,194 B2 * | 12/2017 | Ekstrom ................. | H01H 21/12 |
| 9,948,162 B2 | 4/2018 | Nagahama et al. | |
| 10,056,806 B2 | 8/2018 | Hatfield et al. | |
| 10,193,422 B2 | 1/2019 | Kouda et al. | |
| 10,205,365 B2 * | 2/2019 | Beyerl ................... | H02K 7/116 |
| 10,298,098 B2 | 5/2019 | Niwa | |
| 10,348,158 B2 | 7/2019 | Niwa et al. | |
| 10,432,045 B2 | 10/2019 | Hessenberger et al. | |
| 2001/0033742 A1 | 10/2001 | Weaver et al. | |
| 2002/0079767 A1 | 6/2002 | Ohishi et al. | |
| 2006/0071563 A1 | 4/2006 | Fujii | |
| 2006/0273679 A1 | 12/2006 | Iwase et al. | |
| 2007/0145839 A1 | 6/2007 | Kimura et al. | |
| 2007/0210658 A1 | 9/2007 | Terauchi et al. | |
| 2008/0048532 A1 | 2/2008 | Hsieh et al. | |
| 2008/0179975 A1 | 7/2008 | Kataoka et al. | |
| 2008/0211332 A1 | 9/2008 | Kataoka et al. | |
| 2008/0211356 A1 | 9/2008 | Kataoka et al. | |
| 2008/0265695 A1 | 10/2008 | Yoshida et al. | |
| 2009/0001843 A1 | 1/2009 | Enomoto et al. | |
| 2009/0121566 A1 | 5/2009 | Ishizeki et al. | |

(56) References Cited

U.S. PATENT DOCUMENTS

| | | |
|---|---|---|
| 2009/0189476 A1 | 7/2009 | Takizawa et al. |
| 2011/0016960 A1 | 1/2011 | Debrailly |
| 2011/0031835 A1 | 2/2011 | Chang et al. |
| 2011/0080062 A1 | 4/2011 | Noh et al. |
| 2012/0119627 A1 | 5/2012 | Lau et al. |
| 2012/0267967 A1 | 10/2012 | Trago et al. |
| 2012/0319508 A1 | 12/2012 | Oomori |
| 2012/0319543 A1 | 12/2012 | Adachi et al. |
| 2013/0062980 A1 | 3/2013 | Kuwahara et al. |
| 2013/0193801 A1 | 8/2013 | Schmid et al. |
| 2013/0207491 A1 | 8/2013 | Hatfield et al. |
| 2013/0270934 A1 | 10/2013 | Smith et al. |
| 2013/0313925 A1 | 11/2013 | Mergener et al. |
| 2014/0125158 A1 | 5/2014 | Hessenberger et al. |
| 2014/0131059 A1 | 5/2014 | Verbrugge et al. |
| 2014/0340014 A1 | 11/2014 | Daley |
| 2014/0346921 A1 | 11/2014 | Muschelknautz et al. |
| 2014/0361645 A1 | 12/2014 | Beyerl |
| 2015/0008803 A1 | 1/2015 | Furukawa et al. |
| 2015/0044076 A1 | 2/2015 | Huang et al. |
| 2015/0069864 A1 | 3/2015 | Nagahama et al. |
| 2015/0180307 A1 | 6/2015 | Lnuzuka |
| 2015/0200576 A1 | 7/2015 | Kinashi |
| 2015/0222152 A1 | 8/2015 | Yamada et al. |
| 2015/0226268 A1 | 8/2015 | Guhl et al. |
| 2015/0280516 A1 | 10/2015 | Ekstrom et al. |
| 2015/0295476 A1 | 10/2015 | Miyajima |
| 2015/0311769 A1 | 10/2015 | Sawada et al. |
| 2015/0318747 A1 | 11/2015 | Kamiyoshihara et al. |
| 2016/0149463 A1 | 5/2016 | Smith et al. |
| 2016/0149467 A1 | 5/2016 | Smith et al. |
| 2016/0149474 A1 | 5/2016 | Smith et al. |
| 2016/0181891 A1 | 6/2016 | Fogle et al. |
| 2016/0181892 A1 | 6/2016 | Purohit et al. |
| 2016/0354913 A1 | 12/2016 | Madineni et al. |
| 2016/0380510 A1 | 12/2016 | Niwa |
| 2017/0194846 A1 | 7/2017 | Tanimoto |
| 2017/0214292 A1 | 7/2017 | Nagahama |
| 2017/0294819 A1 | 10/2017 | Crosby et al. |
| 2017/0353085 A1 | 12/2017 | Kitamura et al. |
| 2018/0076676 A1 | 3/2018 | Chen et al. |
| 2018/0083510 A1 | 3/2018 | Purohit et al. |
| 2018/0152062 A1 | 5/2018 | Chang et al. |
| 2018/0241281 A1 | 8/2018 | Doan et al. |
| 2018/0342934 A1 | 11/2018 | Wei et al. |
| 2019/0001452 A1 | 1/2019 | Nagahama |
| 2019/0006909 A1 | 1/2019 | Nagahama |
| 2019/0291260 A1 | 9/2019 | Gainacopulos et al. |
| 2019/0296603 A1 | 9/2019 | Mahler et al. |

FOREIGN PATENT DOCUMENTS

| | | |
|---|---|---|
| CN | 104426263 A | 3/2015 |
| CN | 104426299 A | 3/2015 |
| CN | 104716806 A | 6/2015 |
| CN | 204886623 U | 12/2015 |
| CN | 204967585 U | 1/2016 |
| CN | 104588727 B | 5/2017 |
| CN | 104607695 B | 5/2017 |
| DE | 4039571 A1 | 6/1992 |
| DE | 102008025512 A1 | 12/2009 |
| EP | 1502792 A2 | 2/2005 |
| EP | 2133982 A2 | 12/2009 |
| EP | 2216885 B1 | 8/2010 |
| EP | 2288007 B1 | 2/2011 |
| EP | 2863061 A1 | 4/2015 |
| EP | 2153076 B1 | 7/2015 |
| EP | 2889107 A1 | 7/2015 |
| EP | 2160819 B1 | 9/2015 |
| GB | 2417615 A | 3/2006 |
| JP | H0684761 U | 12/1994 |
| JP | 2002209359 A | 7/2002 |
| JP | 2005229703 A | 8/2005 |
| JP | 2008236973 A | 10/2008 |
| JP | 2012029350 B2 | 2/2012 |
| JP | 5341737 B2 | 11/2013 |
| JP | 5931702 B2 | 6/2016 |
| WO | 2002081938 A1 | 10/2002 |
| WO | 2005020408 A2 | 3/2005 |
| WO | 2012010975 A2 | 1/2012 |
| WO | 2014048452 A1 | 4/2014 |
| WO | 2014048453 A1 | 4/2014 |
| WO | 2015037110 A1 | 3/2015 |
| WO | 2015127741 A1 | 9/2015 |
| WO | 2015150702 A2 | 10/2015 |
| WO | 2015182410 A1 | 12/2015 |
| WO | 2015000475 A2 | 1/2016 |
| WO | 2018198671 A1 | 11/2018 |
| WO | 2018180085 A1 | 6/2019 |
| WO | 2019208106 A1 | 10/2019 |

OTHER PUBLICATIONS

International Search Report and Written Opinion for Application No. PCTUS2017025010 dated Jun. 5, 2017 (9 pages).

Wang et al., "Design issues of an IPM Motor for EPS," COMPEL: The International Journal for Computation and Mathematics in Electrical and Electronic Engineering, vol. 31, Issue 1, 2011, pp. 71-87.

Australian Patent Office Action for Application No. 2017240597 dated Oct. 19, 2018, 6 pages.

Chinese Patent Office Action for Application No. 201480021806.0 dated May 7, 2019, 5 pages.

European Patent Office Search Report for Application No. 17776646.6 dated Feb. 15, 2019, 12 pages.

Australian Patent Office Examination Report for Application No. 2017240597 dated Mar. 12, 2019, 5 pages.

Examination Report for European Patent Application No. 17776646.6, dated Nov. 20, 2019 (6 pages).

* cited by examiner

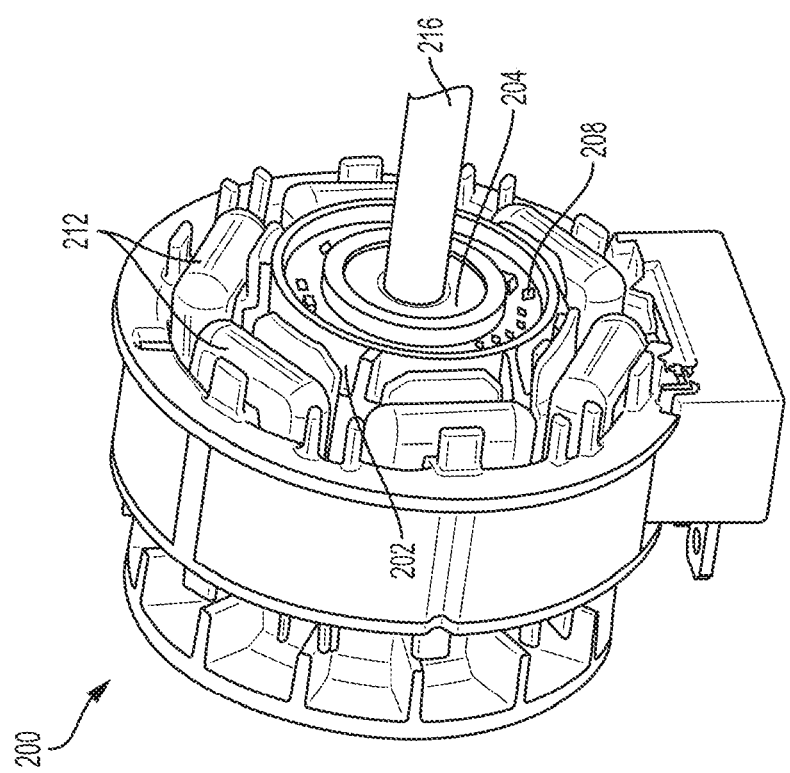
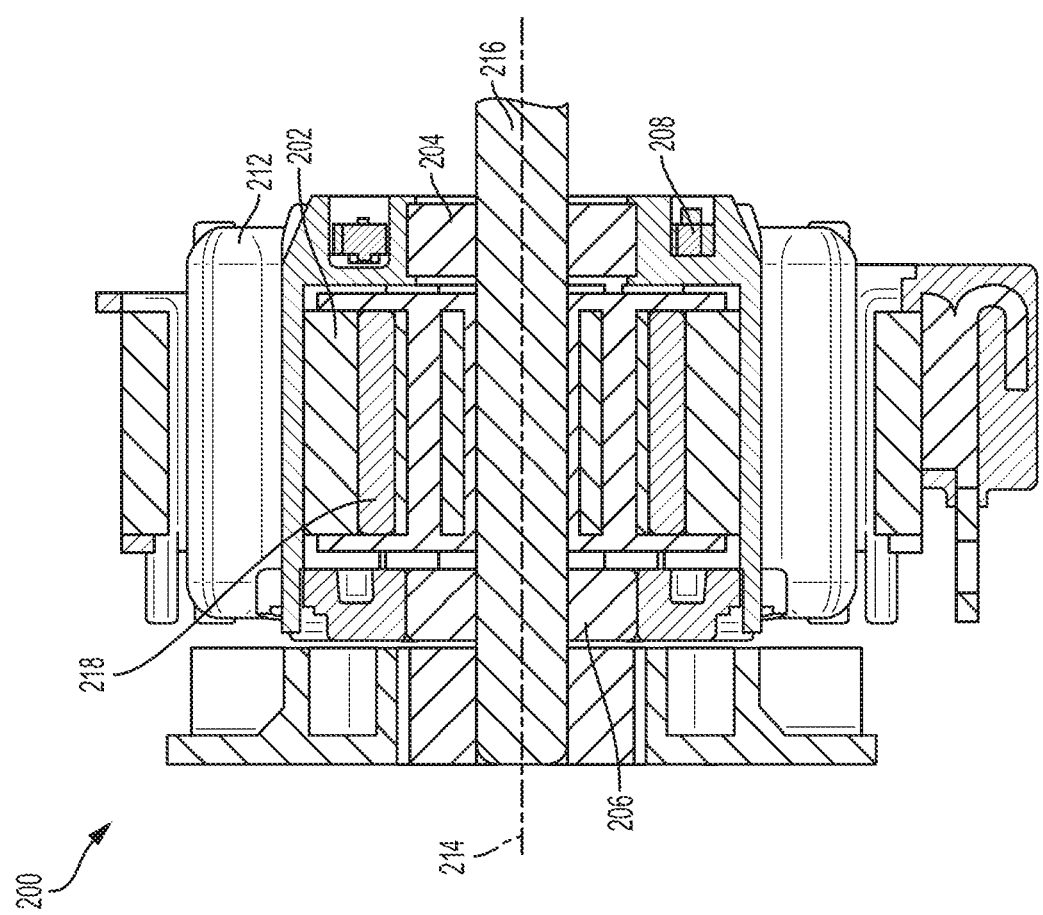
FIG. 4B
FIG. 4A

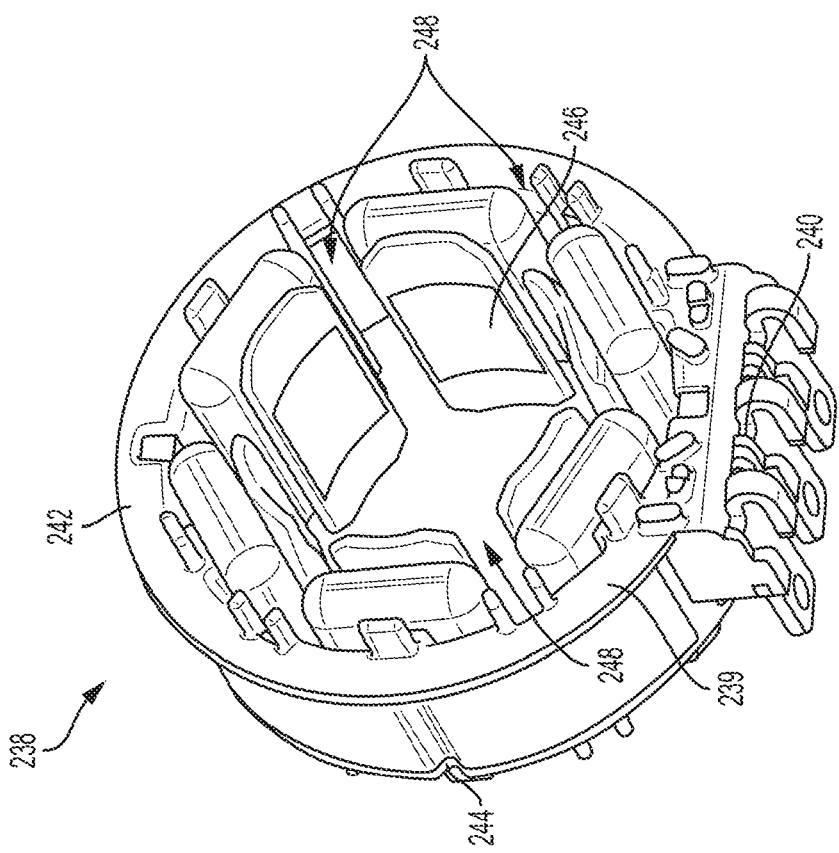
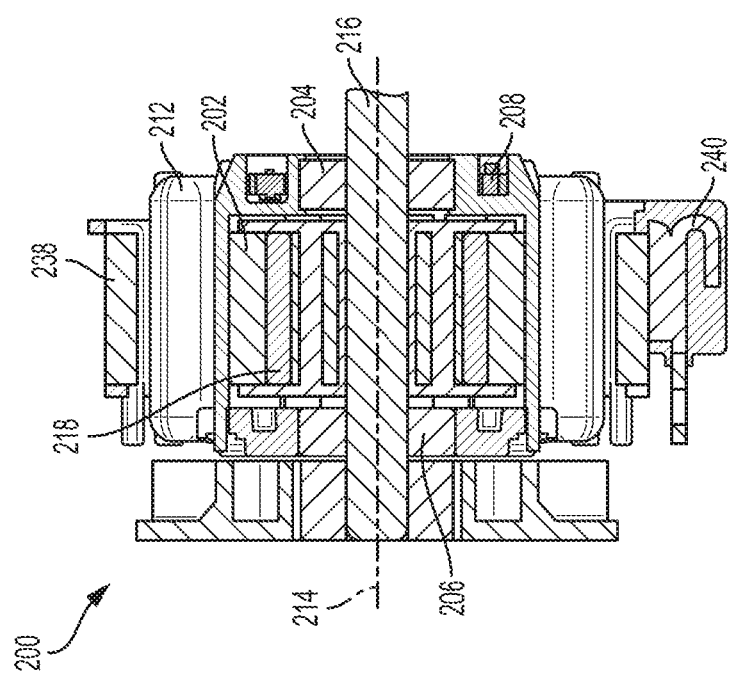
FIG. 9B
FIG. 9A

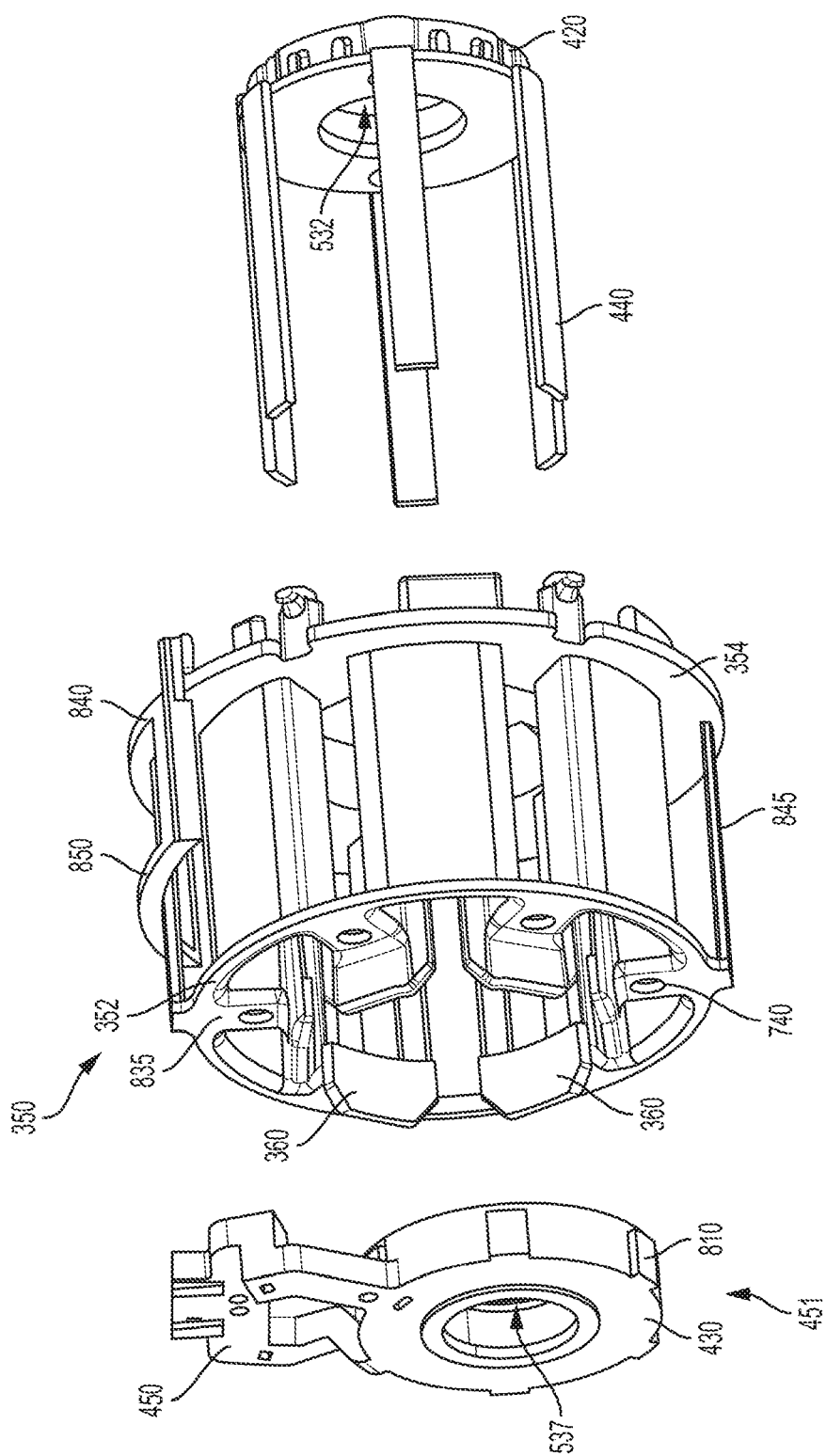

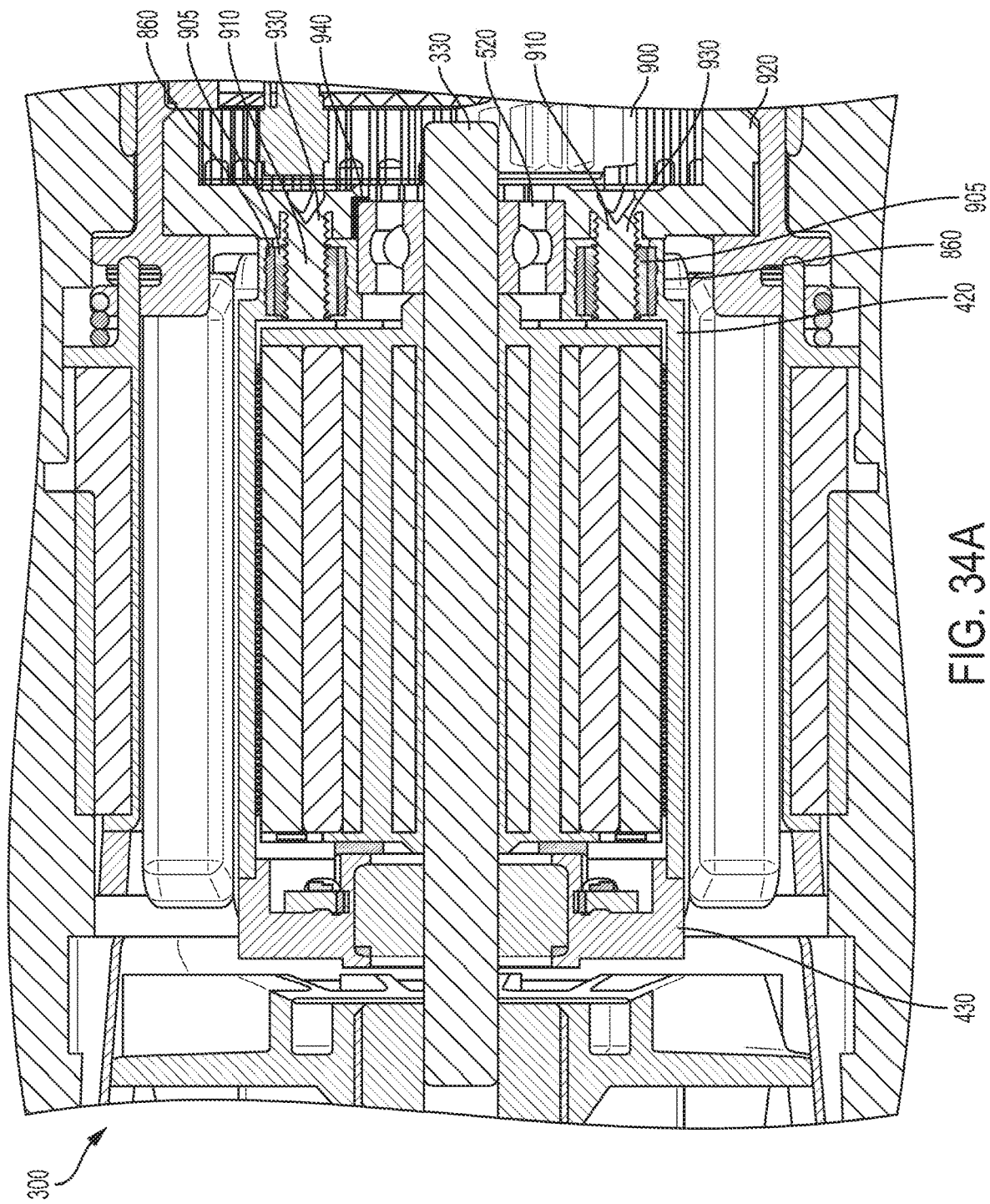

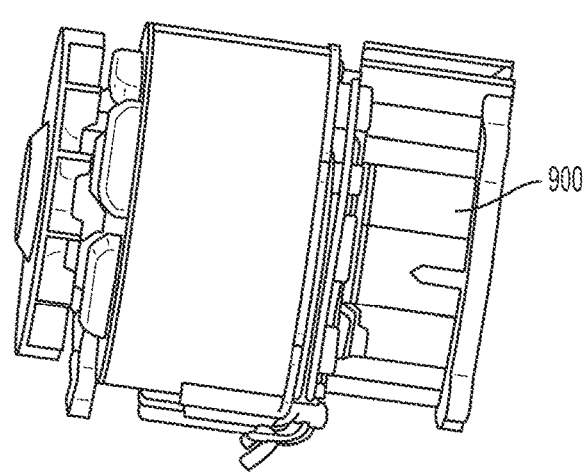
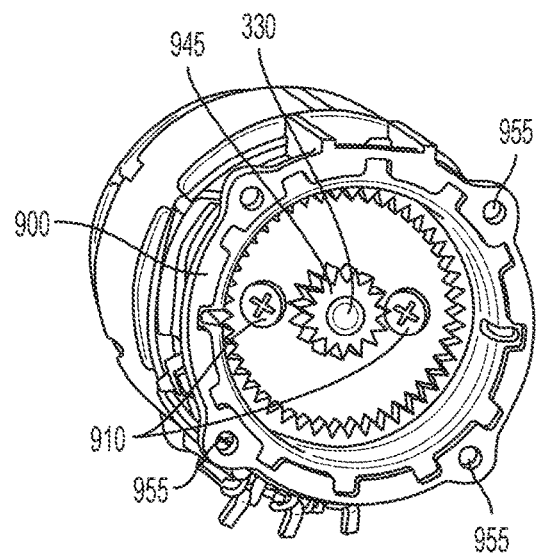
FIG. 35A      FIG. 35B
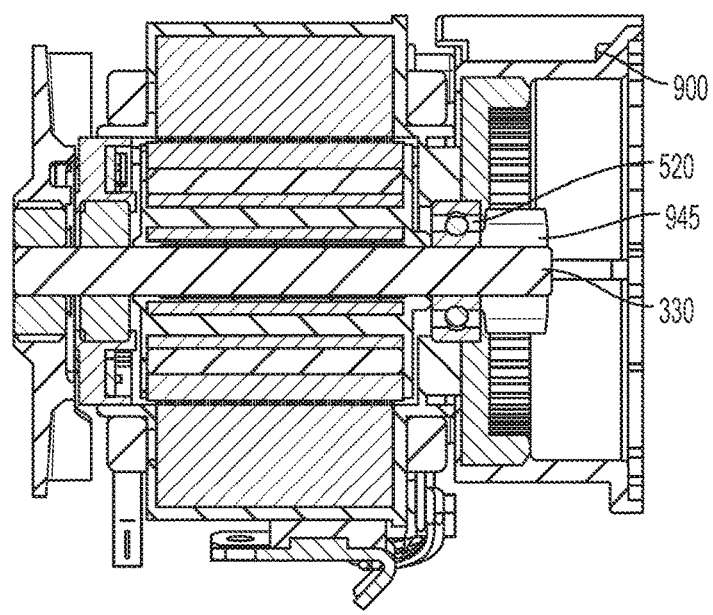
FIG. 35C

BRUSHLESS MOTOR FOR A POWER TOOL

RELATED APPLICATION

This application is a continuation of U.S. patent application Ser. No. 16/242,536, filed Jan. 8, 2019, now U.S. Pat. No. 10,432,065, which is a continuation of U.S. patent application Ser. No. 15/474,358, filed Mar. 30, 2017, now U.S. Pat. No. 10,205,365, which claims priority to U.S. Provisional Patent Application No. 62/315,479, filed on Mar. 30, 2016, the entire contents of all of which are hereby incorporated by reference.

FIELD OF THE INVENTION

The present invention relates to a brushless motor for a power tool.

BACKGROUND

Power tools generally include a motor connected to a power source to power the tool. One such motor is a brushed direct current (DC) motor. In brushed DC motors, motor brushes make and break electrical connection to the motor due to rotation of the rotor. Conventionally, brushed DC motors were used in power tools for their relative ease of manufacture and low cost. However, brushed DC motors have several drawbacks when used in power tools. One drawback of brushed DC motors is that the brushes eventually wear out reducing the longevity of the power tool. Further, because the brushes are making and breaking electrical connection, there may be sparks and electrical noise within the power tool. A brushless DC motor is another type of motor used in power tools. A brushless DC motor uses electronically controlled switches to selectively apply power to coils of a motor to drive a rotor, rather than brushes.

SUMMARY

Embodiments of the invention are directed to brushless DC motors for a power tool and to power tools incorporating such brushless DC motors. In one embodiment, a power tool is provided including a housing, a controller within the housing; and a brushless motor within the housing and controlled by the controller. The brushless motor includes a stator assembly and a rotor assembly. The stator assembly includes a stator core having stator laminations with an annular portion and inwardly extending stator teeth. The rotor assembly includes a rotor core having rotor laminations and defining a central aperture that receives an output shaft. The rotor assembly further includes a rotor end cap on a first side of the rotor core having a bearing holder and defining a channel, wherein the channel is open on a side of the rotor end cap facing the rotor core. The brushless motor further includes a bearing provided in the bearing holder that couples the rotor end cap to the output shaft, and a position sensor board assembly provided in the channel of the rotor end cap and configured to provide position information of the rotor core to the controller.

In another embodiment, a brushless direct current motor is provided including a stator assembly, a rotor assembly, a bearing, and a position sensor board assembly. The stator assembly includes a stator core having stator laminations with an annular portion and inwardly extending stator teeth. The rotor assembly includes a rotor core having rotor laminations and defining a central aperture that receives an output shaft. The rotor assembly further includes a rotor end cap on a first side of the rotor core having a bearing holder and defining a channel, wherein the channel is open on a side of the rotor end cap facing the rotor core. The bearing is provided in the bearing holder that couples the rotor end cap to the output shaft. The position sensor board assembly is provided in the channel of the rotor end cap and is configured to provide position information of the rotor core to a motor controller.

In another embodiment, a power tool is provided including a housing, a controller within the housing, and a brushless motor within the housing and controlled by the controller. The brushless motor includes a stator assembly a rotor assembly, and a position sensor board assembly. The stator assembly includes a stator core having stator laminations with an annular portion and inwardly extending stator teeth. The stator assembly defines a stator envelope in an axial direction extending between axial ends of stator end caps of the stator assembly. The rotor assembly includes a rotor core having rotor laminations and defining a central aperture that extends in the axial direction and that receives an output shaft. The rotor assembly further includes a front rotor end cap provided on a first side of the rotor core and a rear rotor end cap provided on a second side of the rotor core. The position sensor board assembly includes position sensors and is configured to provide position information of the rotor core to the controller. The rotor assembly and the position sensor board assembly are provided at least partially within the stator envelope.

In another embodiment, a power tool is provided including a housing; a controller within the housing; and a brushless motor within the housing and controlled by the controller. The brushless motor includes a stator assembly including a stator core having a predetermined number of stator laminations, the stator laminations defining a stack length in the axial direction. The brushless motor further includes a front bearing and a rear bearing. The front bearing and the rear bearing define a bearing-to-bearing length in the axial direction between axial ends of the front bearing and the rear bearing. A difference between the bearing-to-bearing length and the stack length is less than 27.5 millimeters.

In some embodiments, the difference between the bearing-to-bearing length and the stack length is greater than 25.5 millimeters. In some embodiments, the brushless motor further includes a position sensor board assembly, wherein the position sensor board assembly and the rear bearing define a bearing-to-board length in the axial direction between axial ends of the rear bearing and the position sensor board assembly. A difference between the bearing-to-board length and the stack length is less than 20.5 millimeters. In some embodiments, the brushless motor has at least partially within the bearing-to-bearing length: a rotor assembly, a fan, and a position board assembly. The rotor assembly includes a rotor core having rotor laminations and defining a central aperture that extends in the axial direction and that receives an output shaft, the output shaft cooperating with the front bearing and the rear bearing to enable the rotor core to rotate;

In another embodiment, a power tool is provided including a housing; a controller within the housing; and a brushless motor within the housing and controlled by the controller. The brushless motor includes a stator assembly including a stator core having a predetermined number of stator laminations, the stator laminations defining a stack length in the axial direction. The brushless motor further includes a rotor assembly including a rotor core having rotor laminations and defining a central aperture that extends in the axial direction and that receives an output shaft. The rotor assembly further includes a front rotor end cap provided on a first side of the rotor core; and a rear rotor end cap provided on a second side of the rotor core having a rear bearing holder. The brushless motor further includes a front bearing and a rear bearing. The rear bearing is provided in the rear bearing holder. The front bearing and the rear bearing holder define a bearing-to-bearing length in the axial direction between axial ends of the front bearing and the rear bearing holder, wherein a difference between the bearing-to-bearing length and the stack length is less than 24 millimeters.

In some embodiments, the brushless motor has at least partially within the bearing-to-bearing length: the rotor assembly; a fan; and a position sensor board assembly positioned in a channel of the rear rotor end cap.

In another embodiment, a power tool is provided including a housing, a controller within the housing, and a brushless motor within the housing and controlled by the controller. The brushless motor includes a stator assembly and a rotor assembly. The stator assembly includes a stator core having a predetermined number of stator laminations, the stator laminations defining a stack length in the axial direction. The rotor assembly includes a rotor core having rotor laminations and defining a central aperture that extends in the axial direction and that receives an output shaft. The rotor assembly further includes a front rotor end cap provided on a first side of the rotor core having a front bearing holder; and a rear rotor end cap provided on a second side of the rotor core. The brushless motor further includes a fan, a front bearing, and a rear bearing. The front bearing is provided in the front bearing holder. The front bearing holder and the fan define a bearing-to-fan length in the axial direction between axial ends of the front bearing holder and the fan, wherein a difference between the bearing-to-fan length and the stack length is less than 23.5 millimeters.

In some embodiments, the fan and a front face of the front rotor end cap define a fan-to-end cap length in the axial direction between axial ends of the fan and the front face, wherein a difference between the fan-to-end cap length and the stack length is less than 20.5 millimeters. In some embodiments, the brushless motor has at least partially within the bearing-to-fan length: the rotor assembly; the front bearing; the rear bearing; the fan; and a position sensor board assembly positioned in a channel of the rear rotor end cap.

In another embodiment, a power tool is provided including a housing, a controller within the housing; and a brushless motor within the housing and controlled by the controller. The brushless motor includes a stator assembly and a rotor assembly. The stator assembly includes a stator core having stator laminations with an annular portion and inwardly extending stator teeth. The rotor assembly includes a rotor core having rotor laminations and defining a central aperture that receives an output shaft. The rotor assembly further includes a rotor frame including a first face portion on a first side of the rotor core, a magnet housing portion extending through the rotor core, and an end portion on a second side of the rotor core opposite the first side. The end portion includes a fan configured to generate an airflow when the rotor is driven.

In some embodiments, the rotor frame is monolithic and is formed of hardened resin. In some embodiments, the end portion further includes a second face portion, the rotor laminations form a rotor stack having a magnet aperture, and the first face portion and the second face portion abut opposite axial ends of the rotor stack and retain a magnet within the magnet aperture.

Another embodiment provides a power tool including a housing and a brushless direct current (DC) motor within the housing and electrically connected to a power source. The brushless DC motor includes a stator forming a stator envelope, and a rotor recessed within the stator envelope. The brushless DC motor also includes a first bearing recessed within the stator envelope and at a fan end of the brushless DC motor and a second bearing recessed within the stator envelope and at a tool end of the brushless DC motor. The brushless DC motor further includes a Hall sensor printed circuit board (PCB) recessed within the stator envelope. In some examples, the first and second bearing are partially within the stator envelope and partially outside of the stator envelope. In some examples, the rotor and the position sensor board assembly are fully within the stator envelope.

Another embodiment provides a power tool including a housing and a brushless direct current (DC) motor within the housing and electrically connected to a power source. The brushless DC motor includes a stator having a plurality of teeth and stator windings around the plurality of teeth. The brushless DC motor also includes a plurality of gaps between the plurality of teeth and a rotor enclosure having a plurality of legs that seal the plurality of gaps. The brushless DC motor includes a sealed air-gap formed in part by the legs and the stator teeth. In some examples, the sealed air-gap is further formed by a front end cap of the rotor enclosure, a rear end cap of the rotor enclosure, a front bearing within the front end cap, a rear bearing within the rear end cap, and the shaft. In some examples, a rotor is within the sealed air-gap and rotates therein. In some examples, the position sensor board assembly is within the sealed air-gap. In some examples, the position sensor board assembly is located within a channel of the rear end cap on a motor-facing side of the rear end-cap.

Another embodiment provides a power tool including a housing and a brushless direct current (DC) motor within the housing and electrically connected to a power source. The brushless DC motor includes a front end cap of a rotor enclosure and a bearing recessed within the front end cap. The front end cap includes mounting bosses to which a gear case is mounted. The bearing extends axially out from the front end cap and is received by an opening of the gear case, such that the bearing is shared by the brushless DC motor and the gear case. The bearing and front end cap are further located within a stator envelope of the brushless DC motor.

Another embodiment provides a power tool including a housing and a brushless direct current (DC) motor within the housing and electrically connected to a power source. The brushless DC motor includes a Hall sensor recessed within a stator envelope of the brushless DC motor, the Hall sensor located at a rear end of the brushless DC motor and around a bearing of the brushless DC motor. In some examples, the brushless DC motor includes a rotor enclosure including a rear end cap, and the rear end cap includes an opening that receives the bearing. The rear end cap further includes an annular channel radially outward of the opening, the annular channel receiving a Hall sensor circuit board on which the Hall sensor is located. In some examples, the annular channel is located on a motor-facing side of the rear end cap.

BRIEF DESCRIPTION OF THE DRAWINGS

FIGS. 4A and 4B illustrate a recessed hall-sensor board mounting of the motor.

FIGS. 9A and 9B illustrate the motor with an improved wire routing and support feature.

FIG. 31B is an exploded view of stator end cap and rotor end caps of the motor of FIG. 25.

FIGS. 34A, 34B, and 34C are cross sectional views of the motor of FIG. 25 including a connection to a gear case.

FIGS. 35A, 35B, and 35C illustrate a connection between the motor and a gear case.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Use herein of the terms about, approximately, and substantially with respect to a value may, in some embodiments, refer to within one, two, five, or ten percent of value.

Figure 1:
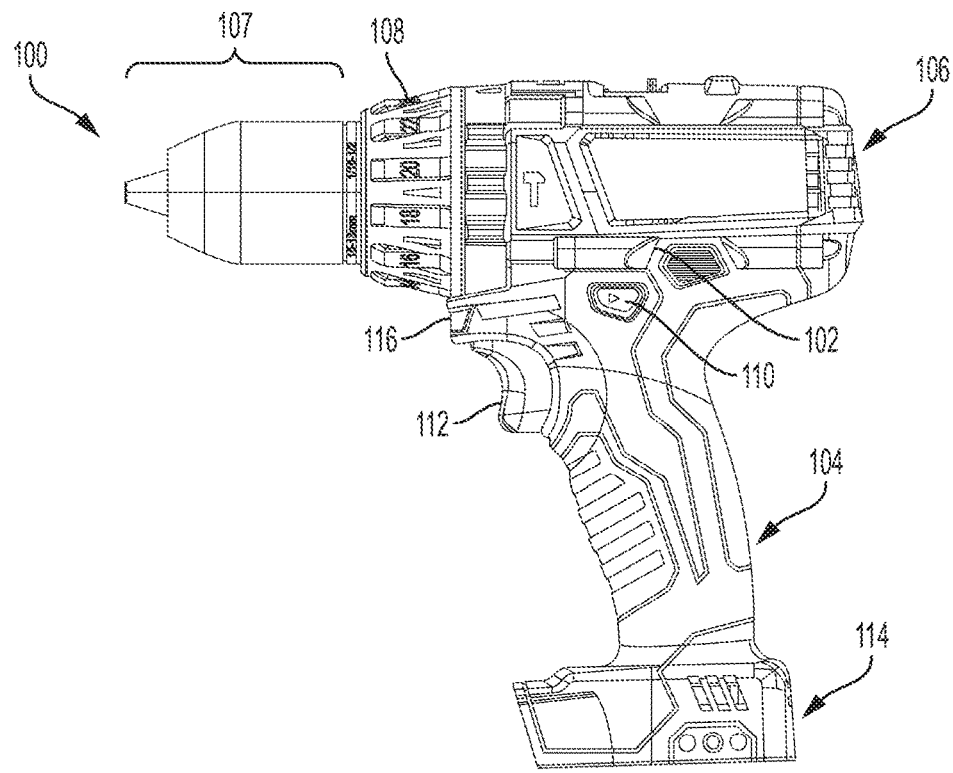
FIG. 1 illustrates a power tool incorporating a brushless DC motor.

FIG. 1 illustrates a power tool 100 incorporating a brushless direct current (DC) motor. In a brushless motor power tool, such as power tool 100, switching elements are selectively enabled and disabled by control signals from a controller to selectively apply power from a power source (e.g., battery pack) to drive a brushless motor. The power tool 100 is a brushless hammer drill having a housing 102 with a handle portion 104 and motor housing portion 106. The power tool 100 further includes an output unit 107, torque setting dial 108, forward/reverse selector 110, trigger 112, battery interface 114, and light 116. Although FIG. 1 illustrates a hammer drill, in some embodiments, the motors described herein are incorporated into other types of power tools including drills/drivers, impact drivers, impact wrenches, circular saws, reciprocating saws, string trimmers, leaf blowers, vacuums, and the like.

Figure 2:
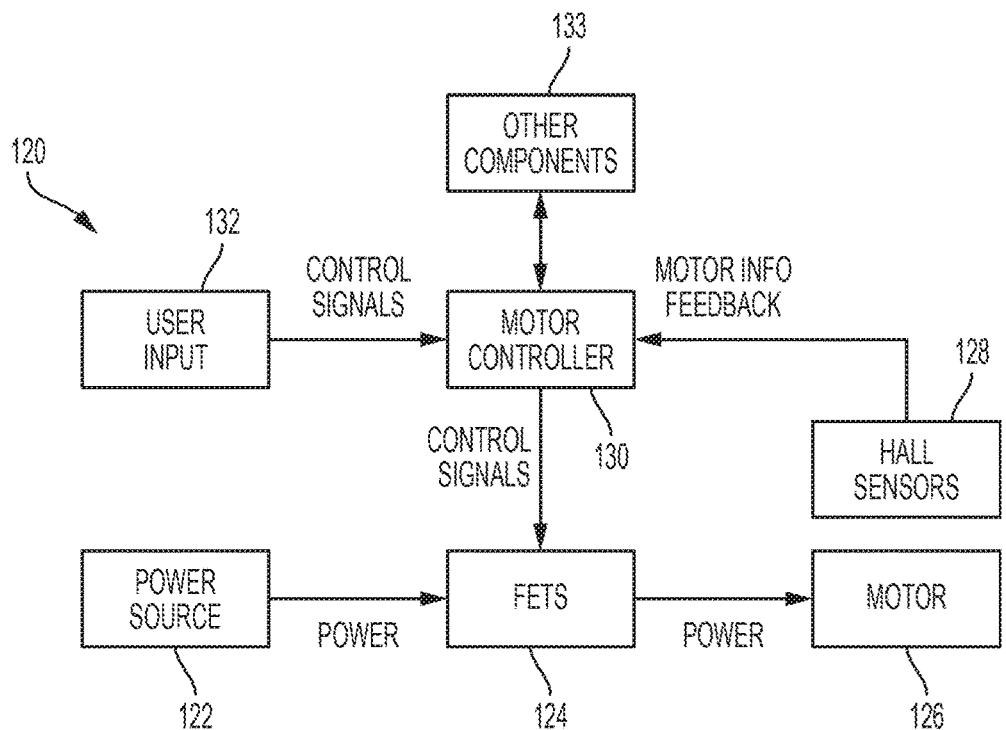
FIG. 2 illustrates a block diagram of a brushless power tool, such as illustrated in FIG. 1.
Figure 3C:
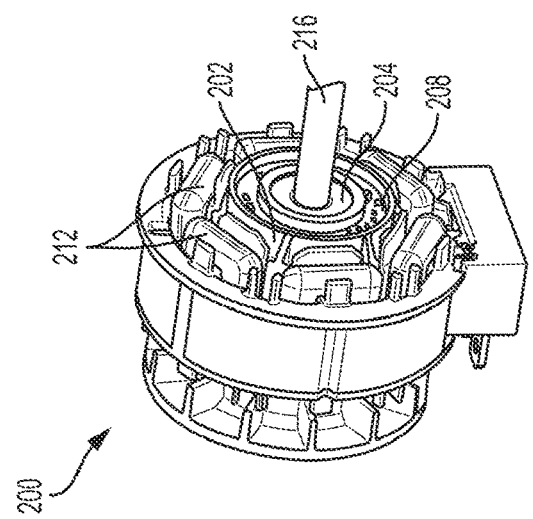
FIGS. 3A, 3B, and 3C illustrate a self-contained rotor and internal bearing of a brushless DC motor incorporated in the power tool of FIG. 1.
Figure 3B:
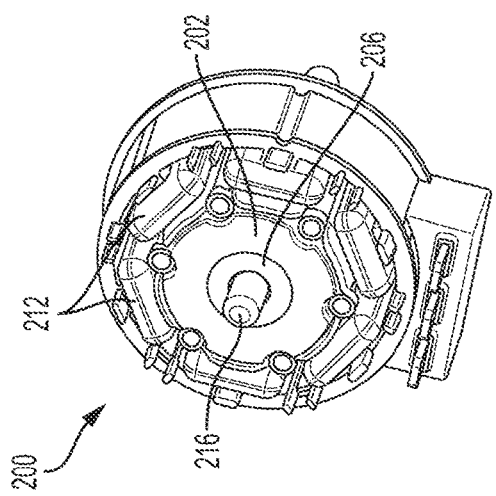
Figure 3A:
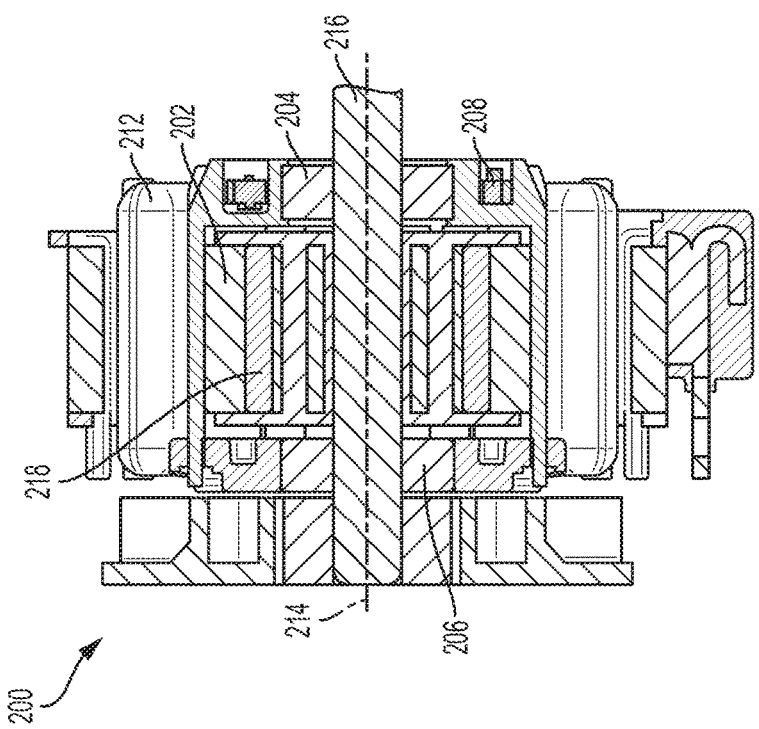

FIG. 2 illustrates a simplified block diagram 120 of the brushless power tool 100, which includes a power source 122, Field Effect Transistors (FETs) 124, a motor 126, Hall sensors 128, a motor controller 130, user input 132, and other components 133 (battery pack fuel gauge, work lights (LEDs), current/voltage sensors, etc.). The power source 122 provides DC power to the various components of the power tool 100 and may be a power tool battery pack that is rechargeable and uses, for instance, lithium ion cell technology. In some instances, the power source 122 may receive AC power (e.g., 120V/60 Hz) from a tool plug that is coupled to a standard wall outlet, and then filter, condition, and rectify the received power to output DC power. Each Hall sensor 128 outputs motor feedback information, such as an indication (e.g., a pulse) when a magnet of the rotor rotates across the face of that Hall sensor. Based on the motor feedback information from the Hall sensors 128, the motor controller 130 can determine the position, velocity, and acceleration of the rotor. The motor controller 130 also receives user controls from user input 132, such as by depressing the trigger 112 or shifting the forward/reverse selector 110. In response to the motor feedback information and user controls, the motor controller 130 transmits control signals to control the FETs 124 to drive the motor 126. By selectively enabling and disabling the FETs 124, power from the power source 122 is selectively applied to stator coils of the motor 126 to cause rotation of a rotor. Although not shown, the motor controller 130 and other components of the power tool 100 are electrically coupled to the power source 122 such that the power source 122 provides power thereto.

FIGS. 3A-24 illustrate a motor 200 or various portions thereof. The motor 200 is a brushless motor that serves as the motor 126 in the power tool 100. As noted, the motor 200 may also be used with other power tools, such as drills/ drivers, impact drivers, and other types of power tools. As will be described in detail below, the motor 200 includes a reduced axial length, a sealed air gap, improved mounting to gear case, and improved wire routing and support.

Figure 5:
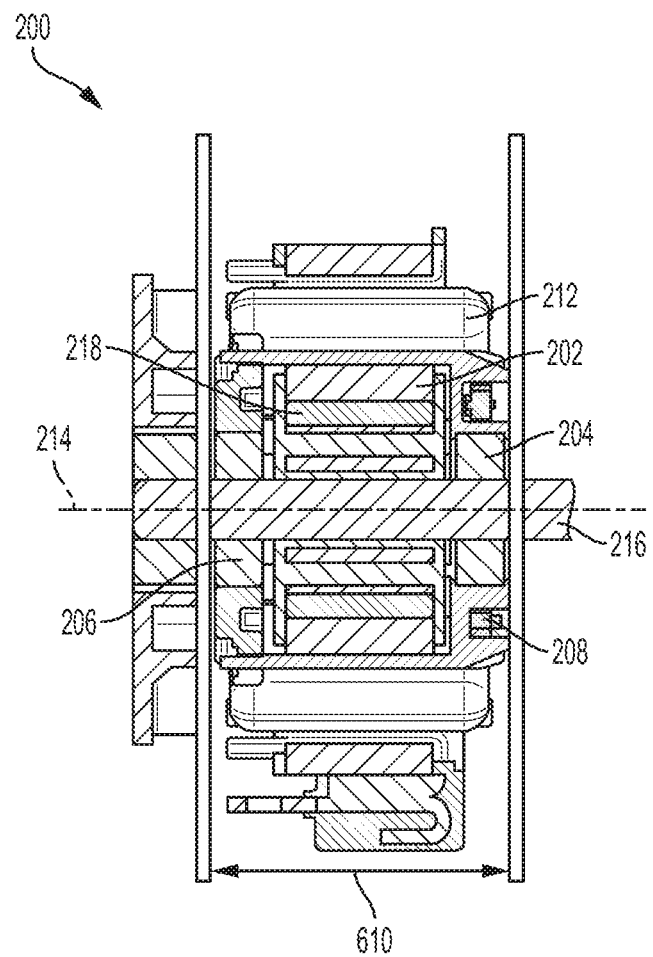
FIG. 5 illustrates a cross section of the motor.

As illustrated in FIGS. 3A-6, the motor 200 includes features enabling a reduced axial length, which allows for a smaller tool housing and/or additional space for other components within a tool housing. The motor 200 includes a rotor 202, a front bearing 204, a rear bearing 206 (collectively referred to as the bearings 204, 206), a position sensor board assembly 208 within a stator envelope 210 of the motor 200, and a shaft 216. The stator envelope 210, as shown in FIG. 5, is the space between the ends of the stator coils 212 along the length of the rotor axis 214. Recessing the rotor 202, the bearings 204, 206, and the position sensor board assembly 208 within the stator envelope 210 allows a more compact motor 200 in the axial direction. Herein, the axial direction refers to the direction extending along the length (i.e., along the central axis) of the shaft 216 of the motor 200, while the radial direction refers to the direction extending radially from the length (i.e., the central axis) of the shaft 216. The rotor 202 is illustrated as being entirely within the stator envelope 210. In some embodiments, the bearings 204, 206 and the position sensor board assembly 208 are also entirely within the stator envelope 210. In some embodiments, the position sensor board assembly 208 is entirely within the stator envelope 210, but one or both of the bearings 204, 206 is partially inside the stator envelope 210 and partially outside the stator envelope 210. In some embodiments, the bearings 204, 206 are entirely within the stator envelope 210, but the position sensor board assembly 208 is partially inside and partially outside the stator envelope 210. In some embodiments, the position sensor board assembly 208 and one bearing (e.g., either the front bearing 204 or the rear bearing 206) are entirely within the stator envelope 210, while the other bearing (e.g., the other of the front bearing 204 or the rear bearing 206) is partially inside and partially outside the stator envelope 210.

Figure 6:
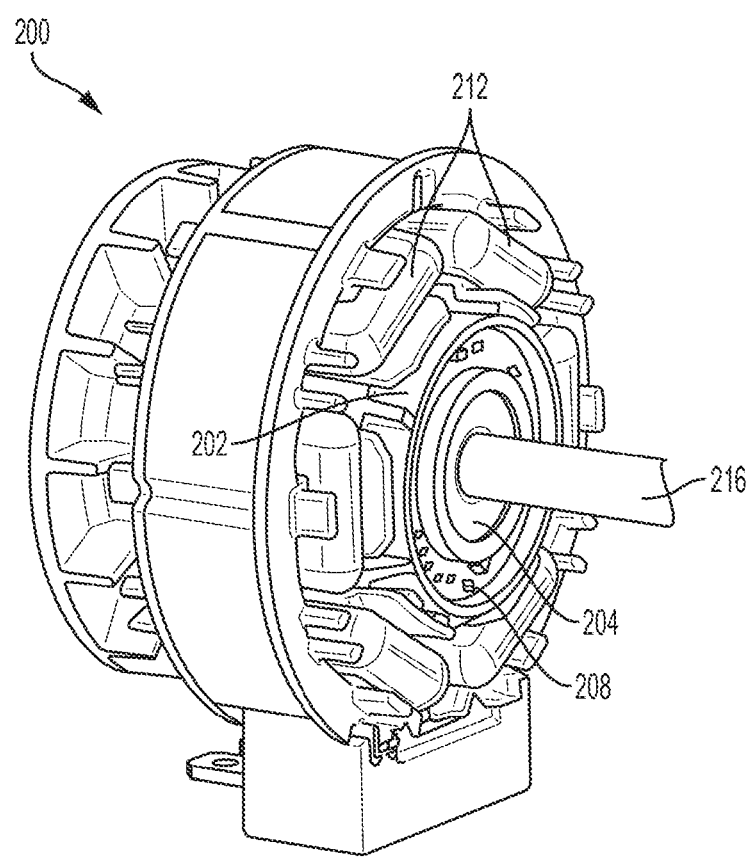
FIG. 6 illustrates a perspective view of the motor.
Figure 7:
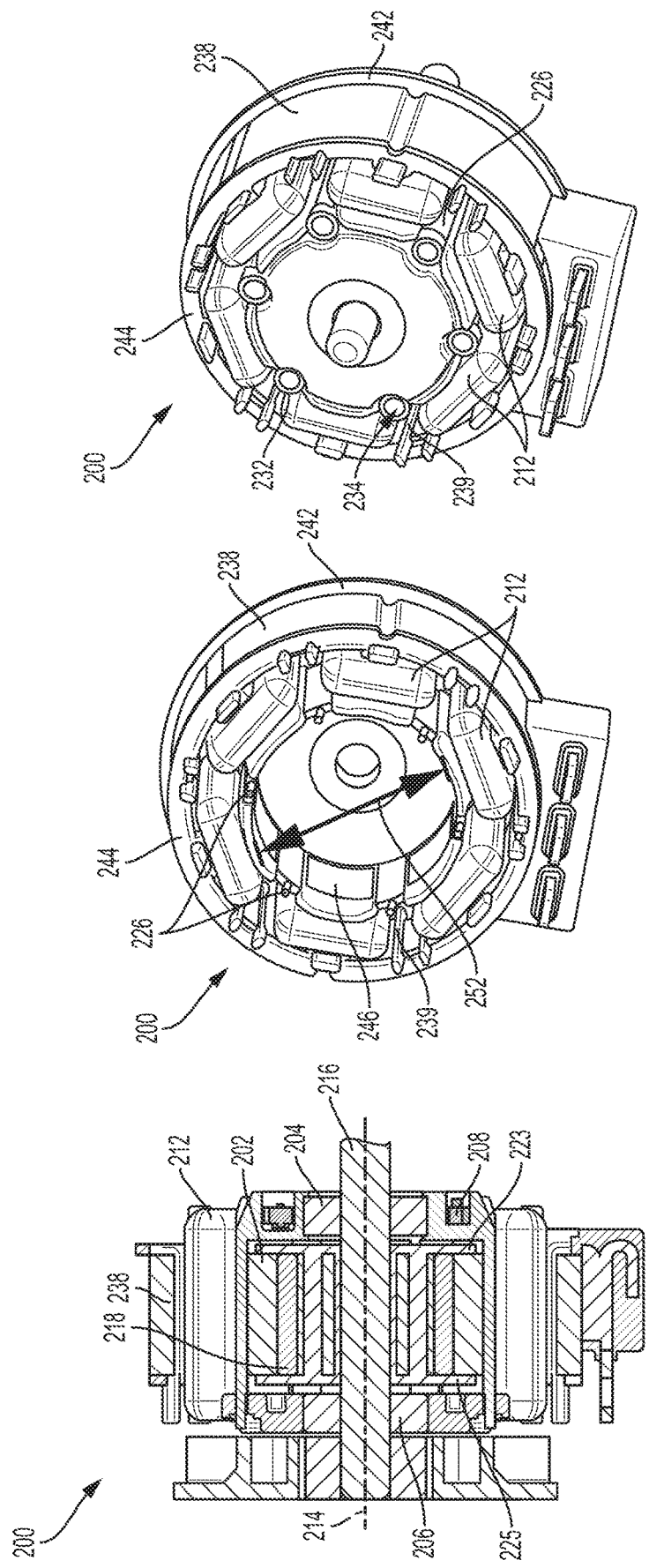
FIGS. 7A, 7B, and 7C illustrate a sealed air-gap of the motor.

The position sensor board assembly 208 includes the Hall sensors 128 (or other position sensors) (see FIG. 2) to detect one or more of the rotational position, velocity, and acceleration of the motor 200. The position sensor board assembly 208 is electrically coupled to a control PCB within the tool (not shown) having the motor controller 130. As shown in FIGS. 4B, 5, and 6, the position sensor board assembly 208 includes a through-hole that receives both the motor shaft/spindle 216 and one of the motor bearings (e.g., the front bearing 204). By recessing the position sensor board assembly 208 within the stator envelope 210, rotor magnets 218 are brought into closer proximity with the Hall sensors 128, which improves detection of rotor position without extending the rotor magnets 218 and/or a rotor core 203 (see FIGS. 12-14) axially.

Figure 12:
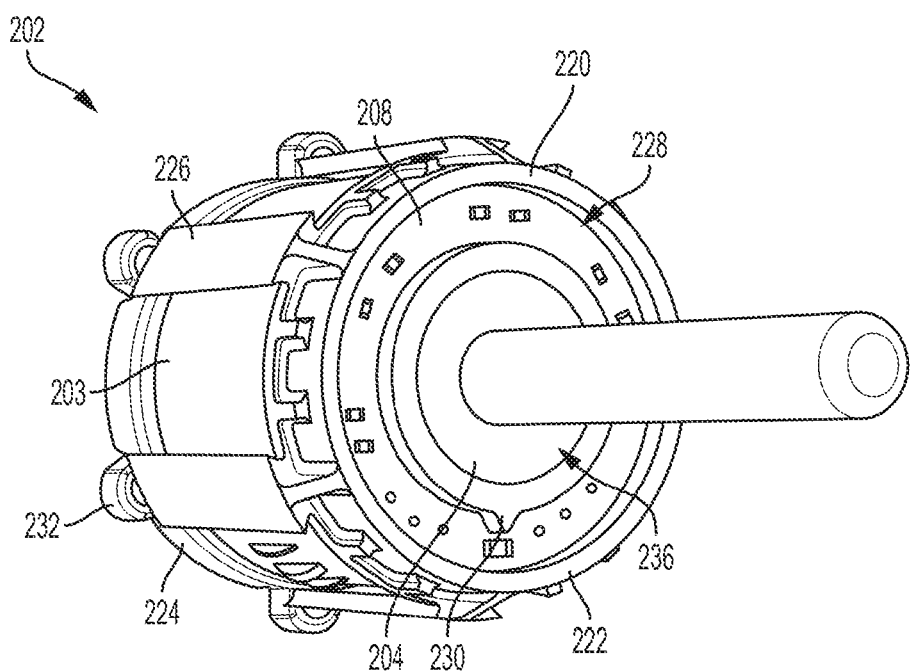
FIG. 12 illustrates the motor having a rotor and having the stator removed.
Figure 13:
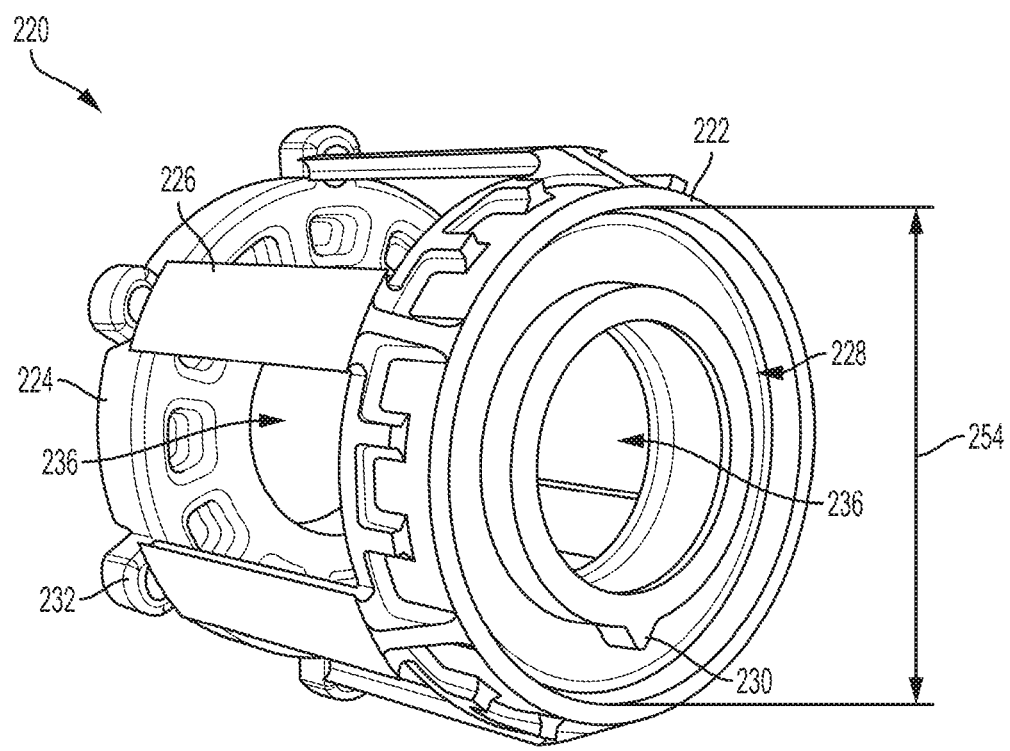
FIGS. 13 and 14 illustrate a rotor enclosure of the motor with the rotor removed.
Figure 14:
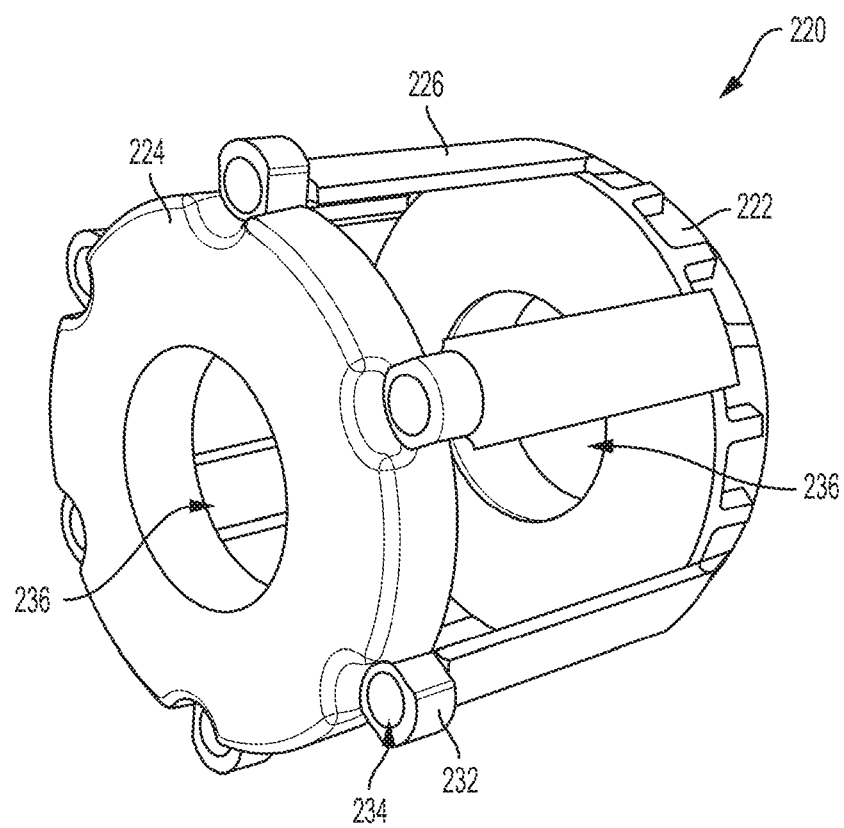

The rotor 202 is contained within a rotor enclosure 220 shown in FIGS. 12-14. The rotor enclosure 220 includes a rotor core 203 having rotor laminations stacked together, a front rotor end cap 222, and a rear rotor end cap 224 (the front rotor end cap 222 and the rear rotor end cap 224 collectively referred to as rotor end caps 222, 224) with several legs 226 extending axially between the rotor end caps 222, 224. The front rotor end cap 222 includes an annular channel 228 to receive the annular position sensor board assembly 208. The channel 228 provides a simplified means of potting the position sensor board assembly 208 and improves ingress protection of the position sensor board assembly 208. The channel 228 may also be referred to as a recess or groove. The channel 228 also includes a locator 230 to ensure proper positioning of the position sensor board assembly 208 within the channel 228. In the illustrated embodiment, the locator 230 is a projection that engages and is received by a corresponding indent on the position sensor board assembly 208. The front rotor end cap 222 is integrally formed with the legs 226. The rear rotor end cap 224 includes protrusions 232, one for each leg 226, along the outer circumference. Each protrusion 232 includes a through-hole 234 for receiving an end of a corresponding leg 226 of the front rotor end cap 222. The legs 226 may then be cold-staked, ultrasonically welded, or otherwise joined with their corresponding protrusion 232 to form the rotor enclosure 220. Each rotor end cap 222, 224 further includes a bearing opening 236 in which one of the bearings 204, 206 is received. The rotor shaft 216, and, therefore, the rotor 202, is supported by the bearings 204, 206 contained within rotor end caps 222, 224. The rotor 202 may additionally include a first face portion 223 on a front end of the rotor core 203 and a second face portion 225 on a rear end of the rotor core 203. The first face portion 223 and the second face portion 225 (collectively referred to as face portions 223, 225) are entirely within the rotor enclosure 220. The face portions 223, 225 retain rotor magnets 250 (see FIG. 7A) in magnet receiving apertures of the rotor core 203. In some embodiments, the face portions 223, 225 are entirely within the stator envelope 210. The face portions 223, 225 may also be referred to as face plates.

Figure 8:
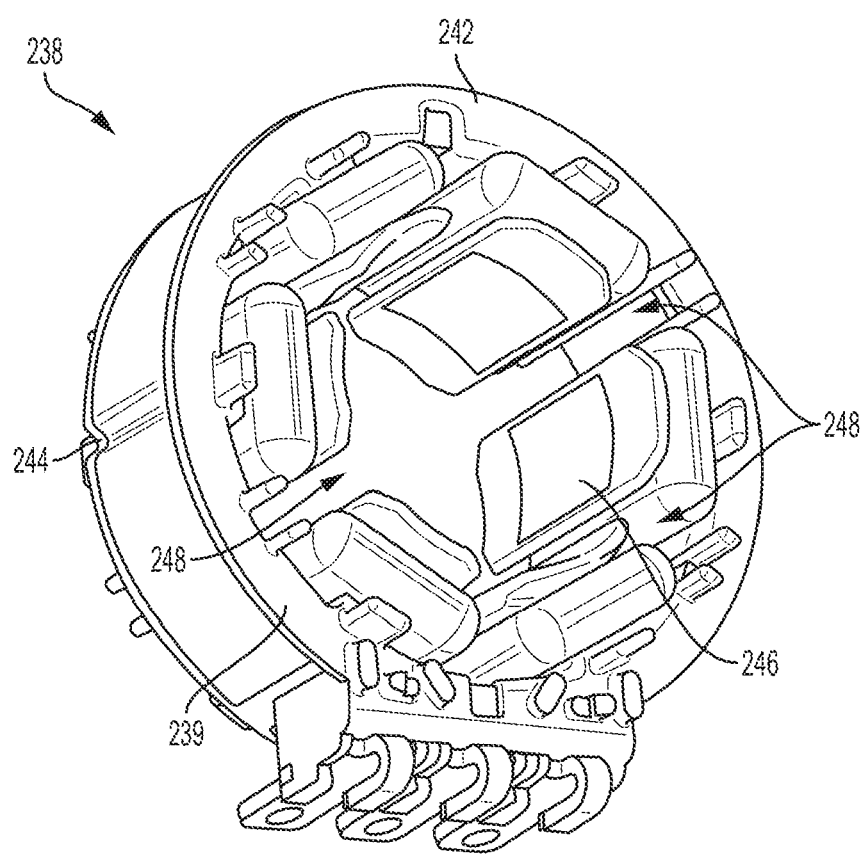
FIG. 8 illustrates a perspective view of a stator of the motor.

The motor 200 includes an inner rotor 202 with permanent magnets 218 and an outer stator 238 with coil windings 212 selectively energized to drive the rotor 202. Referring to FIG. 8, the outer stator 238 includes a stator frame 239 having a first stator end cap 242 on a front side of the stator 238 and a second stator end cap 244 on a rear side of the stator 238. The first stator end cap 242 and the second stator end cap 244 may be integrally formed as a single piece (i.e., the stator frame 239) or, alternatively, may be two separate pieces that together form the stator frame 239. The stator frame 239 may be formed by an injection molding process, for example, by injecting a resin material into a mold including a stator lamination stack. Accordingly, the stator frame 239 may be a monolithic structure formed of hardened resin. The stator 238 includes stator laminations (see, e.g., stator laminations 710 of FIG. 55). The stator laminations and the stator frame 239 include teeth 246 around which the coils 212 are wound. Between each stator tooth 246, at an inner radial end of the stator 238, is a gap 248, as shown in FIG. 8. As shown in FIGS. 7A-C, each leg 226 of the rotor enclosure 220 fits and is positioned within a gap 248 between each stator tooth 246. Accordingly, the gaps 248 between stator teeth 246 are sealed. The sealed gap 248 prevents contaminants and debris from passing into the rotor area, which prevents contaminants and debris from potentially causing damage or reducing the life of the motor 200. The legs 226 and rotor end caps 222, 224 of the rotor enclosure 220 and the stator teeth 246, in combination, provide a sealed rotor space that protects the rotor 202 from contaminants and debris. Additionally, in some embodiments, the sealed rotor space provides a less turbulent space for rotor rotation, reducing motor vibration. In some embodiments, the rotor 202 may be hermetically sealed within the rotor enclosure 220 and stator teeth 246 of the motor 200. In other embodiments, the seal is not hermetic, but still serves to block debris and contaminants from entering the rotor space within the rotor enclosure 220.

The stator frame 239, and the associated stator assembly, also includes an inner diameter 252 formed by the radially innermost ends of the stator frame 239 (see FIG. 7B). The channel 228 has a diameter 254 formed by the radially outermost ends of the channel 228 (see FIG. 13). In some embodiments, the diameter 254 of the channel 228 is less than the inner diameter 252 of the stator frame 239.

Figure 10D:
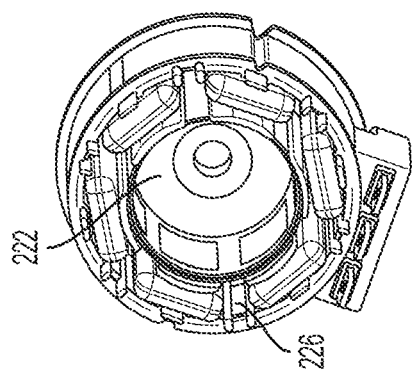
FIGS. 10A, 10B, 10C, 10D, 10E, 10F, and 10G illustrate an assembly process for the motor.
Figure 10C:
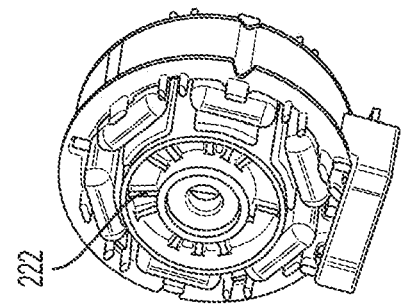
Figure 10B:
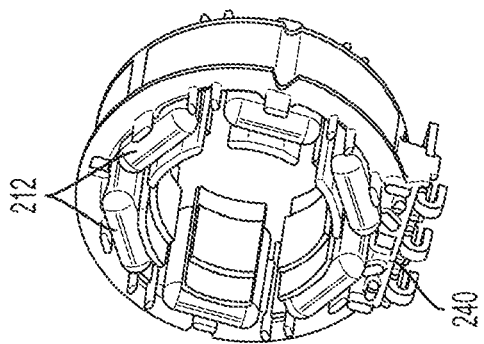
Figure 10A:
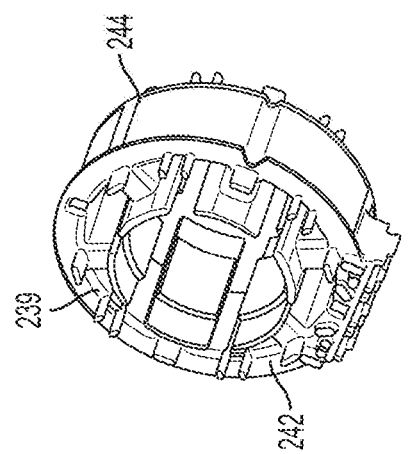
Figure 10G:
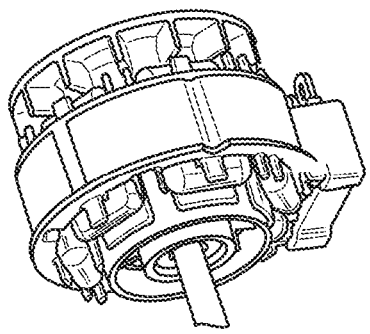
Figure 10F:
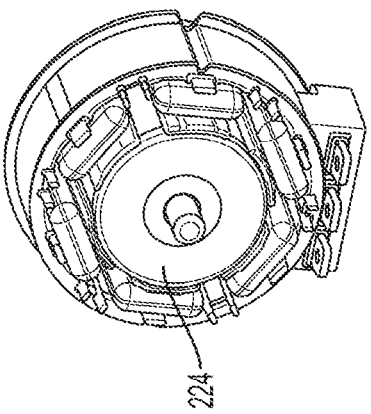
Figure 10E:
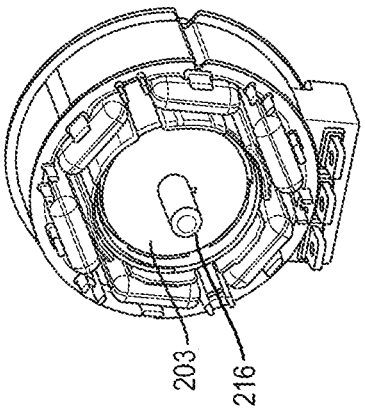
Figure 11:
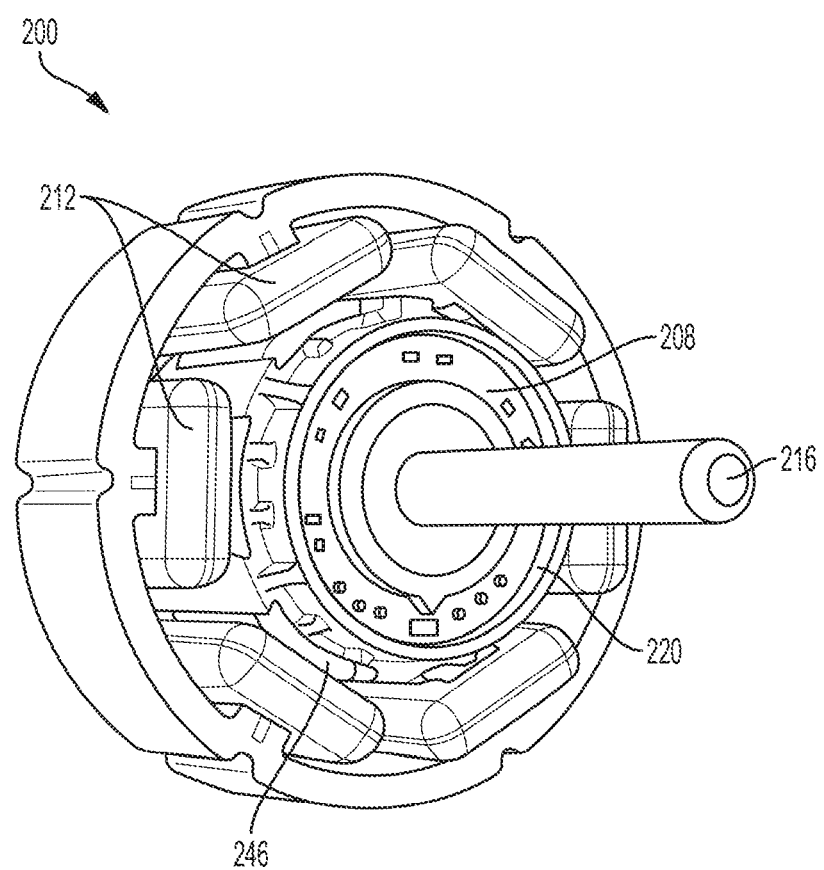
FIG. 11 illustrates a stator of the motor with removed stator end caps.
Figure 15:
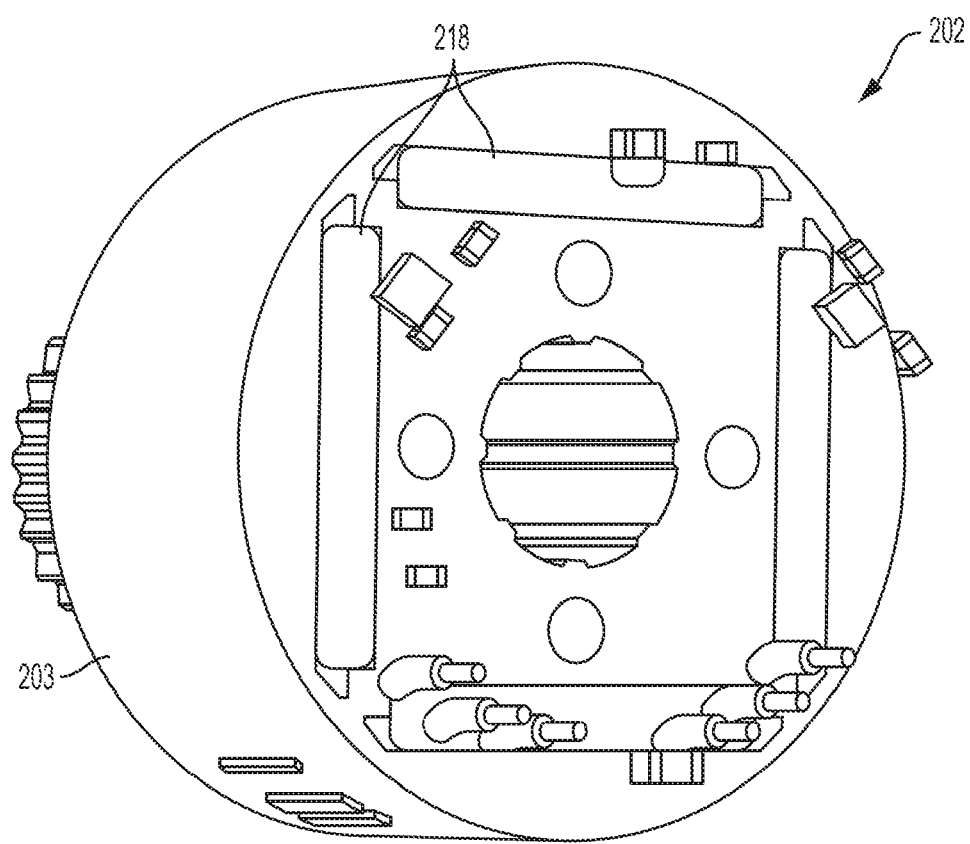
FIG. 15 illustrates the rotor removed from the rotor enclosure.
Figure 16:
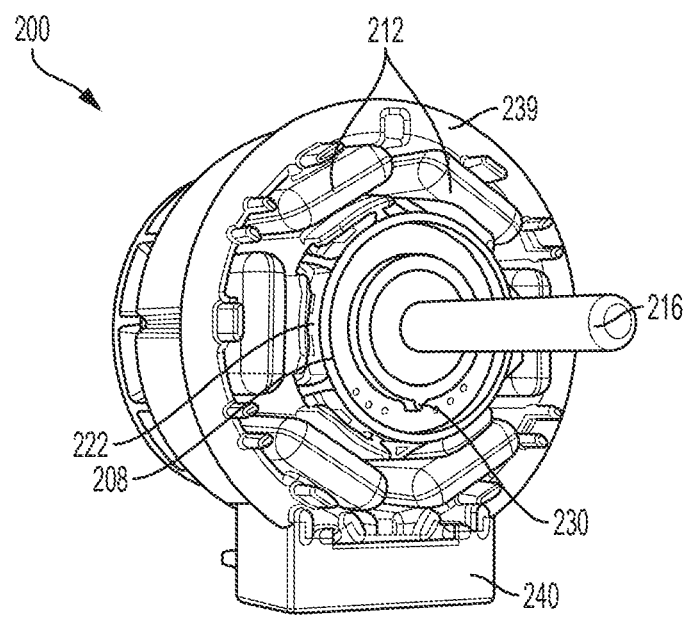
FIGS. 16-24 illustrate additional views of the motor.
Figure 17:
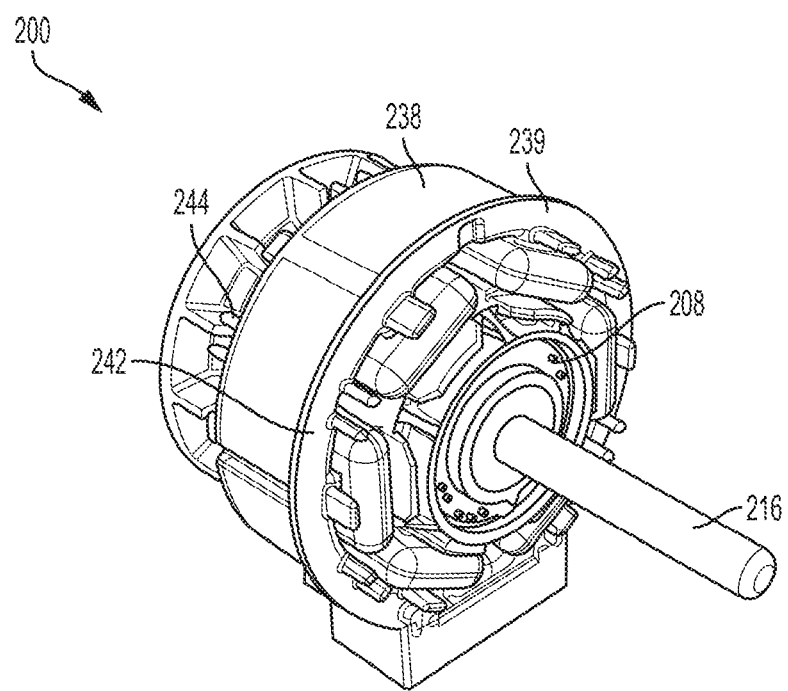
Figure 18:
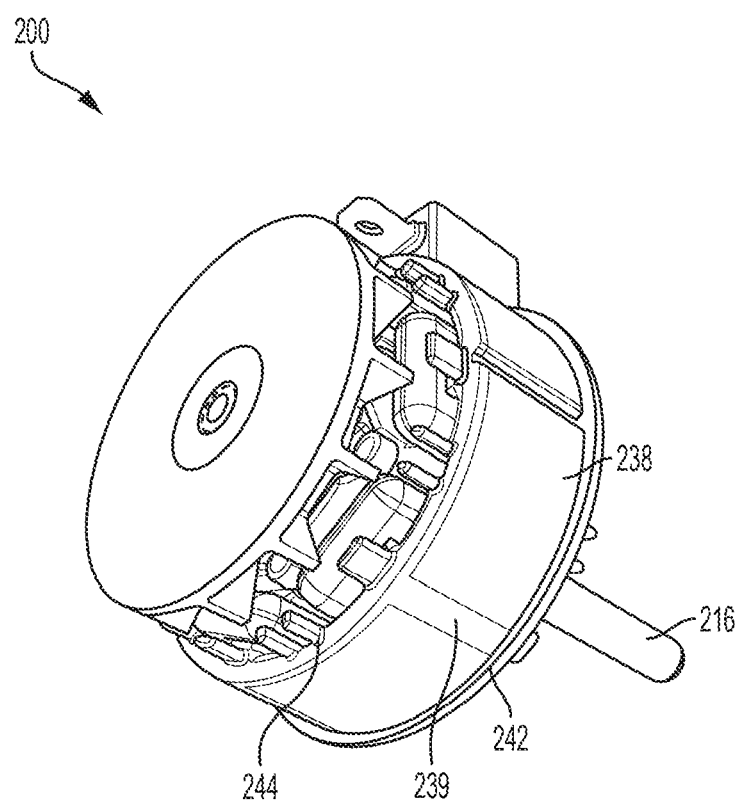
Figure 19:
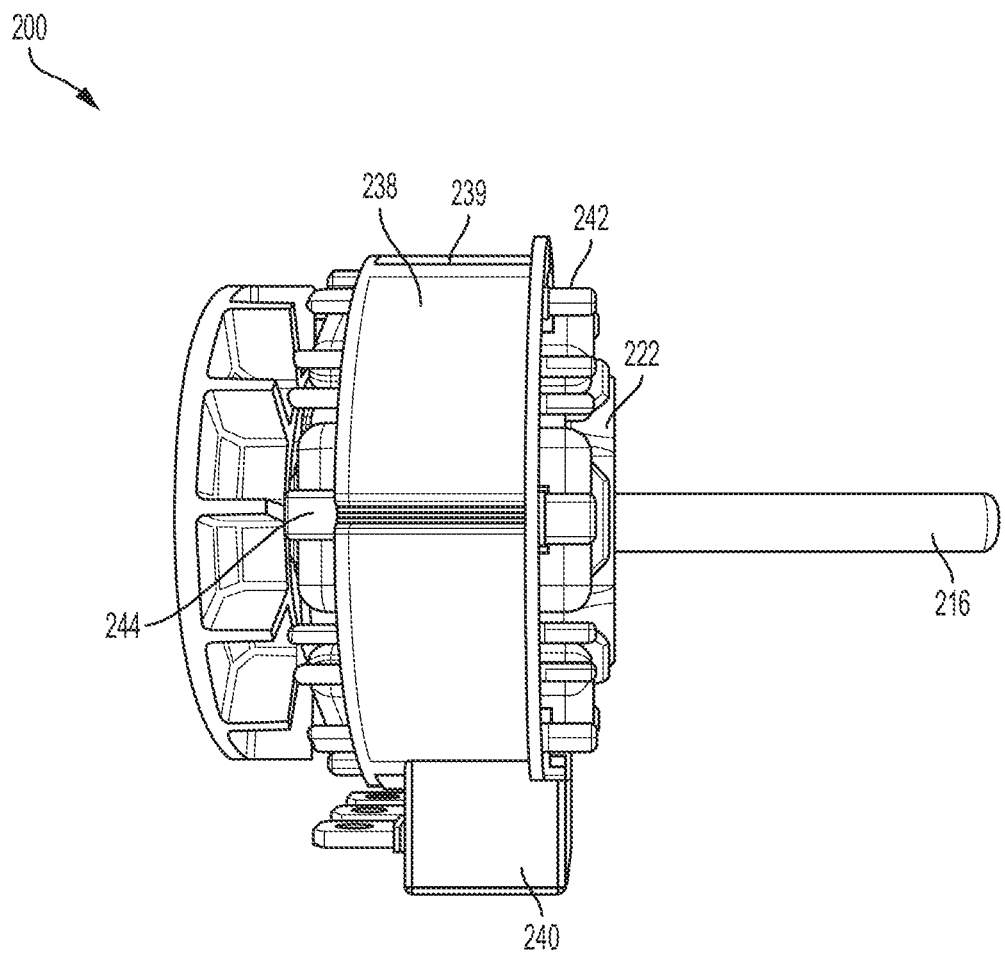
Figure 20:
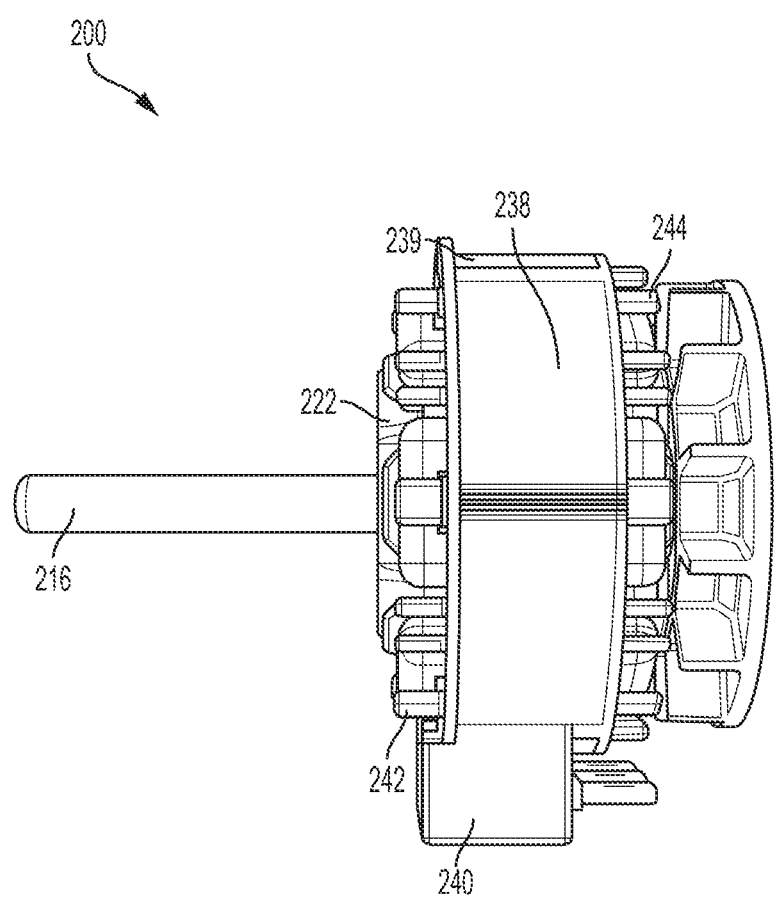
Figure 21:
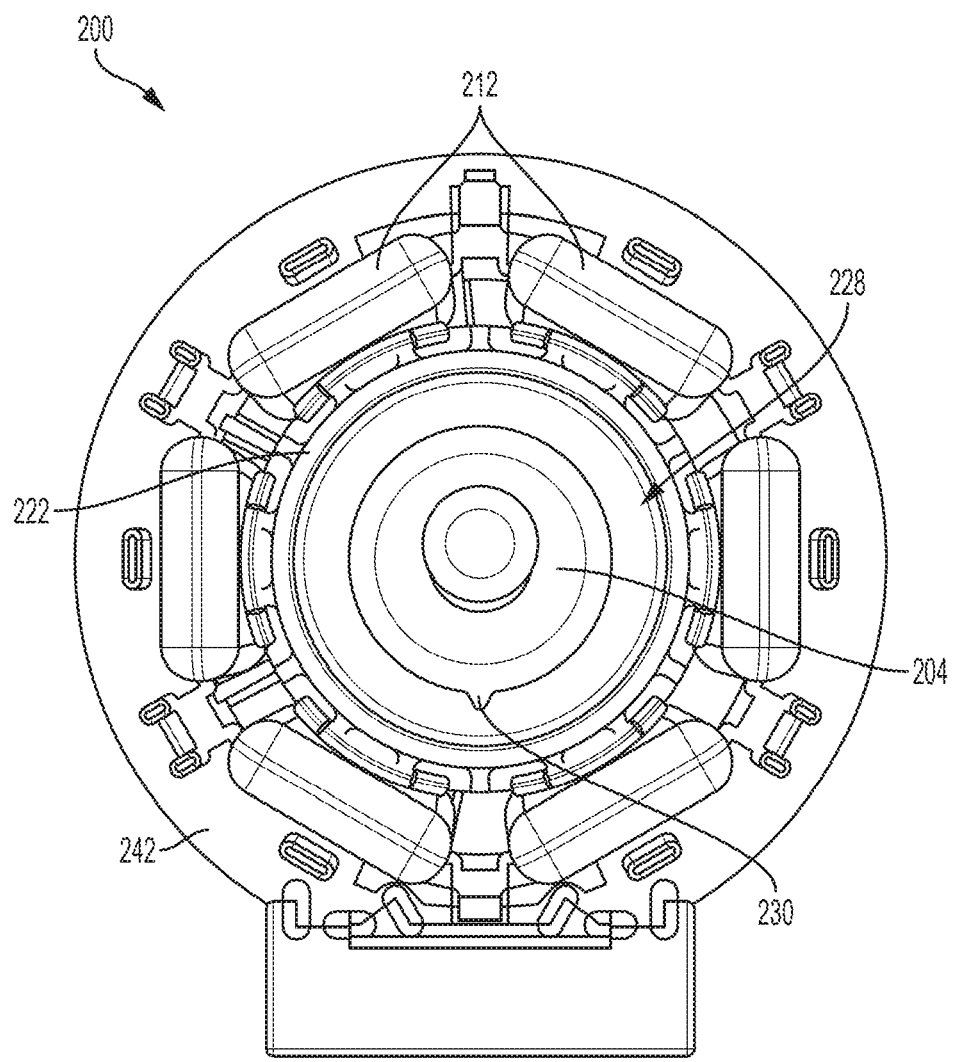
Figure 22:
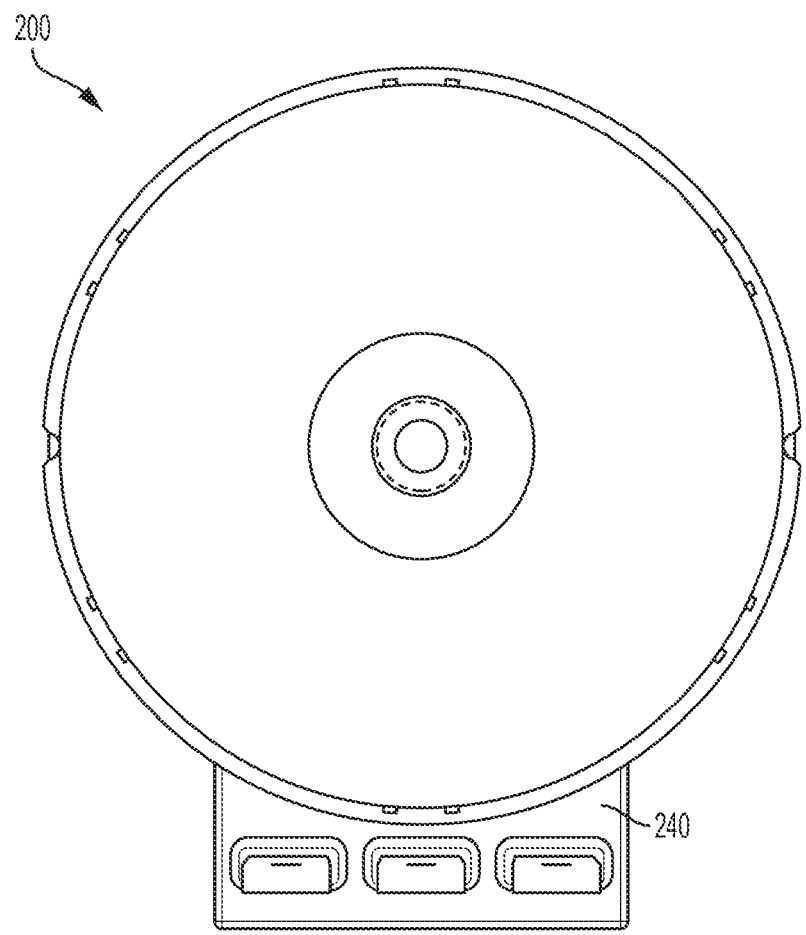
Figure 23:
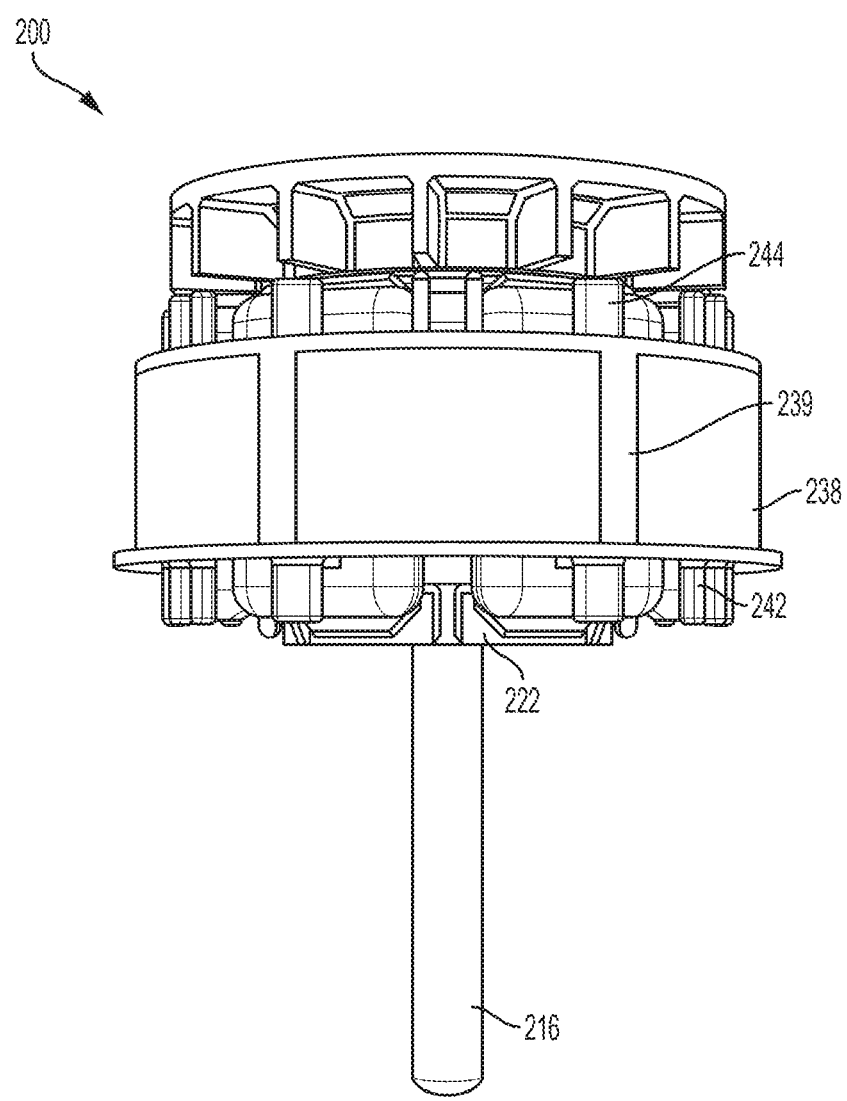
Figure 24:
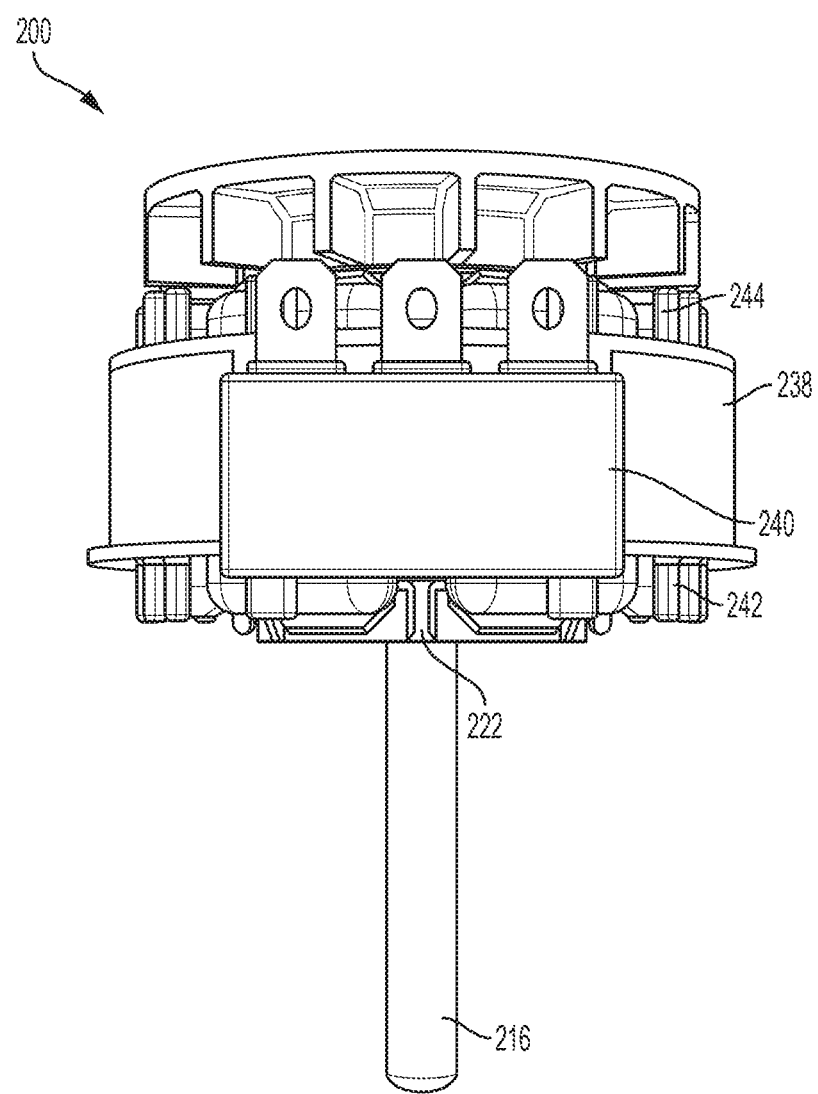

FIGS. 9A-B illustrate an improved wire routing and support feature of the motor 200 including a terminal block 240. An assembly process for the motor 200 is illustrated in FIGS. 10A-G. In FIG. 10A, stator laminations are positioned between the stator end caps 242, 244. In FIG. 10B, the coil windings 212 are wound around the stator teeth 246. Additionally, terminals are inserted into the terminal block 240. In FIGS. 10C and 10D, the front end cap 222 and legs 226 of the rotor enclosure 220 are inserted into the stator 238. In FIG. 10E, after assembly, the rotor core 203, including rotor laminations and the permanent magnets 218, and the rotor shaft 216 is inserted into the stator 238. In FIG. 10F, the rear end cap 224 is secured to the legs 226 (e.g., via ultrasonic welding). In FIG. 10G, a fan is attached to the rotor shaft 216. FIG. 11 illustrates the motor 200 with the stator frame 239 removed. FIG. 12 illustrates the motor 200 with the stator 238 removed. FIGS. 13-14 illustrate the rotor enclosure 220 with the rotor 202 removed, while FIG. 15 illustrates the rotor 202 removed from the rotor enclosure 220. FIGS. 16-24 illustrate additional views of the motor 200.

Figure 25:
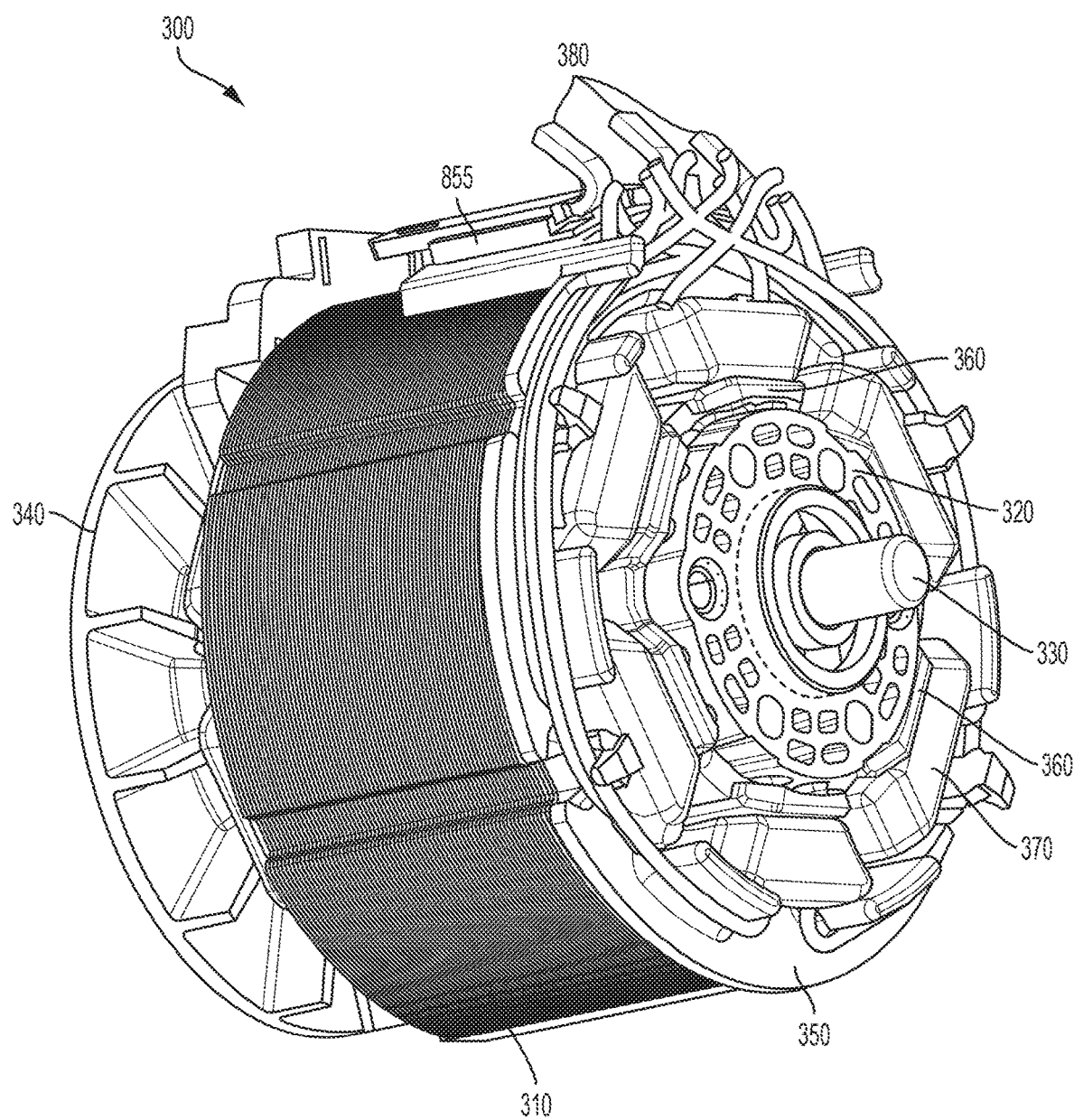
FIG. 25 is a perspective view of a motor according to another embodiment.

FIG. 25 is a perspective view of a brushless DC motor 300 according to another embodiment. Like the motor 200, the motor 300 may be incorporated into the tool 100 of FIG. 1 and is an example of the motor 126 in the block diagram of FIG. 2. Additionally, like the motor 200, the motor 300 may also be incorporated into other types of power tools, as described above.

The motor 300 includes a stator 310, a self-contained rotor 320 that drives a shaft 330, and a fan 340. The stator 310 is made up of several stator laminations stacked together to form a cylindrical core. The stator 310 also includes stator teeth 345 (for example, six teeth) that project inwards from an outer circumferential ring 347 (see FIG. 33). The stator 310 further includes a stator frame 350 including a first stator end cap 352 on a front side of the stator 310 and a second stator end cap 354 on a rear side of the stator 310. The first stator end cap 352 and the second stator end cap 354 may be integrally formed as a single piece (i.e., the stator frame 350) or, alternatively, may be two separate pieces that together form the stator frame 350. The stator frame 350 may be formed by an injection molding process, for example, by injecting a resin material into a mold including the stator laminations. Accordingly, the stator frame 350 may be a monolithic structure formed of hardened resin. The stator frame 350 also includes stator end cap teeth 360 that extend over the stator teeth 345. Stator windings 370 are wound around the stator teeth 345 and the stator end cap teeth 360.

Figure 26:
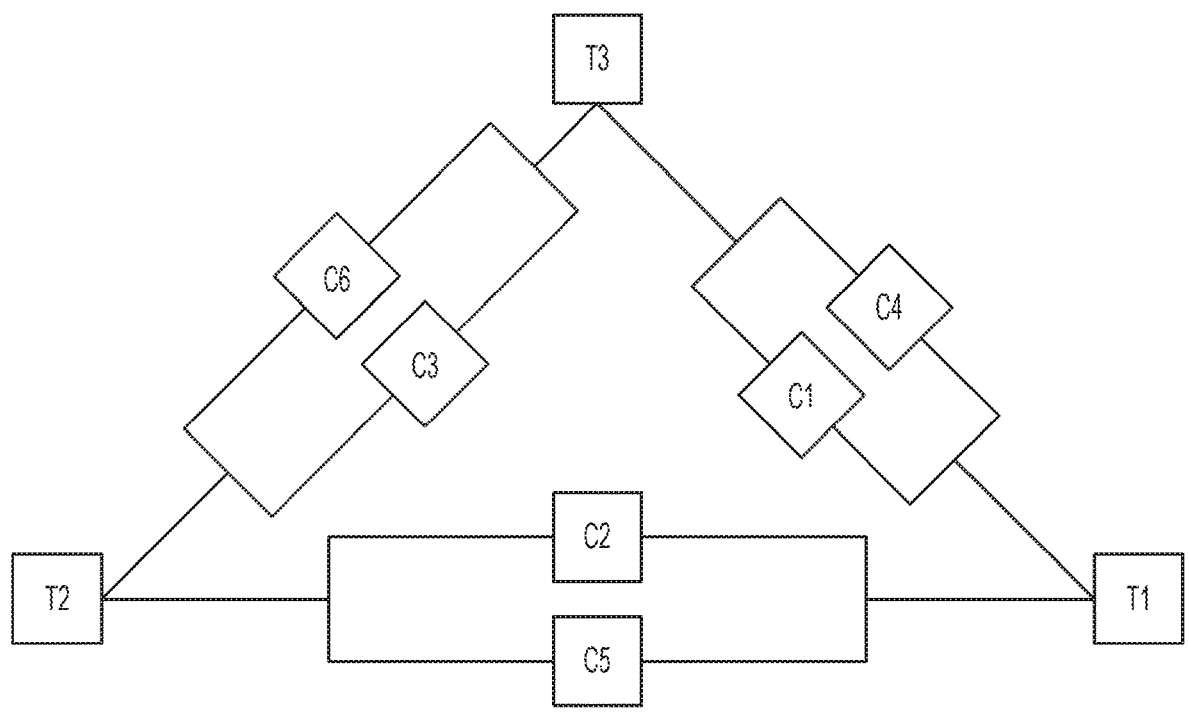
FIG. 26 illustrates a winding connection of the motor of FIG. 25.

Stator windings 370 are wound around the stator teeth 345 and electrically connected to wire terminals 380. The wire terminals 380 are connected to the FETS 124 to receive power from the power source 122 of the power tool 100 (see FIGS. 1-2). The wire terminals 380 supply electrical power to energize the stator windings 370, thereby creating electromagnetic fields inside the motor 300 to rotate the rotor 320. In some embodiments, the stator windings 370 are connected in a parallel-delta configuration as shown in FIG. 26. In FIG. 26, C1 through C6 represent the stator windings 370 and T1 through T3 represent the wire terminals 380. The labels C1 through C6 may be sequentially applied (i.e., C1, C2, C3, C4, C5, C6) to the stator windings 370 in a clockwise or counter clockwise manner such that, for example, the stator winding 370 labeled C1 is adjacent to the stator windings 370 labeled C2 and C6, and the stator winding 370 labeled C3 is adjacent to the stator windings 370 labeled C2 and C4. In other embodiments, the stator windings 370 are connected in series-delta configuration, a wye configuration, or another configuration.

Figure 27:
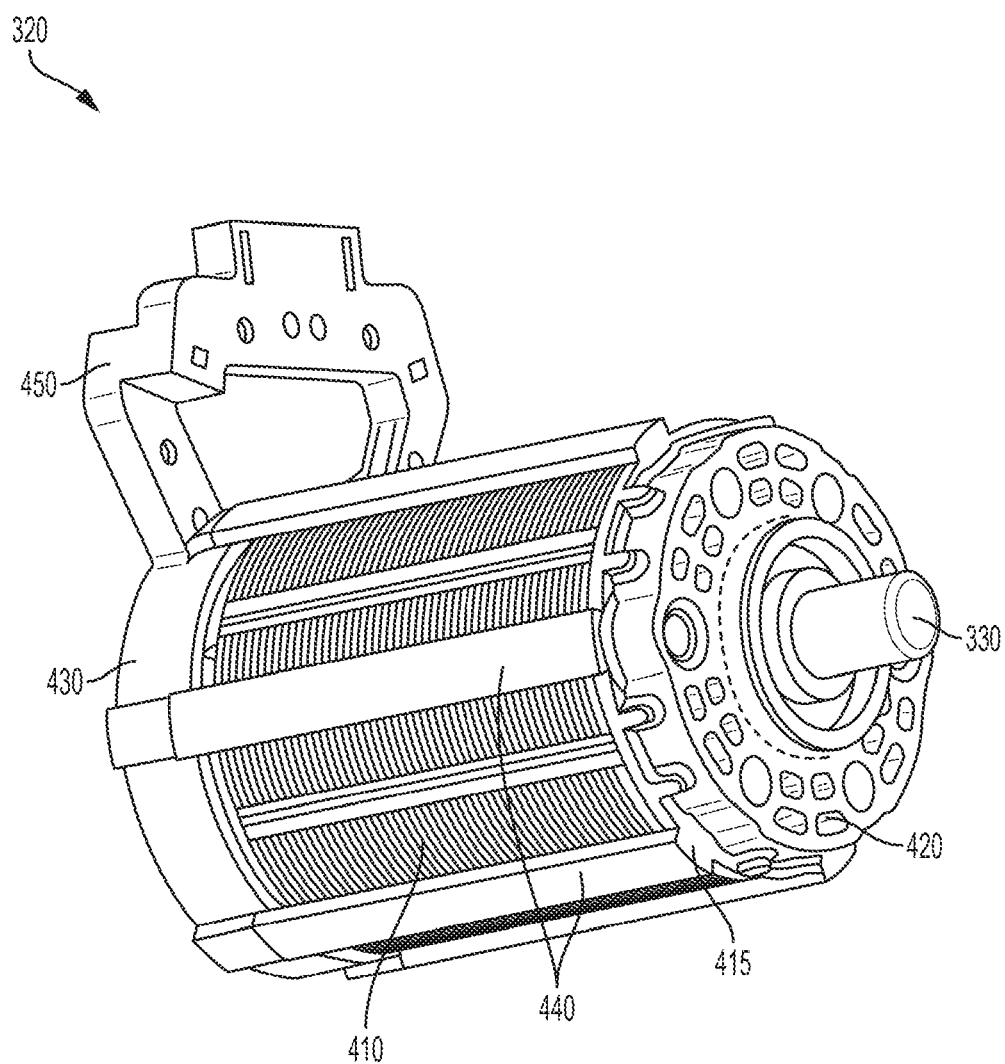
FIG. 27 is a perspective view of a self-contained rotor of the motor of FIG. 25.

FIG. 27 is a perspective view of the self-contained rotor 320. The self-contained rotor 320 includes a rotor core 410 within a rotor enclosure 415 including a front end cap 420, a rear end cap 430, legs 440, and a rigid connector 450. The rotor enclosure 415 is described in more detail below. The rotor core 410 is made up of several rotor laminations stacked together to form a cylindrical core. The rotor core 410 includes magnet receiving apertures to receive rotor magnets 510 (see FIG. 28). Rotor magnets 510 (for example, four permanent magnets) are inserted into the rotor core 410 (see, e.g., FIG. 32). The rotor core 410 is rotationally fixed to the shaft 330 such that the rotor core 410 and shaft 330 rotate together.

Figure 28:
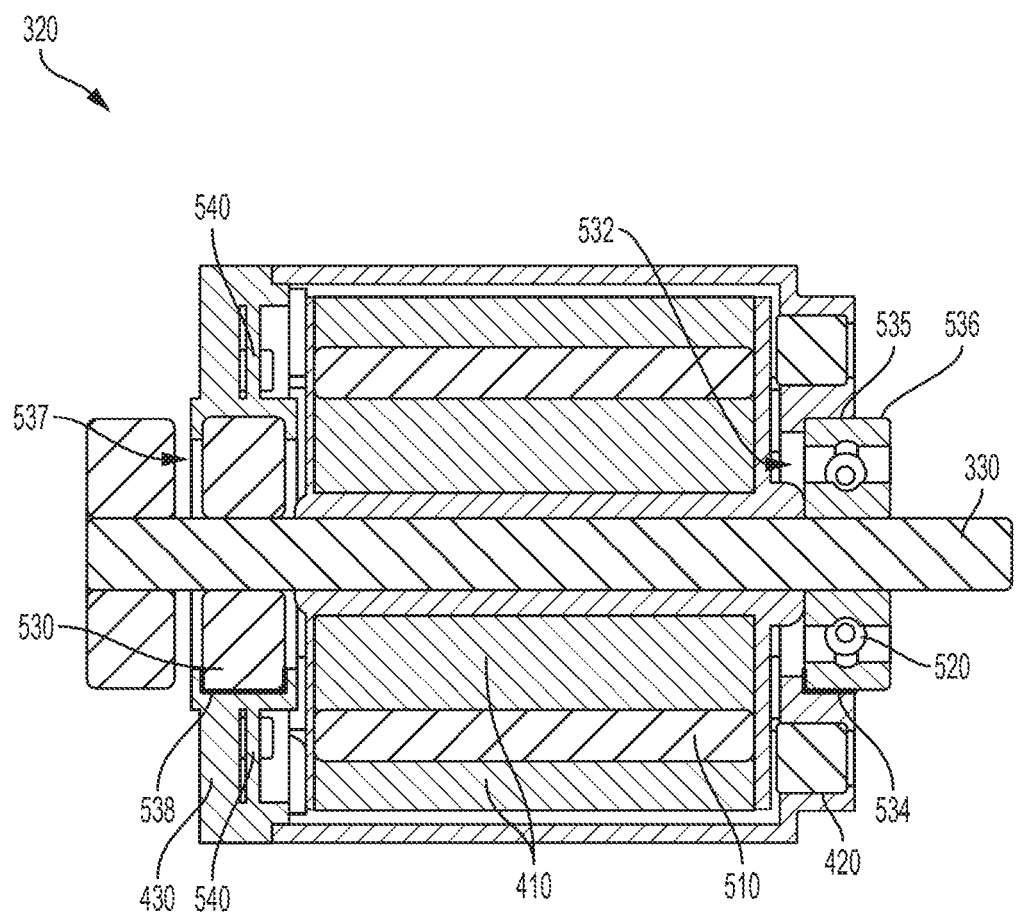
FIG. 28 is a cross-sectional view of the self-contained rotor of the motor of FIG. 25.

FIG. 28 is a cross-sectional view of the self-contained rotor 320. The self-contained rotor 320 includes permanent magnets 510. In some embodiments, the self-contained rotor 320 may include four permanent magnets 510. Permanent magnets 510 produce rotational mechanical energy due to the electro-magnetic fields created by the stator 310. The rotational mechanical energy rotates the rotor core 410, which in turn rotates the shaft 330. The shaft 330 drives a gear case that ultimately drives a tool bit of the power tool 100. On a rear end of the motor 300 (and the power tool 100), the shaft 330 also drives the fan 340. The rotor 202 may additionally include a first face portion 512 on a front end of the rotor core 410 and a second face portion 514 on a rear end of the rotor core 410. The first face portion 512 and the second face portion 514 (collectively referred to as face portions 512, 514) are entirely within the rotor enclosure 415. The face portions 512, 514 retain rotor magnets 510 in magnet receiving apertures of the rotor core 410. The face portions 512, 514 may also be referred to as face plates.

The front end cap 420 and the rear end cap 430 of the self-contained rotor 320 include an opening for front bearing 520 and rear bearing 530, respectively. More particularly, the front end cap 420 includes a front opening 532 with an L-shaped channel (L-channel) 534 to receive the front bearing 520. More particularly, the L-channel 534 receives a recessed portion 535 of the front bearing 520. An extended portion 536 of the front bearing 520 extends axially outward from the front end cap 420 away from the rotor core 410. The rear end cap 430 includes a rear opening 537 with a U-shaped channel (U-channel) 538 to receive the rear bearing 530. The shaft 330 and bearings 520 and 530 cooperate to enable the rotor core 410 to rotate around its axis independent of the rotor end caps 420 and 430 and the legs 440, which are fixed. The front end cap 420 also includes mounting bosses 860 that are used to fix a gear case to the motor 300, which is described in further detail below with respect to FIGS. 34A and 34B.

Figure 31A:
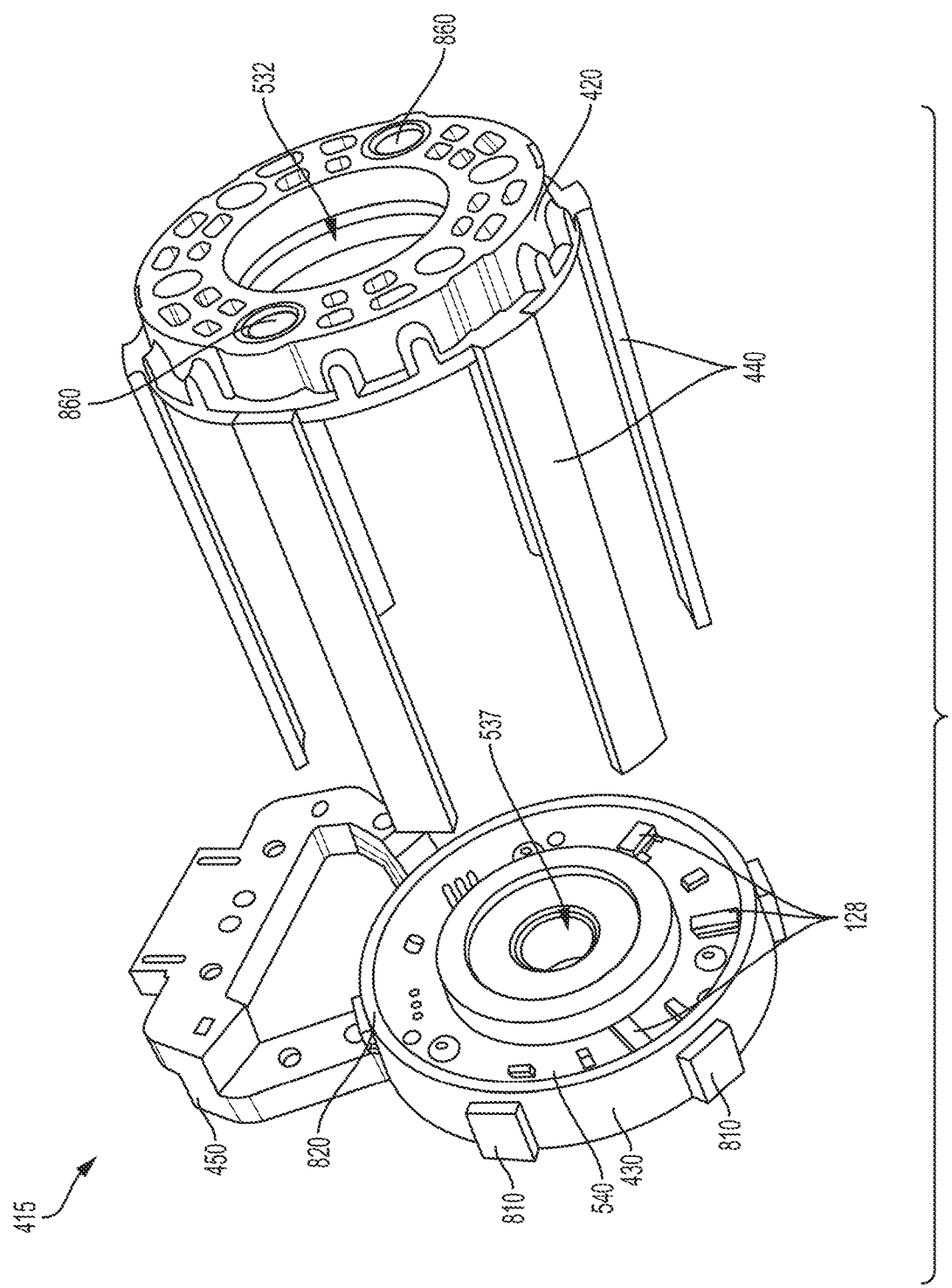
FIG. 31A is an exploded view of rotor end caps of the motor of FIG. 25.

The rear end cap 430 also includes a position sensor board assembly 540 having a generally annular shape. Returning to FIG. 27, the rigid connector 450 is coupled to the rear end cap 430 and provides an insulated pathway to connect the position sensor board assembly 540 to the motor controller 130 or a circuit board of the power tool 100. With reference to FIG. 31B, the rigid connector 450 and rear end cap 430 may be collectively referred to as a rear assembly 451. The position sensor board assembly 540 is described in more detail below with respect to FIGS. 31A and 35.

Figure 29:
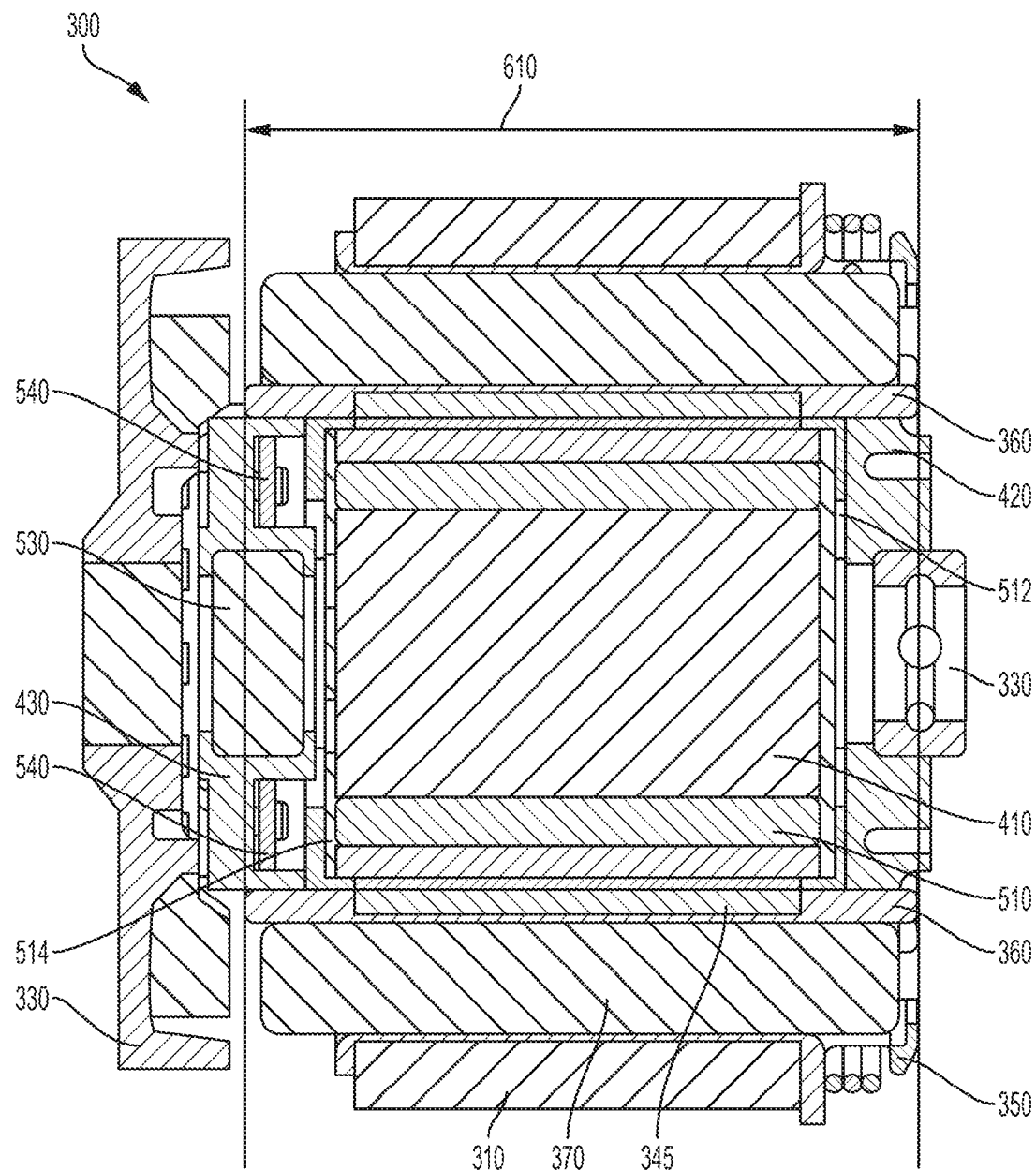
FIG. 29 is a cross-sectional view of the motor of FIG. 25.

FIG. 29 is a cross-sectional view of the motor 300. As illustrated, the self-contained rotor 320, including the position sensor board assembly 540, and bearings 520 and 530, is positioned within a stator envelope 610 of the motor 300. Stator envelope 610 is the volume within the stator 310. In other words, the stator envelope 610 is the volume radially inward of the stator windings 370 and extending axially between the outer axial ends of the stator end cap teeth 360. In some embodiments, the stator envelope 610 extends axially between the axial outer ends of the stator windings 370. As illustrated, the rotor core 410 and position sensor board assembly 540 are entirely within the stator envelope 610, and the bearings 520 and 530 are partially within the stator envelope 610. In some embodiments, one or both the bearings 520 and 530 may be fully outside (not recessed within) the stator envelope 610 or fully inside the stator envelope 610. Positioning the self-contained rotor 320 within the stator envelope 610 provides a more compact motor design. In some embodiments, such as illustrated in FIG. 29, the face portions 512, 514 are entirely within the stator envelope 210.

Additionally, the front end cap 420 and the rear end cap 430 are located radially within the stator 310. In other words, the rotor end caps 420 and 430 do not extend radially past the stator end cap teeth 360 or the stator windings 370. Rather, the front end cap 420 and the rear end cap 430 are received within front and rear openings, respectively, of the stator 310 radially inward of the stator end cap teeth 360 (see also FIG. 31B).

Figure 30:
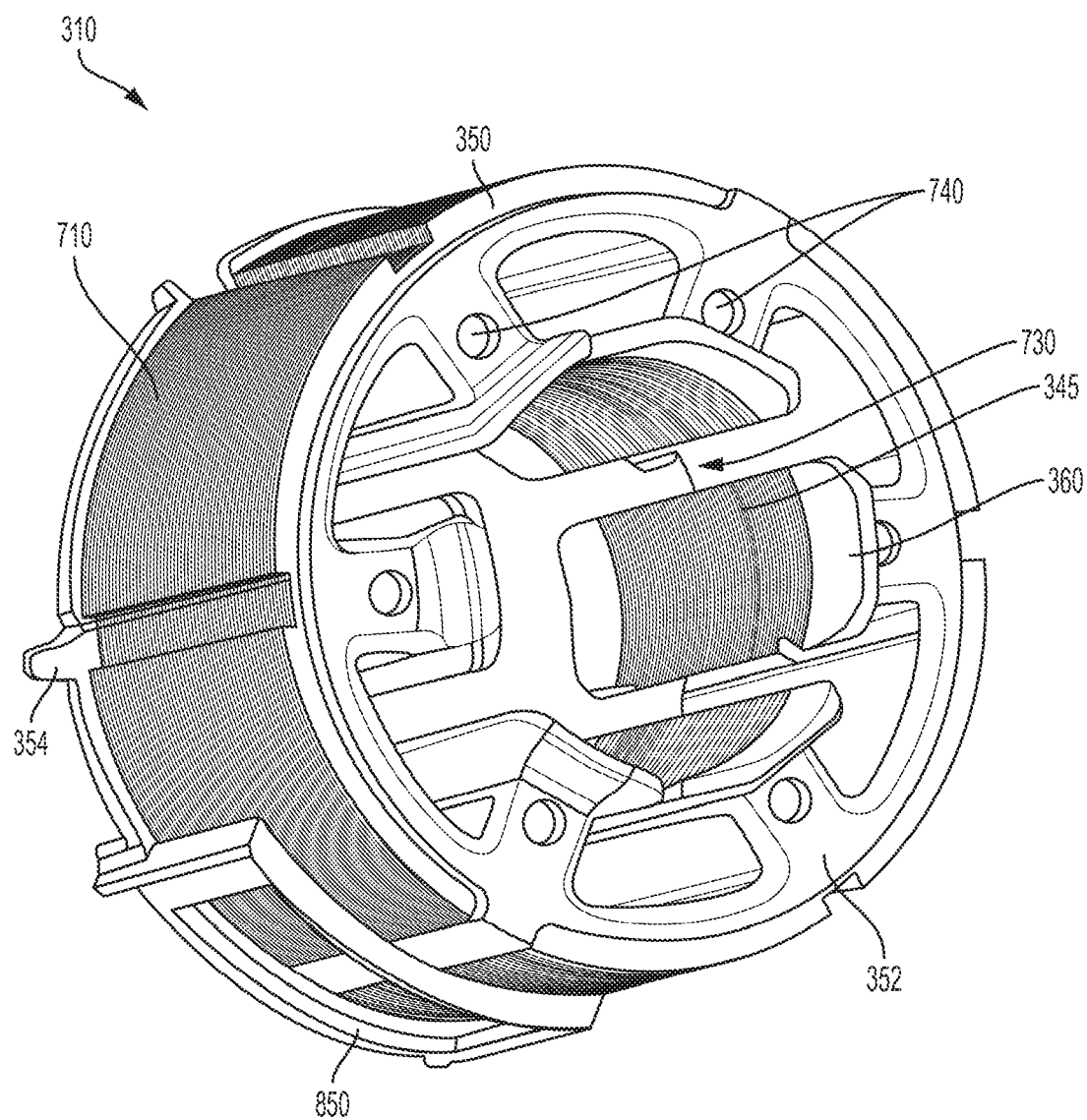
FIG. 30 is a perspective view of a stator of the motor of FIG. 25.

FIG. 30 is a perspective view of the stator 310. As described above, the stator 310 includes stator laminations 710, stator teeth 345, stator frame 350, and stator end cap teeth 360. The stator 310 also includes gaps 730 to provide separation between adjacent teeth, at an inner radial end of the stator 310. The stator frame 350 includes posts 740 on which the stator end cap teeth 360 are positioned.

FIG. 31A is an exploded view of the rotor enclosure 415 including the rotor end caps 420 and 430. The front end cap 420 includes legs 440 that extend from the front end cap 420. The rear end cap 430 includes projections 810 on its circumference. The legs 440 are attached (e.g., adhered) to the projections 810 to form the rotor enclosure 415. Additionally, the projections 810 fit in gaps 730 between adjacent stator end cap teeth 360. The rear end cap 430 also includes a recess in the form of an annular channel 820 (similar to channel 228) to house the position sensor board assembly 540. As described above with respect to motor 200, the annular channel has a diameter that is less than an inner diameter of the stator frame 350. Hall sensors 128 are attached to a motor-facing side of the position sensor board assembly 540 facing the rotor core 410 and the front end cap 420. As such, the Hall sensors 128 are positioned within the length of the stator windings 370 (within the stator envelope 610) allowing the design to have a rotor core 410 that does not overhang (i.e., extend past the stator envelope 610), yet still provides a short distance between the Hall sensors 128 and the permanent magnets 510.

FIG. 31B is an exploded view of the stator frame 350 and the rotor end caps 420 and 430. The stator frame 350 includes a rear face portion 835, a front face portion 840, and an intermediate portion 845 connecting the rear face portion 835 and the front face portion 840. The stator frame 350 further includes a terminal block holder 850 in which a terminal block molding 855 having the wire terminals 380 is positioned (see in combination with FIG. 25).

Figure 32:
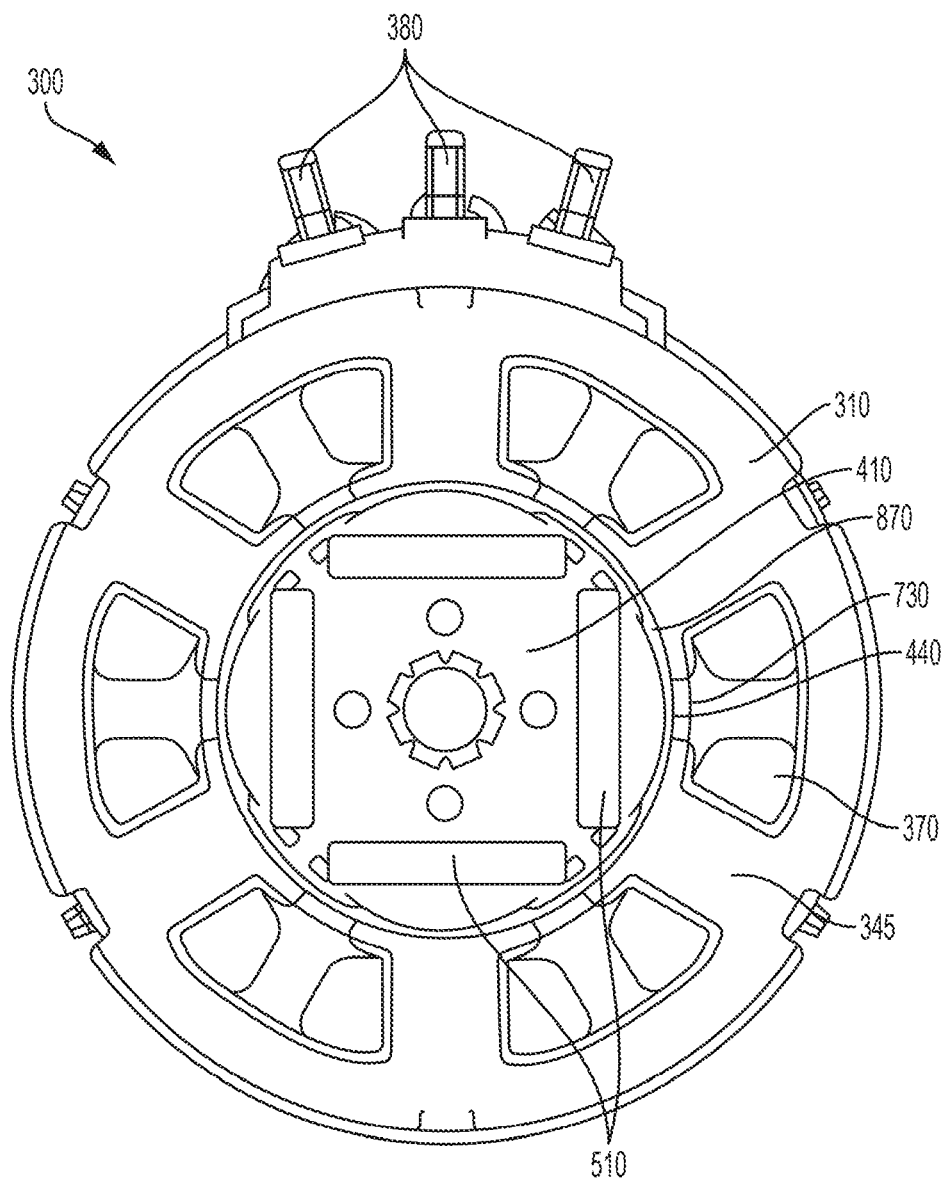
FIG. 32 is an axial cross-sectional view of the motor of FIG. 25.

FIG. 32 is an axial cross-sectional view of the motor 300. As illustrated in the figure, legs 440 of the front end cap 420 close the gaps 730 between adjacent stator teeth 345. As such the rotor end caps 420 and 430 provide a sealed air-gap 870 for the rotor core 410. This sealed air-gap is a cavity within the stator 310 and the rotor enclosure 415 in which the rotor core 410 rotates. The sealed air-gap 870 is a sealed cavity within the stator 310 formed by the front end cap 420, the rear end cap 430, the legs 440, stator teeth 345, and stator end cap teeth 360. This sealed air-gap 870 prevents contaminates from entering the cavity in which the rotor core 410 rotates and in which the position sensor board assembly 540 is located.

Figure 33:
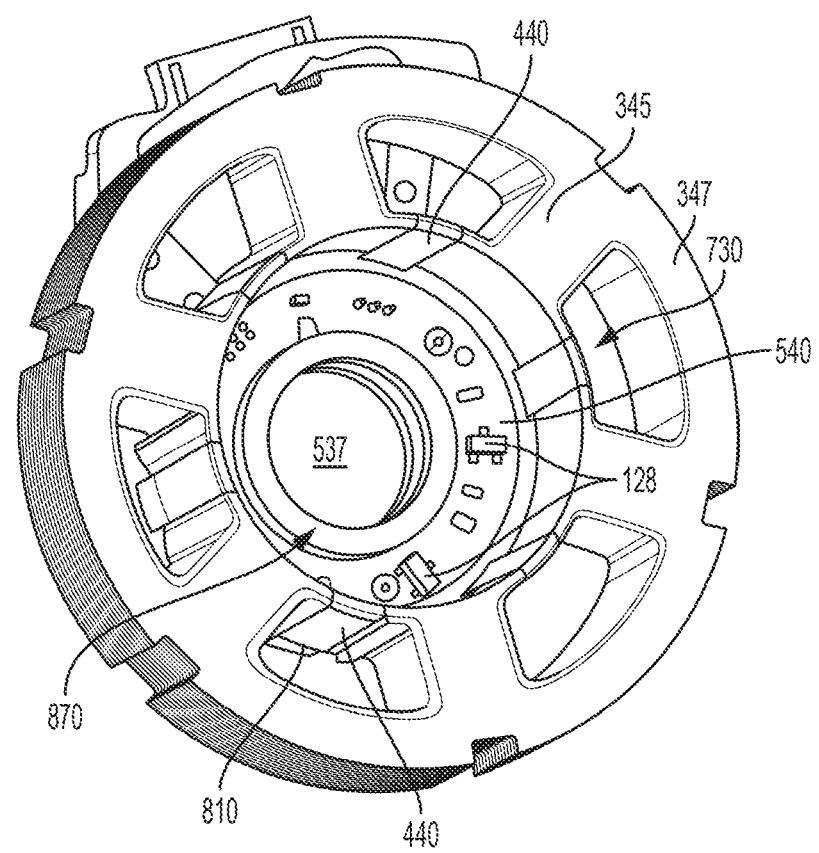
FIG. 33 is a cross-sectional perspective view of the motor of FIG. 25.

FIG. 33 illustrates a cross-section of the motor 300 with the stator windings 370 and stator frame 350 hidden and provides another view of the sealed air-gap 870. As illustrated, the legs 440 close the gaps 730 between stator teeth 345. The rear bearing 530 and the shaft 330 (see, e.g., FIG. 28) fill the rear opening 537 to further seal the sealed air-gap 870 from the external environment. On an opposite side of the motor than shown in FIG. 33 (not visible in FIG. 33), the front opening 532 is similarly occupied by the front bearing 520 to further seal the sealed air-gap 870. The position sensor board assembly 540 is also located within the sealed air-gap 870. Hall sensors 128 are positioned within the sealed air-gap 870 facing the rotor core 410 on the position sensor board assembly 540. The position sensor board assembly 540 may then be protected (e.g., from contaminants) without the addition of coating or potting.

Figure 34B:
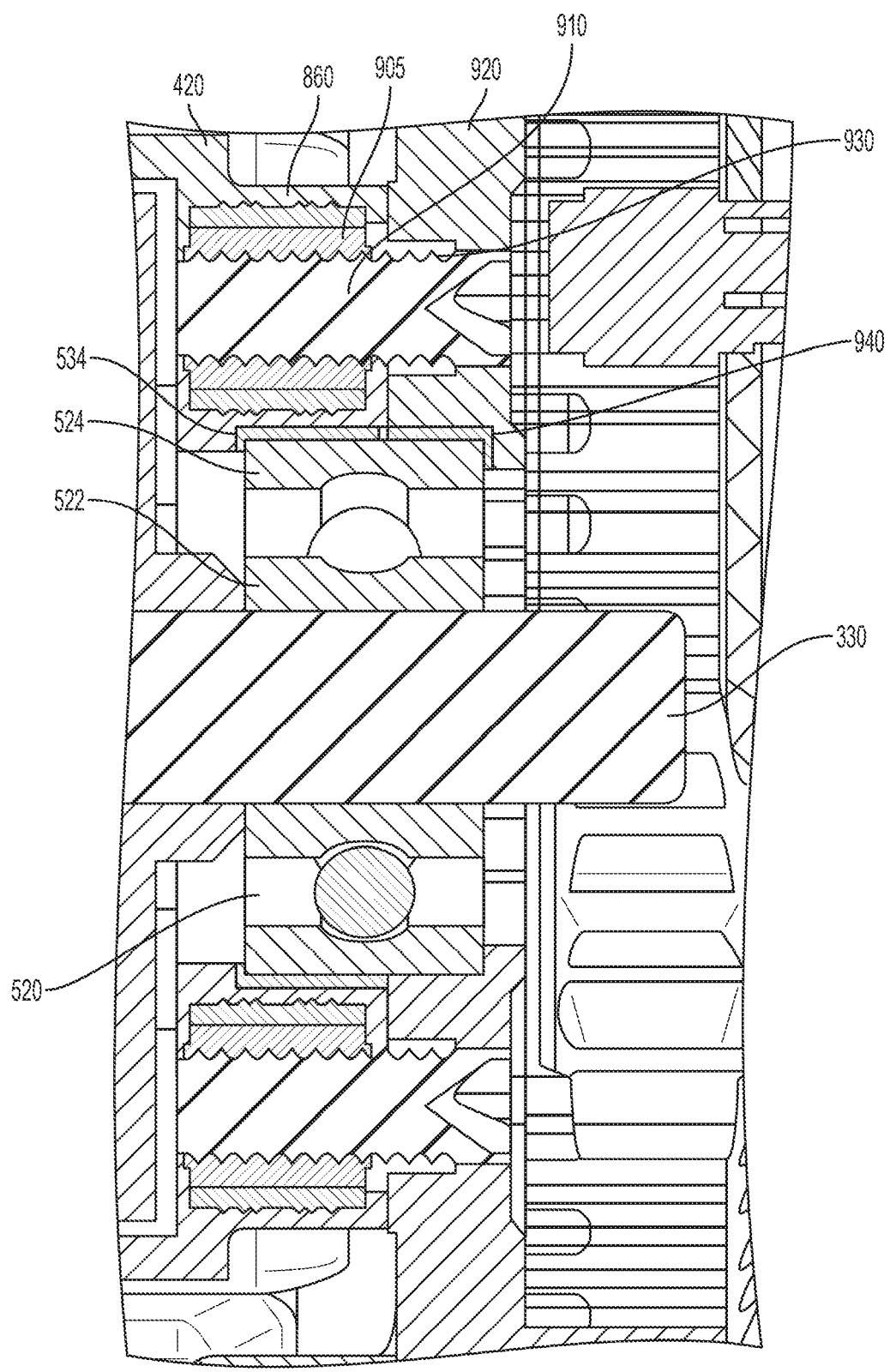

FIG. 34A is a cross sectional view of the motor 300 including a connection to a gear case 900. As illustrated, the gear case 900 receives the shaft 330 and shares the front bearing 520 with the motor 300. The front bearing 520 includes an inner race 522 and an outer race 524 (see FIG. 34B). The mounting bosses 860 on the front end cap 420 allow the motor 300 to be directly connected to the gear case 900. The gear case 900 is fixed to the motor 300 by screws 910. Vibration that may be generated by the motor 300 is forced through the gear case 900 instead of passing more directly to the housing of the power tool. The vibrations, as such, are dampened by the gear case 900. As a result, the mounting of the gear case 900 to the motor 300 allows vibration to be isolated from the housing that a user of the power tool holds.

FIG. 34B illustrates the connection between the motor 300 and the gear case 900 in more detail. The mounting bosses 860 on the front end cap 420 have threaded inserts 905 to receive the threaded screws 910. The gear case 900 includes a gear case enclosure 920, which includes holes 930. The heads of the screws 910 anchor on the inside of the gear case enclosure 920 and the threaded portion of the screws 910 pass through the holes 930 to the mounting bosses 860. The gear case enclosure 920 further includes a second L-channel 940. The L-channel 534 of the front end cap 420 and the second L-channel 940 of the gear case 900 together form a U-channel to retain the front bearing 520 axially between the gear case 900 and the rotor core 410.

Figure 34C:
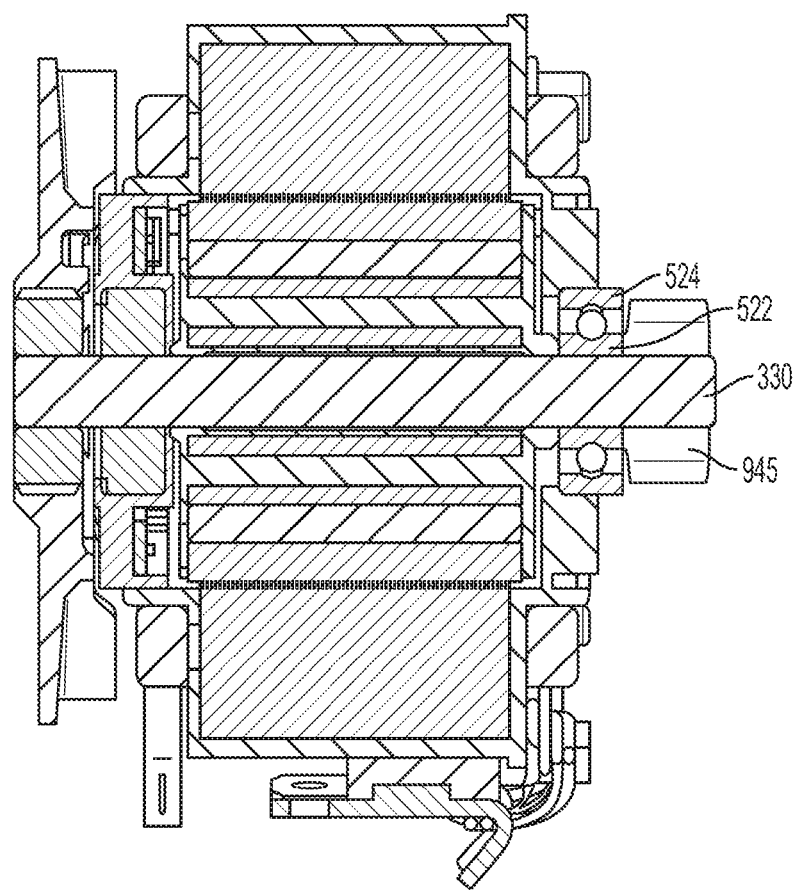

FIG. 34C illustrates another aspect of the connection between the motor 300 and the gear case 900 in more detail. The gear case 900 includes a pinion 945. The pinion 945 is pressed to the inner race 522 of the front bearing 520. As such the pinion 945 provides a mechanism to lock the position of the rotor 320 to the front bearing 520.

Figure 36:
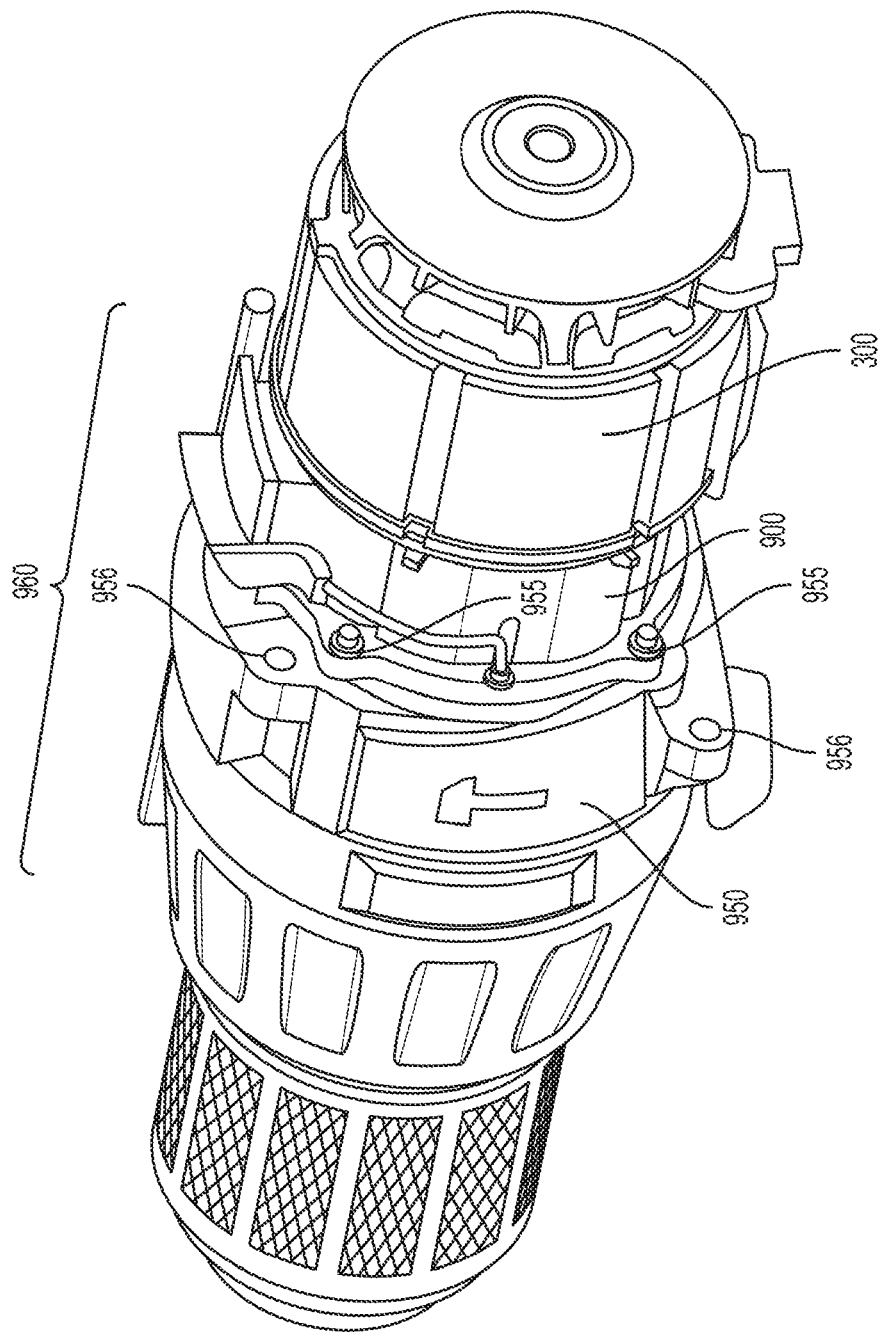
FIG. 36 is a perspective view of a gear case connection.

FIGS. 35A, 35B, and 35C illustrate a connection between the motor 300 and the gear case 900 in more detail. FIG. 35A illustrates the axial positioning of the gear case 900 with respect to the motor 300. As illustrated in FIG. 35B and previously noted with respect to FIGS. 34A and 34B, two screws 910 are used to fix the motor 300 to the gear case 900 both axially and rotationally. The gear case 900 includes threaded screw holes 955 to connect the gear case 900 to a front portion of a gear case assembly (shown in FIG. 36). The threaded screw holes 955 receive a fastening member (not shown), such as a screw, to connect the gear case 900 to the front portion of the gear case assembly (as shown in FIG. 36). FIGS. 35B and 35C illustrate the positioning of the pinion 945 in more detail. As shown, the pinion 945 is positioned at the hole created by the second L-channel 940 in the gear case 900. As can be seen in FIG. 35C, the pinion extends through the hole of the gear case 900 to press against the front bearing 520.

Figure 37:
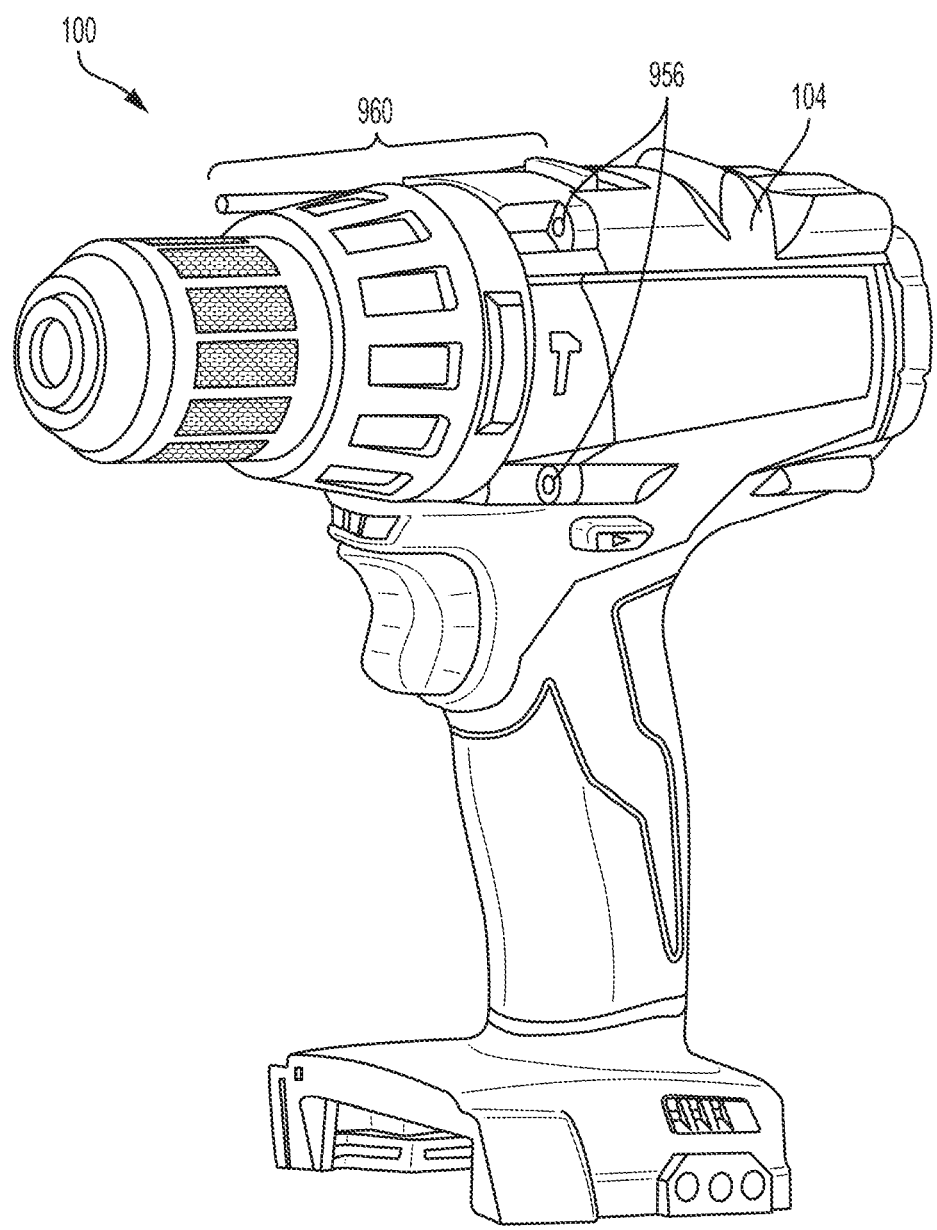
FIG. 37 is a perspective view of the power tool showing the gear case connection.

FIG. 36 illustrates the connection between the gear case 900 and the rest of the gear case assembly 960. As illustrated, the gear case assembly 960 includes the gear case 900 and a front portion 950. The front portion 950 includes holes similar to holes 930 to allow, for example, screws to fix the front portion 950 to the gear case 900. The screws from the front portion 950 are received by threaded screw holes 955 of the gear case 900. The front portion 950 also includes screw holes 956 that align with threaded holes on a power tool housing and that receive a fastening member (not shown) to secure the gear case to the power tool housing. FIG. 37 illustrates the connection between the gear case assembly 960 and the motor housing 106 of the power tool 100. It should be understood that the other side of the power tool not shown in FIG. 37 may also include similar threaded screw holes 956 to fix the gear case 900 to the motor housing 106. Threaded screw holes 956 receive fastening members, for example, screws, to fix the gear case assembly 960 to the motor housing 106.

Figure 38:
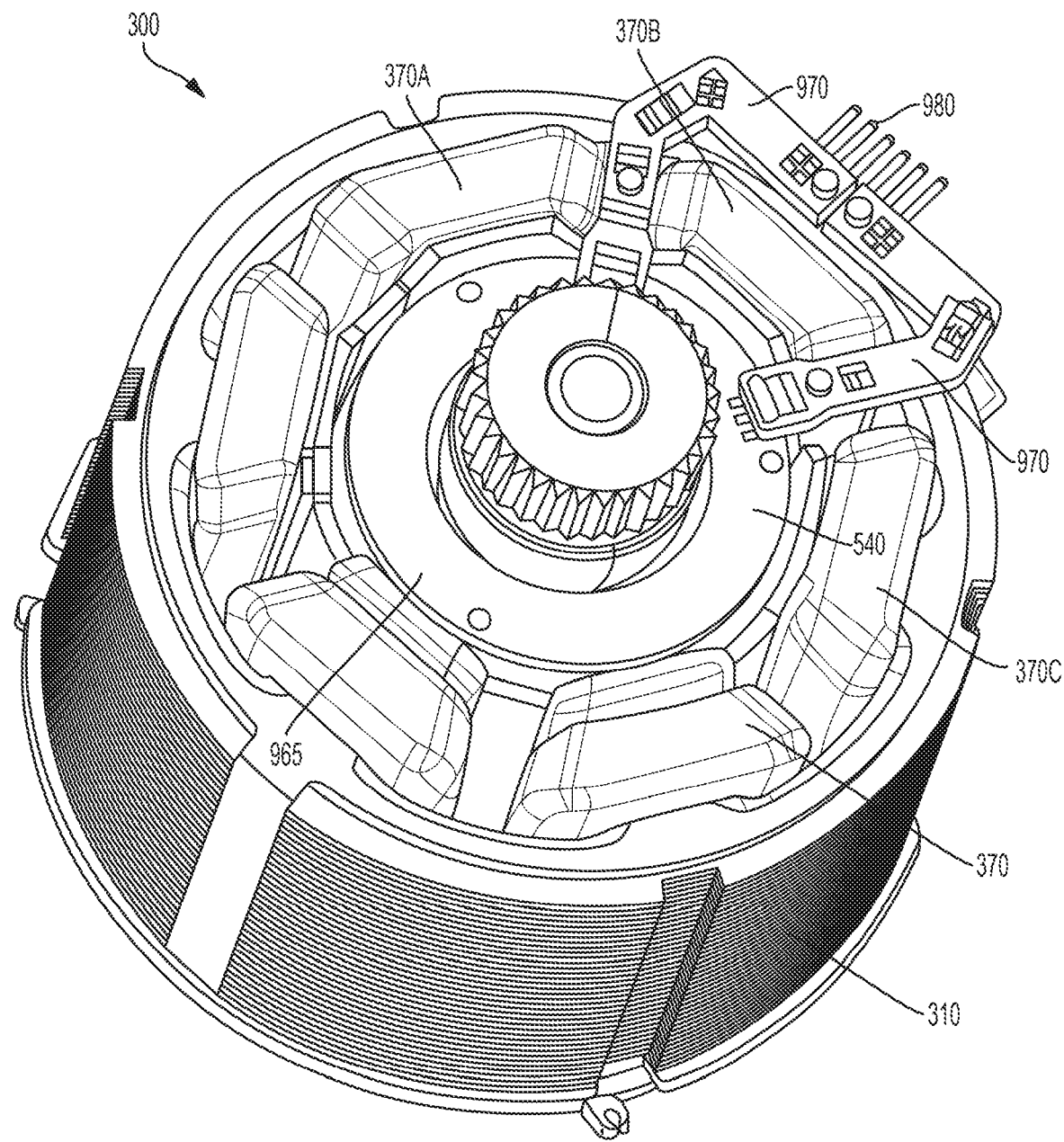
FIG. 38 is a perspective view of the motor of FIG. 25.

FIG. 38 is a rear perspective view of the motor 300 with the rear end cap 430 and rigid connector housing removed. With the rear end cap 430 removed, the position sensor board assembly 540 and the inner circuitry of the rigid connector 450 are exposed and viewable. As previously noted, the Hall sensors 128 are located on the motor-facing side of the position sensor board assembly 540 facing the rotor core 410. Accordingly, the Hall sensors 128 are not shown in FIG. 38. The Hall sensors 128 and the position sensor board assembly 540 are connected to the motor controller 130 of the power tool 100 using the connector arms 970. First ends of the connector arms 970 are mounted on a side 965 of the position sensor board assembly 540 facing away from the rotor core 410 (i.e., on the opposite side of the Hall sensors 128). The connector arms 970 end in pins 980 that are connected to the motor controller 130 of the power tool 100 through, for instance, a ribbon cable that attaches to the rigid connector 450. The connector arms 970 are enclosed in the rigid connector 450. As can be seen from FIG. 38, the connector arms 970 travel along the sides of a winding 370*a* of the stator windings 370. Each of the connector arms 970 extends between the winding 370*a* and a respective adjacent winding 370*b* and 370*c* of the stator windings 370. The connector arms 970 do not extend beyond the axial length of the stator 310. In other words, the connector arms 970 are within the stator envelope 610. The rigid connector 450 and connector arms 970 extend radially beyond the outer circumference of the stator 310.

Figure 39:
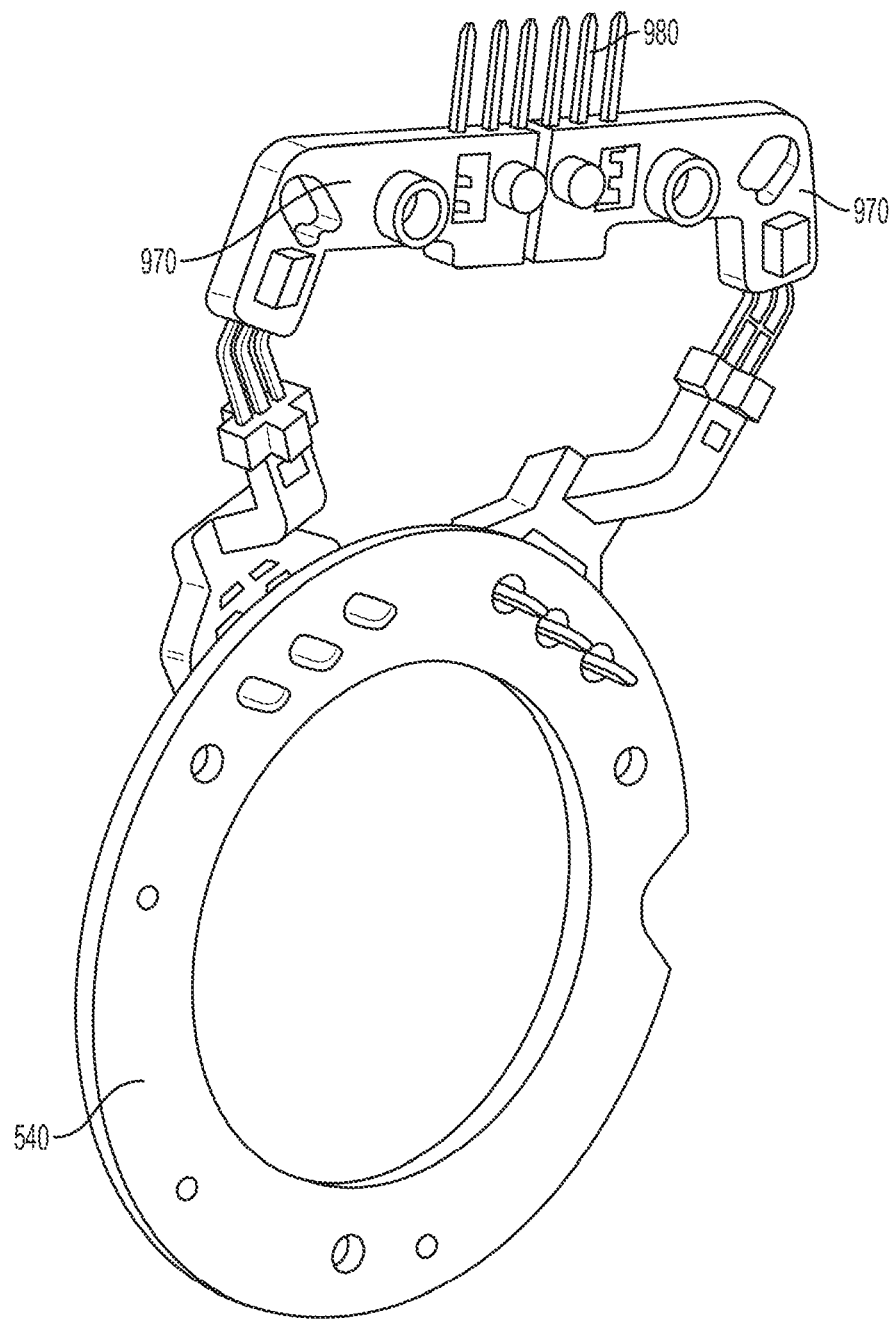
FIG. 39 is a perspective view of a printed circuit board assembly.
Figure 40:
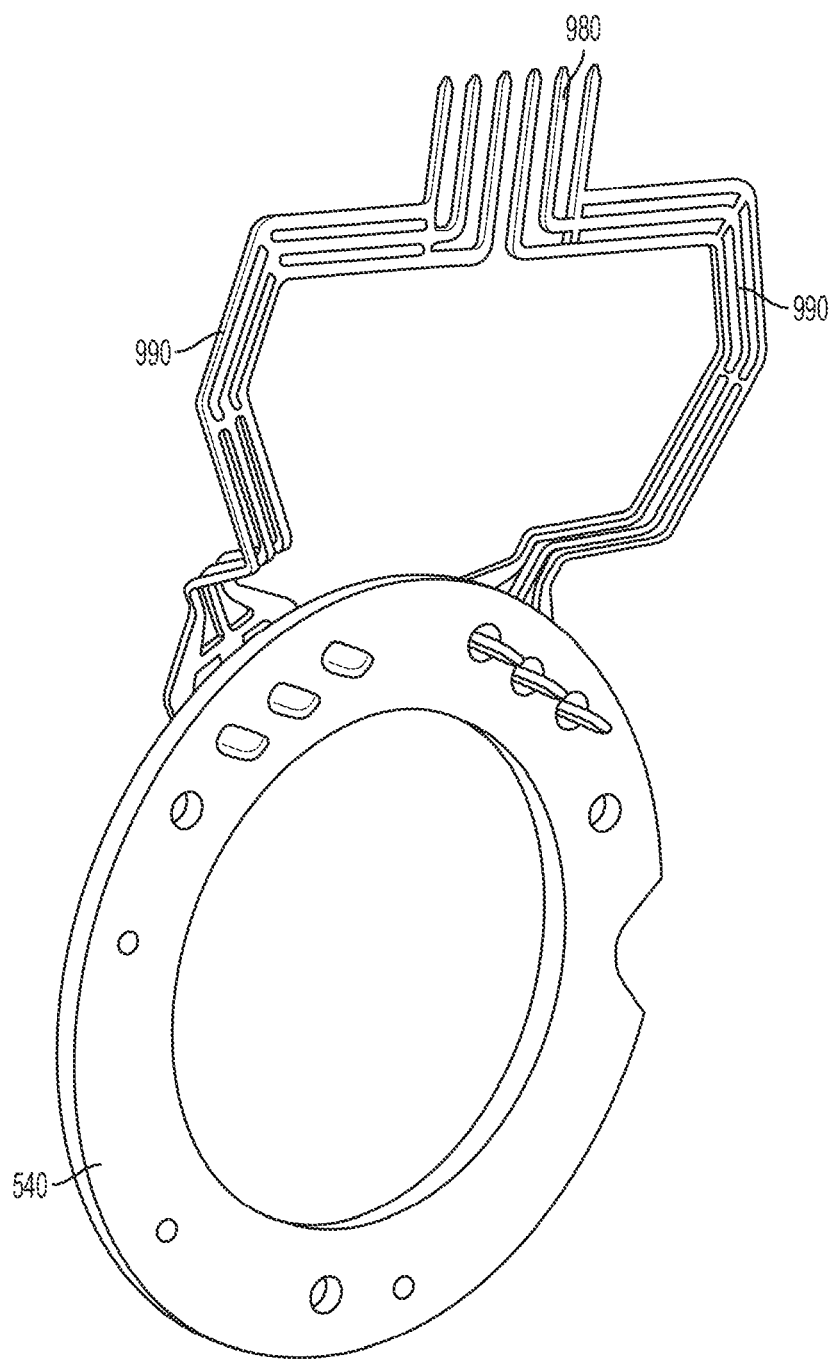
FIG. 40 is another perspective view of the printed circuit board assembly of FIG. 39.

FIGS. 39 and 40 illustrate the position sensor board assembly 540 connection to the motor controller. Connector wires 990 may be provided within the connector arms 970 that extend from the position sensor board assembly 540 to the pins 980. The connector wires 990 may be soldered to the position sensor board assembly 540, for example, in openings of the position sensor board assembly 540. The pins are provided at a sensor terminal block 995 (shown in FIG. 41), which is in turn connected to the motor controller 130 of the power tool 100 (e.g., via a ribbon cable).

Figure 41:
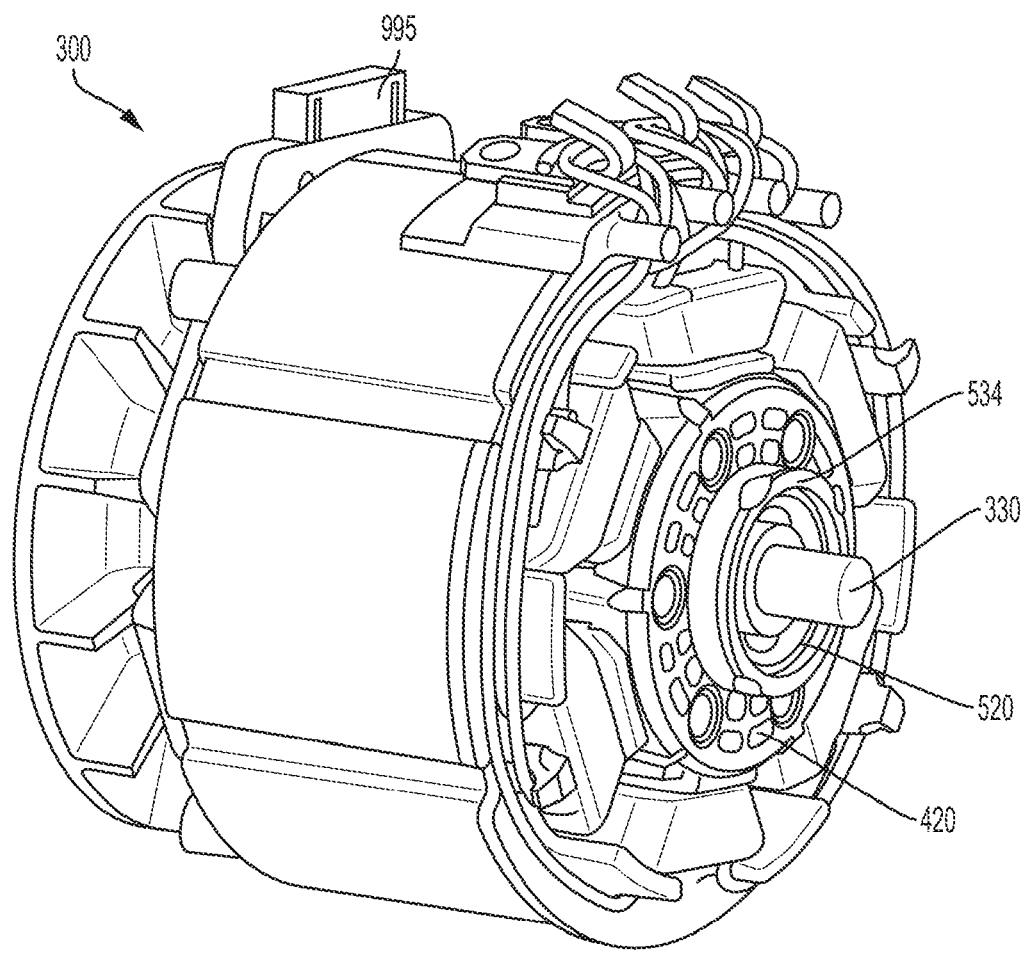
FIG. 41 is a perspective view of a motor incorporated in the power tool of FIG. 1 according to another embodiment.

FIG. 41 illustrates a perspective view of the motor 300 in accordance with some embodiments. As shown, rather than being shared between the front end cap 420 and the gear case 900, the front bearing 520 may be fully or partially recessed within the L-channel 534 of the front end cap 420. In these embodiments, the front bearing 520 is not connected to the gear case 900. The gear case 900 may be mounted similarly as shown in FIGS. 34A and 34B to the front end cap 420.

Figure 42:
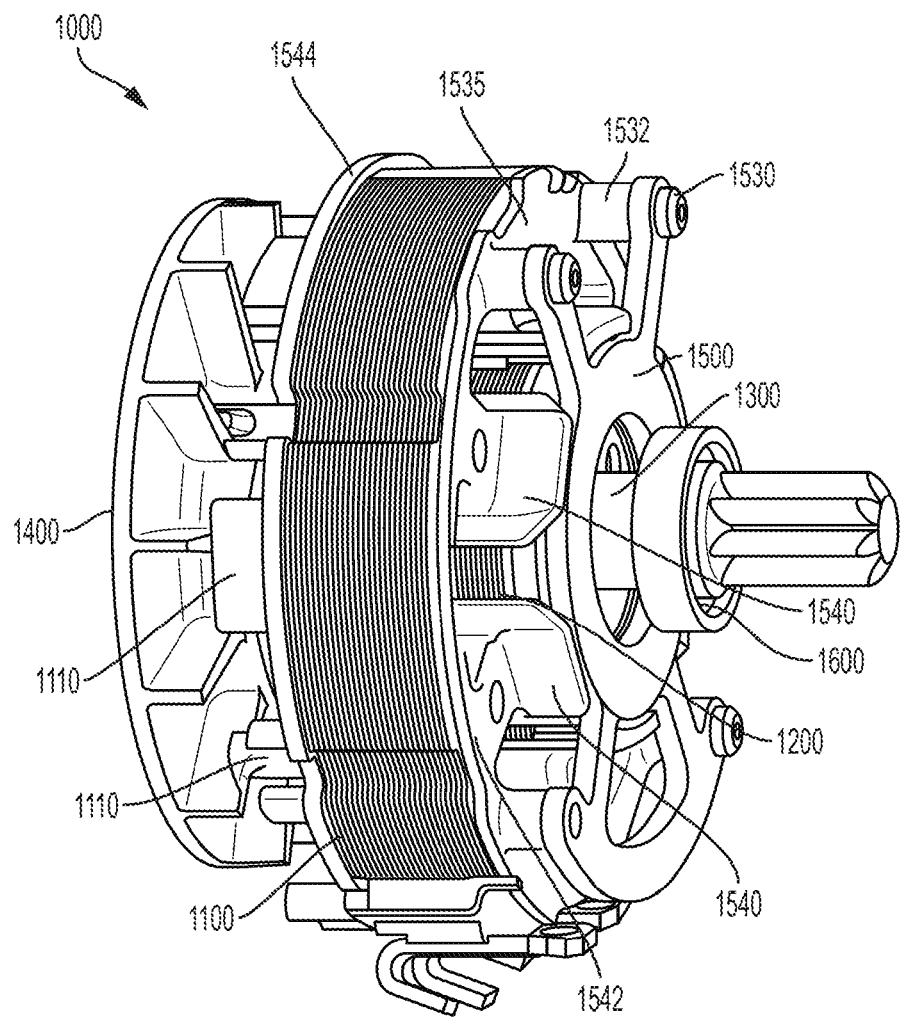
FIG. 42 is a perspective view of a motor incorporated in the power tool of FIG. 1 according to another embodiment.

FIG. 42 is a perspective view of a brushless DC motor 1000 according to another embodiment. Like the motors 200 and 300, the motor 1000 may be incorporated into the tool 100 of FIG. 1 and is an example of the motor 126 in the block diagram of FIG. 2. Additionally, like the motors 200 and 300, the motor 1000 may also be incorporated into other types of power tools, as described above. The motor 1000 includes a stator 1100, a rotor 1200 that drives a shaft 1300, a fan 1400, and a position sensor board assembly 1500. The stator windings are not shown in FIG. 42, but the motor 1000 includes windings similar to the stator windings 370 shown in FIG. 25. The stator 1100 also includes a stator frame 1535 including a front stator end cap 1542 and a rear stator end cap 1544. The front stator end cap 1542 and the rear stator end cap 1544 may be integrally formed as a single piece (i.e., the stator frame 1535) or, alternatively, may be two separate pieces that together form the stator frame 1535. The stator frame 1535 may be formed by an injection molding process, for example, by injecting a resin material into a mold including a stator lamination stack 1550 (see FIG. 47). Accordingly, the stator frame 1535 may be a monolithic structure formed of hardened resin.

The position sensor board assembly 1500 is provided on a front side of the motor 1000 and the fan 1400 is provided on a rear side of the motor 1000. The stator 1100 may be constructed in a similar way as stator 310. However, in some embodiments, rather than routing stator windings on the front side of the stator 1100 (as shown in FIG. 25), the stator windings of motor 1000 may be routed on the rear side of the stator 1100. For example, the stator windings may be routed with the help of the tabs 1110 positioned on the rear stator end cap 1544 of the stator 1100.

Figure 43:
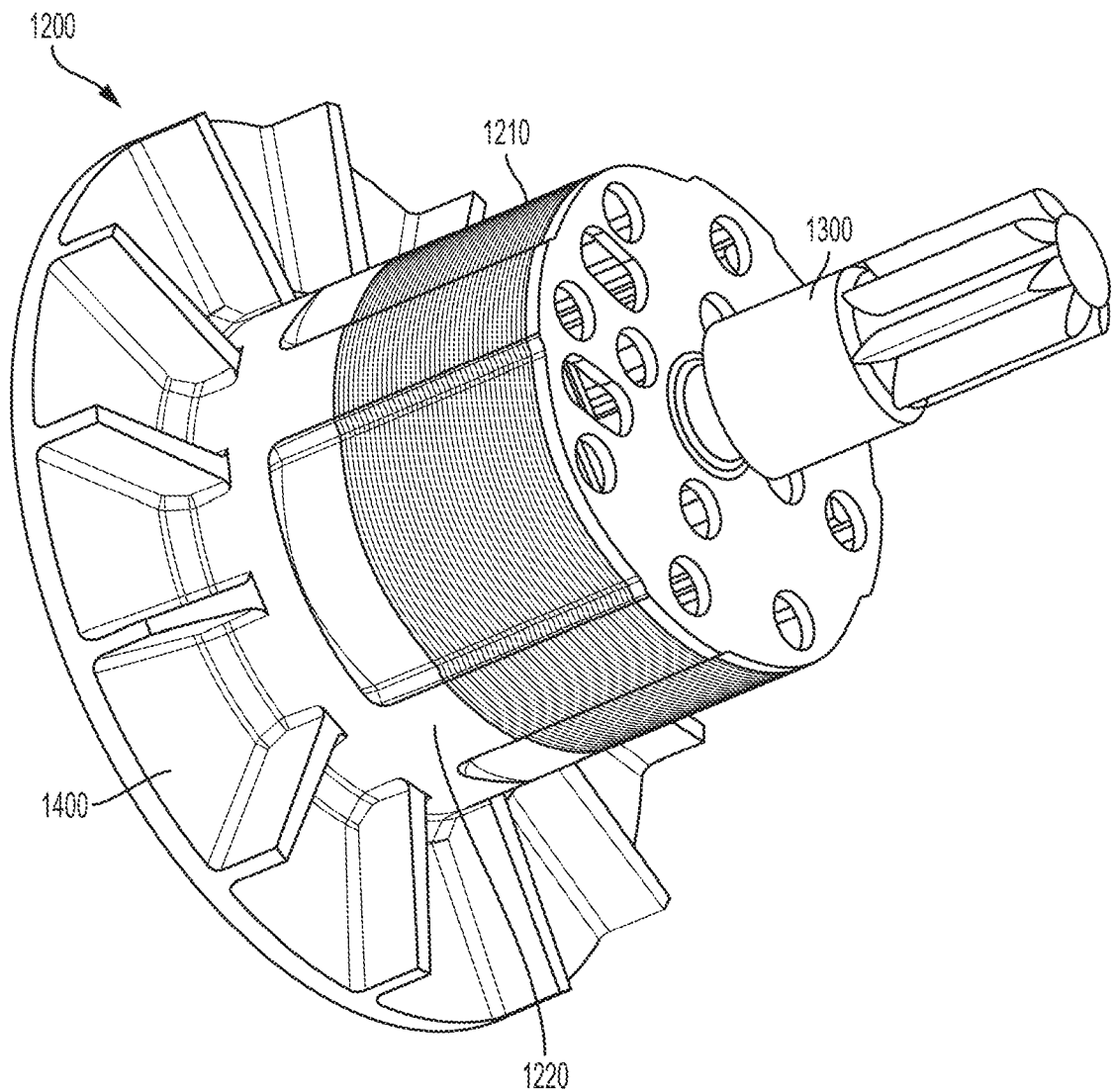
FIG. 43 is a perspective view of a rotor of the motor of FIG. 42.
Figure 44:
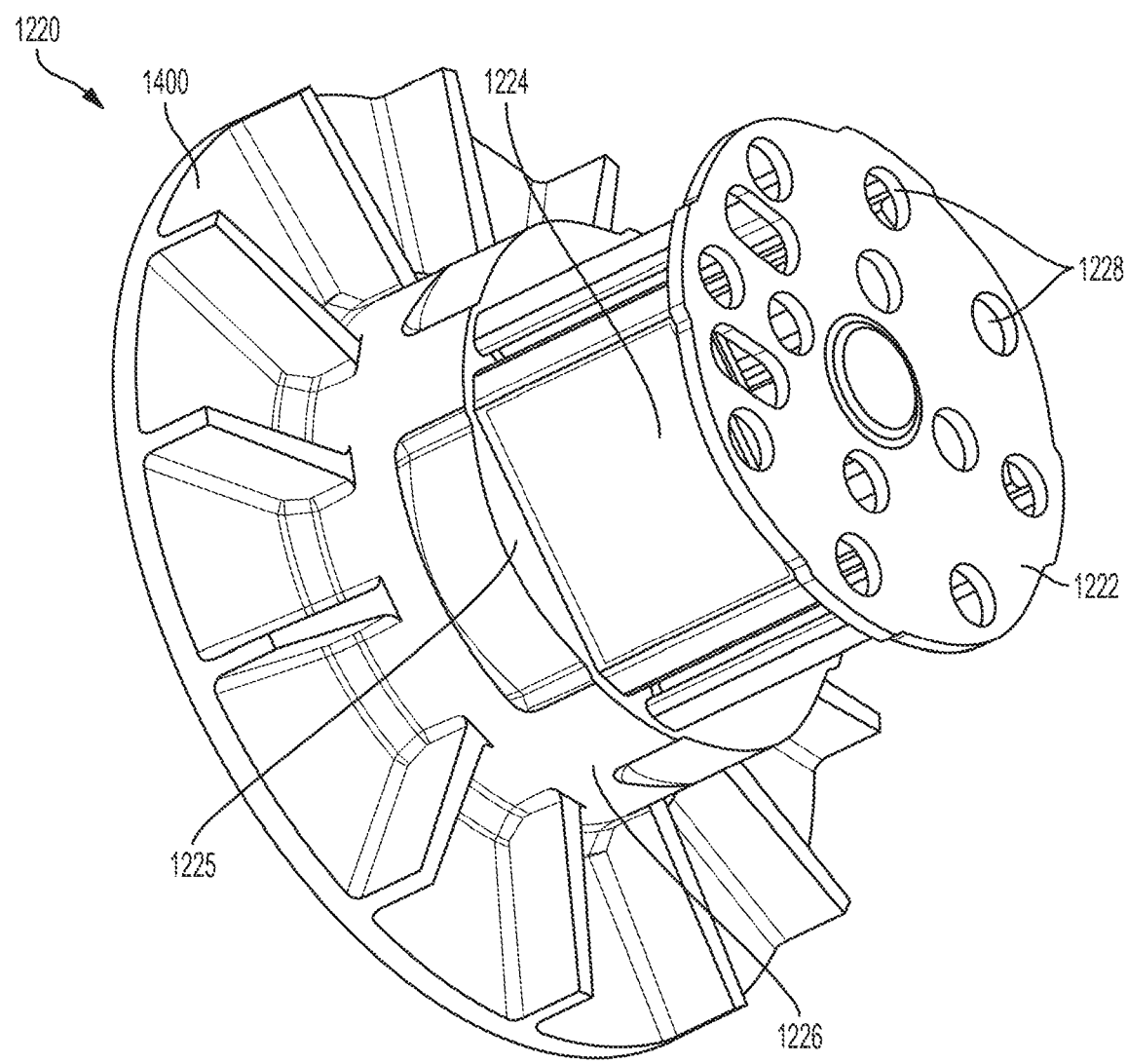
FIG. 44 is a perspective view of a rotor end cap of the rotor of FIG. 43.
Figure 47:
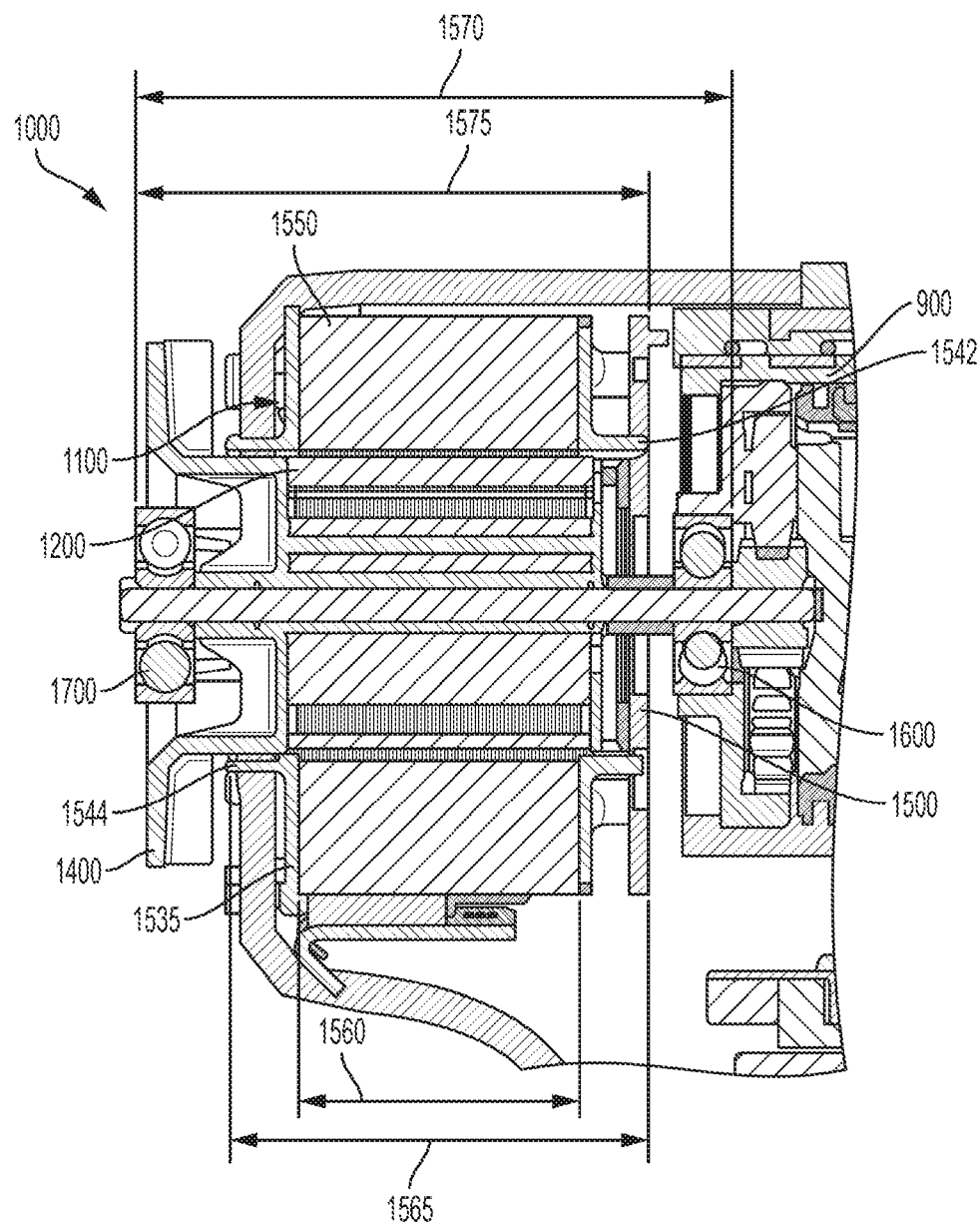
FIG. 47 is a cross section of the motor of FIG. 42.

FIG. 43 is a perspective view of the rotor 1200 and the fan 1400. The rotor 1200 includes a rotor core 1210 and a rotor frame 1220. The rotor core 1210 is made of rotor laminations, which form a rotor stack, and that define a central aperture (see FIG. 47) to receive the shaft 1300 and magnet receiving apertures to receive rotor magnets (see FIG. 47) similar to the rotor core 410 as shown in FIGS. 27 and 32. FIG. 44 is a perspective view of the rotor frame 1220 and the fan 1400. The rotor frame 1220 includes a first face portion 1222 (also referred to as a face plate) provided on a front side of the rotor 1200, a magnet housing portion 1224, and an end portion 1226 provided on a rear side of the rotor 1200 opposite the front side. The end portion 1226 includes a second face portion 1225 and the fan 1400. The first face portion 1222 and the second face portion 1225 house the rotor core 1210 having the rotor laminations. That is, the first face portion 1222 and the second face portion 1225 enclose the rotor lamination stack (i.e., the rotor core 1210) between them. The first face portion 1222 and the second face portion 1226 also retain the rotor magnets in the magnet receiving apertures of the rotor core 1210. The rotor 1200, in contrast to the rotors 202 and 320 above, does not include a separate rotor enclosure with additional end caps. Accordingly, the first face portion 1222 and the second face portion 1225 may be referred to as rotor end caps of the rotor 1200. In contrast to the fixed (non-rotating) configuration of the rotor end caps in the rotors 202 and 320, the first face portion 1220 and the second face portion 1225 rotate with the rotor core 1210. The magnet housing portion 1224 houses the permanent magnets inserted into the rotor core 1210. The magnet housing portion 1224 also extends through the magnet apertures of the rotor core 1210, as shown in FIG. 47.

As can be seen from FIGS. 43 and 44, the rotor frame 1220 is integrally formed with the fan 1400. The rotor frame 1220 and the fan 1400 may be integrally formed during an injection molding process. During the injection molding process, the rotor core 1210 and the rotor magnets may be placed in a die while a plastic or resin material is injected into the die to form the rotor frame 1220 and the fan 1400. Accordingly, the rotor frame 1220 may be a monolithic structure formed of hardened resin. In some embodiments, for example, in the embodiments described with respect to FIGS. 25-42, rather than injection molding to integrally form the fan 1400 with the rotor frame 1220, the fan 1400 may be press-fitted onto the rotor frame 1220.

In some embodiments, the first face portion 1222 may include apertures 1228. The apertures may be provided to balance the motor 1000. The number and placement of the apertures 1228 may be determined during the injection molding process based on the weight and size imbalances of the rotor 1200. In some embodiments, other motor balancing techniques may also be used. In one example, the mold may be modified or calibrated such that certain portions of the fan 1400 or the rotor frame 1220 may be removed to balance the motor 1000. For a particular die, a sample rotor 1200 may be formed using injection molding as described. The sample rotor 1200 may be tested to detect imbalances. Based on the imbalances, projections or posts may be placed in the die to occupy space in the die and prevent injected resin material from forming in that location, resulting in the apertures 1228. In another example, the apertures 1228 may be formed by scraping away or otherwise removing material from the resin-formed portions of the rotor 1200 after the injection molding process. In some embodiments, the plastic or resin material may be injected into the magnet receiving apertures such that the plastic or resin material pushes the rotor magnets frontward and outward within the magnet receiving apertures for even distribution, reducing imbalances.

Figure 45:
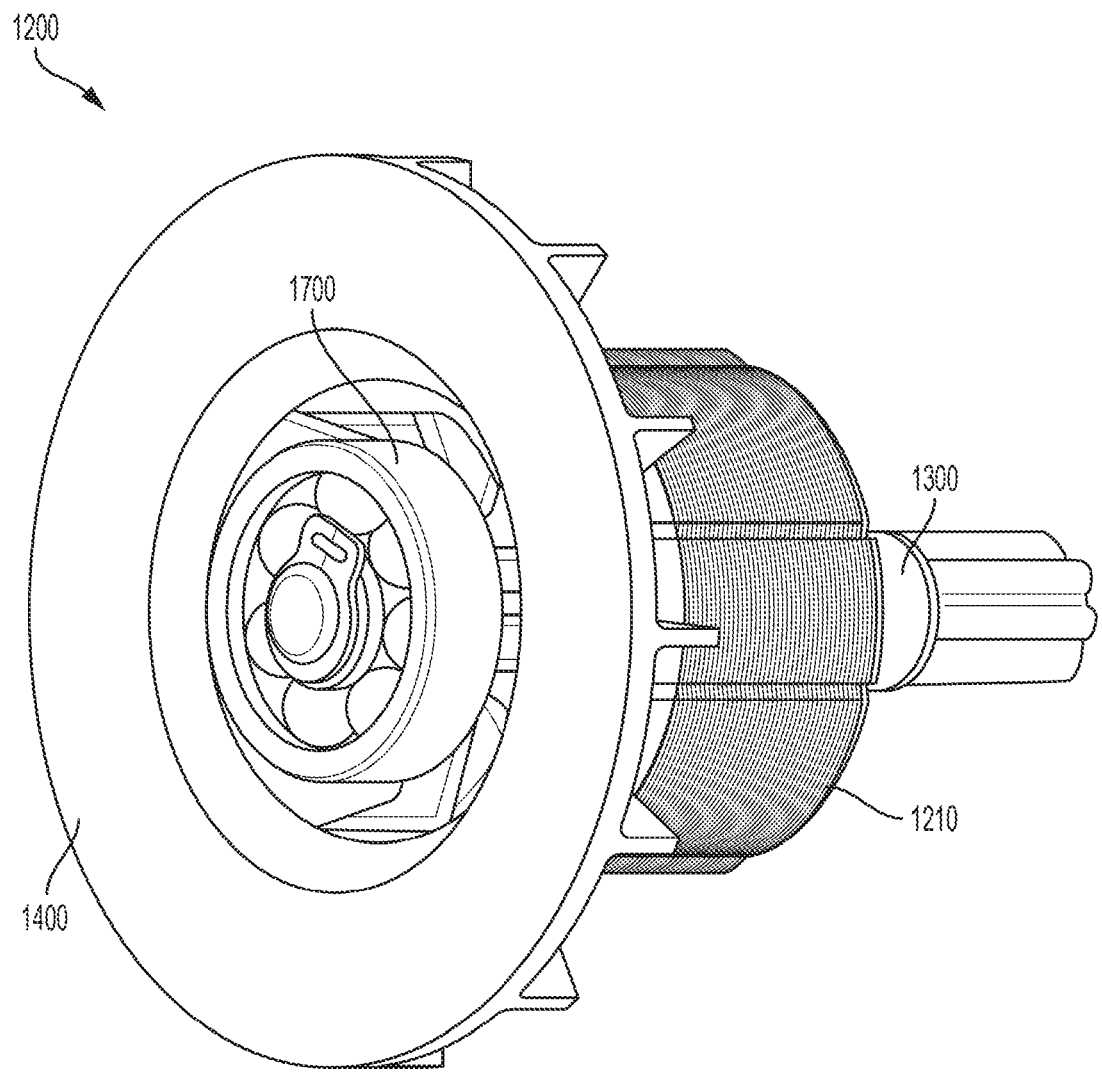
FIG. 45 is a rear perspective view of the rotor of FIG. 42.

Returning to FIG. 42, the motor 1000 also includes a front bearing 1600 that rotatably couples the shaft 1300 to the gear case 900. As such, the front bearing 1600 fixes the motor 1000 to the gear case 900. Referring to FIG. 45, the motor 1000 also includes a rear bearing 1700 provided in a rear opening of the fan 1400. The outer race of the rear bearing 1700 may be positioned within a recess located at the rear of the power tool housing 102 to secure the motor 1000 within the power tool 100.

Figure 46:
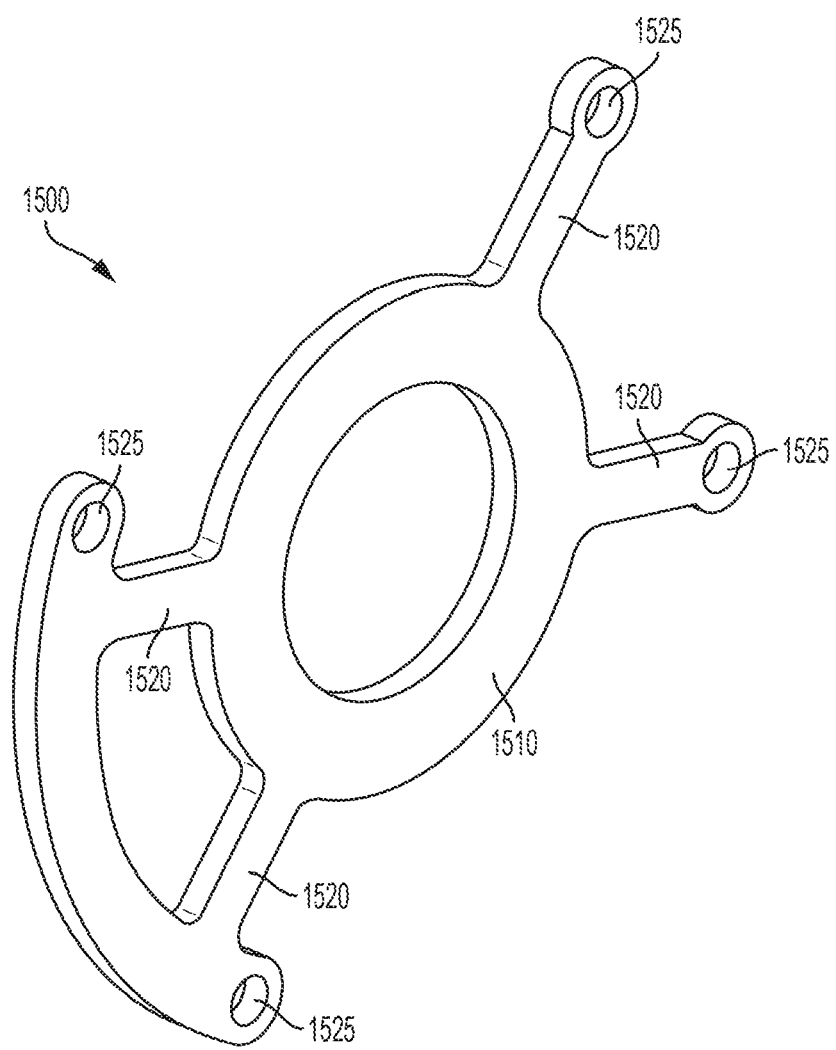
FIG. 46 is a perspective view of a position sensor board assembly of the motor of FIG. 42.

FIG. 46 illustrates the position sensor board assembly 1500. The position sensor board assembly 1500 includes an annular portion 1510 (also referred to as an annular board portion) with legs 1520 extending radially outward from the annular portion 1510. The position sensor board assembly 1500 includes the Hall sensors 128 (or other position sensors) (see FIG. 2) to detect one or more of the rotational position, velocity, and acceleration of the motor 1000. Returning to FIG. 42, fasteners 1530 extend through holes 1525 in the legs 1520 into fastener mounts 1532 (see FIG. 42) of a stator frame 1535 of the stator 1100 to fix the position sensor board assembly 1500 to the stator 1100. The legs 1520 are circumferentially positioned on the annular portion 1510 to align with gaps between adjacent stator end cap teeth 1540 such that the legs 1520 extend through the gaps between adjacent stator end cap teeth 1540. This alignment, and the annular portion 1510 having a diameter that is less than inner diameter of the stator frame 1535, enables the position sensor board assembly 1500 to be positioned closer to the rotor 1200 and within a stator envelope 1565 (see FIG. 47). This positioning enables the Hall sensors 128 to be closer to the rotor magnets and reduces the axial length of the motor 1000.

Figure 55:
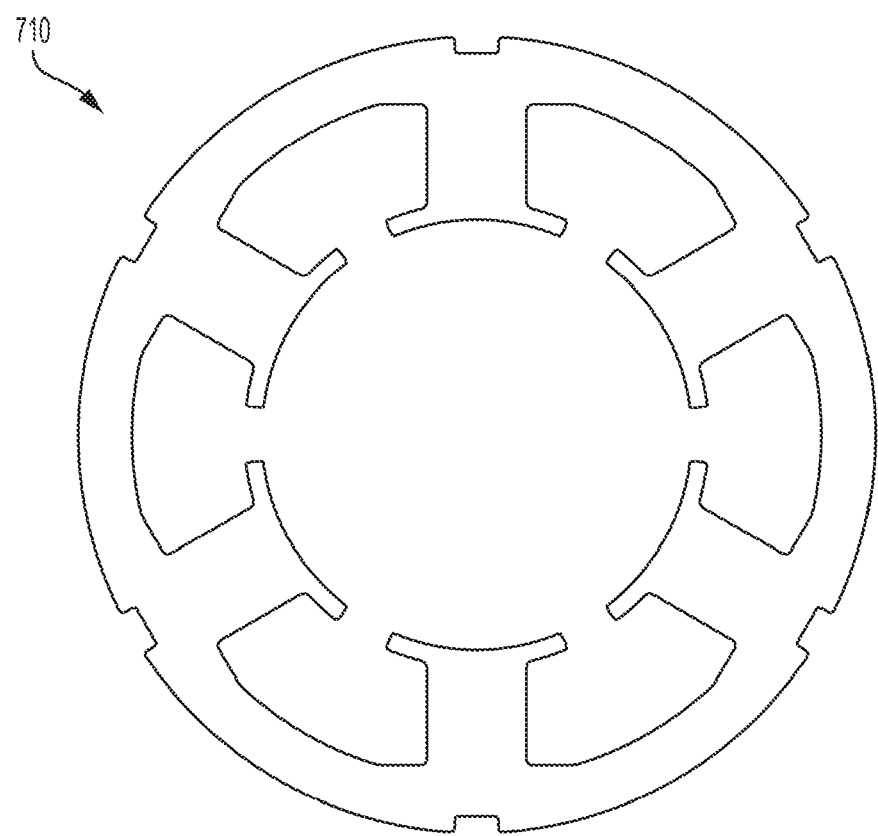
FIG. 55 is a plan view of a stator lamination according to one embodiment.

FIG. 47 is a cross-sectional view of the motor 1000. In the illustrated embodiment, the stator 1100 includes a stator lamination stack 1550 having a predetermined number of stator laminations 710. FIG. 55 illustrates one embodiment of a stator lamination 710 that may be included in the stators 238, 310, 1100 of the motors 200, 300, and 400 respectively. Returning to FIG. 47, the stator laminations 710 together define a stack length 1560 in the axial direction extending between axial ends of the stator lamination stack 1550. FIG. 47 also illustrates the stator envelope 1565 of the motor 1000, which extends between the axial ends of the stator frame 1535 (i.e., between the axial end faces of the front stator end cap 1542 and the rear stator end cap 1544). In some embodiments, the position sensor board assembly 1500, the first face portion 1222, and the second face portion 1225 are within the stator envelope 1565, while the end portion 1226 is partially within and partially outside the stator envelope 1565. The front bearing 1600 and the rear bearing 1700 may be located outside the stator envelope 1565.

In addition, the front bearing 1600 and the rear bearing 1700 define a bearing-to-bearing length 1570 in the axial direction between the axial ends of the front bearing 1600 and the rear bearing 1700. Further, the position sensor board assembly 1500 and the rear bearing 1700 define a bearing-to-board length 1575 in the axial direction between the axial ends of the position sensor board assembly 1500 and the rear bearing 1700. A bearing-to-board length, such as the bearing-to-board length 1575, describes the distance between a bearing and position sensor board assembly that are located on axially opposite sides of a motor. In some embodiments, the stator 1100 (including the stator frame 1535), the rotor 1200, the rotor frame 1220, the fan 1400, the position sensor board assembly 1500, the front bearing 1600, and the rear bearing 1700 may be located entirely within the bearing-to-bearing length 1570. In some embodiments, the stator 1100 (including the stator frame 1535), the rotor 1200, the rotor frame 1220, the fan 1400, the position sensor board assembly 1500, and the rear bearing 1700 may be entirely within the bearing-to-board length 1575, while the front bearing 1600 may be (either partially or entirely) outside the bearing-to-board length 1575.

In some embodiments, the bearing-to-bearing length 1570 is 51.5 millimeters and the bearing-to-board length 1575 is 44.5 millimeters. However, these lengths vary based on the stack length 1560. The stack length 1560 may vary for each motor 1000 based on the desired motor characteristics. For example, the stack length 1560 may vary between about 10 millimeters and 45 millimeters based on the output requirements of the motor 1000. In some embodiments, a difference between the bearing-to-bearing length 1570 and the stack length 1560 is 27.5 millimeters or less than 27.5 millimeters. In some embodiments, the difference between the bearing-to-bearing length 1570 and the stack length 1560 is less than 26.5 millimeters, less than 28.5 millimeters, less than 29.5 millimeters, less than 30.5 millimeters, between 25.5 millimeters and 30.5 millimeters, between 25.5 millimeters and 27.5 millimeters, between 27.5 millimeters and 30.5 millimeters, between 26.5 millimeters and 28.5 millimeters, or another range between 25.5 millimeters and 30.5 millimeters. This difference may be adjusted in the range, for example, by reducing the axial thickness of one or both of the bearings 1600, 1700 or of the end portion 1226. In the context of a measurement range herein, such as, "between 25.5 millimeters and 28.5 millimeters," the term "between" is intended to include values that are greater than or equal to the lower endpoint and that are less than or equal to the upper endpoint. Accordingly, as an example, 25.5 millimeters is considered to be between 25.5 millimeters and 28.5 millimeters. In some embodiments, a difference between the bearing-to-board length 1575 and the stack length 1560 is 20.5 millimeters or less than 20.5 millimeters. In some embodiments, a difference between the bearing-to-board length 1575 and the stack length 1560 is less than 19.5 millimeters, less than 21.5 millimeters, less than 22.5 millimeters, less than 23.5 millimeters, between 18.5 millimeters and 23.5 millimeters, between 20.5 millimeters and 23.5 millimeters, between 19.5 millimeters and 21.5 millimeters, or another range between 18.5 millimeters and 23.5 millimeters. This difference may be adjusted in the range, for example, by reducing the axial thickness of the bearing 1700 or of the end portion 1226.

In some embodiments, the bearing-to-bearing length 1570 may be in a range of 30 millimeters to 60 millimeters, depending on the stack length 1560, an axial fan length of the fan 1400, and a board thickness (in the axial direction) of the position sensor board assembly 1500. Here, a difference between the bearing-to-bearing length 1570 and a sum of the stack length 1560, the axial fan length of the fan 1400, and the board thickness of the position sensor board assembly 1500 is 15 millimeters or less than 15 millimeters. In some embodiments, this difference is less than 14 millimeters, less than 16 millimeters, less than 17 millimeters, less than 18 millimeters, less than 19 millimeters, less than 20 millimeters, between 13 millimeters and 15 millimeters, between 15 millimeters and 20 millimeters, between 14 millimeters and 16 millimeters, between 13 millimeters and 18 millimeters, or another range between 13 millimeters and 20 millimeters. This difference may be adjusted in the range, for example, by reducing the axial thickness of one or both of the bearings 1600, 1700. Thus, the configuration of the embodiments provides an axially compact motor design.

Figure 48:
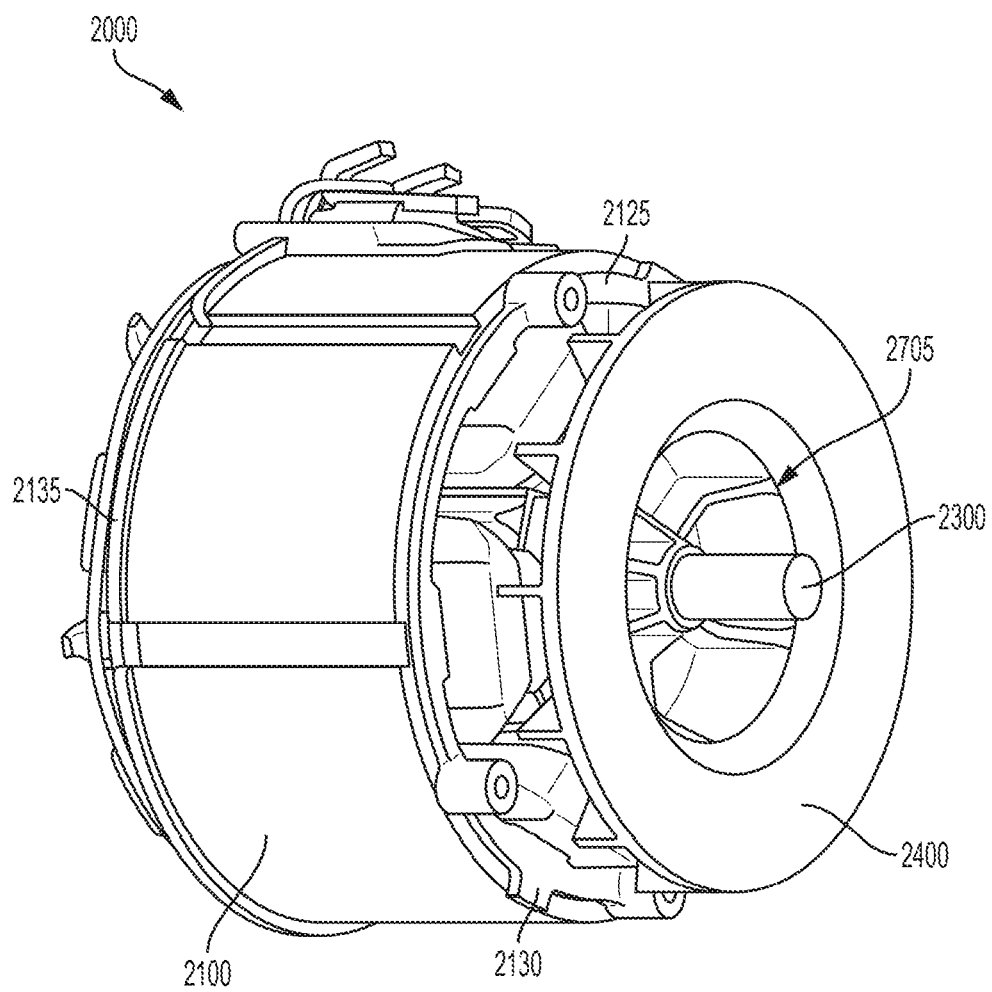
FIG. 48 is a perspective view of a motor incorporated in the power tool of FIG. 1 according to another embodiment.
Figure 49:
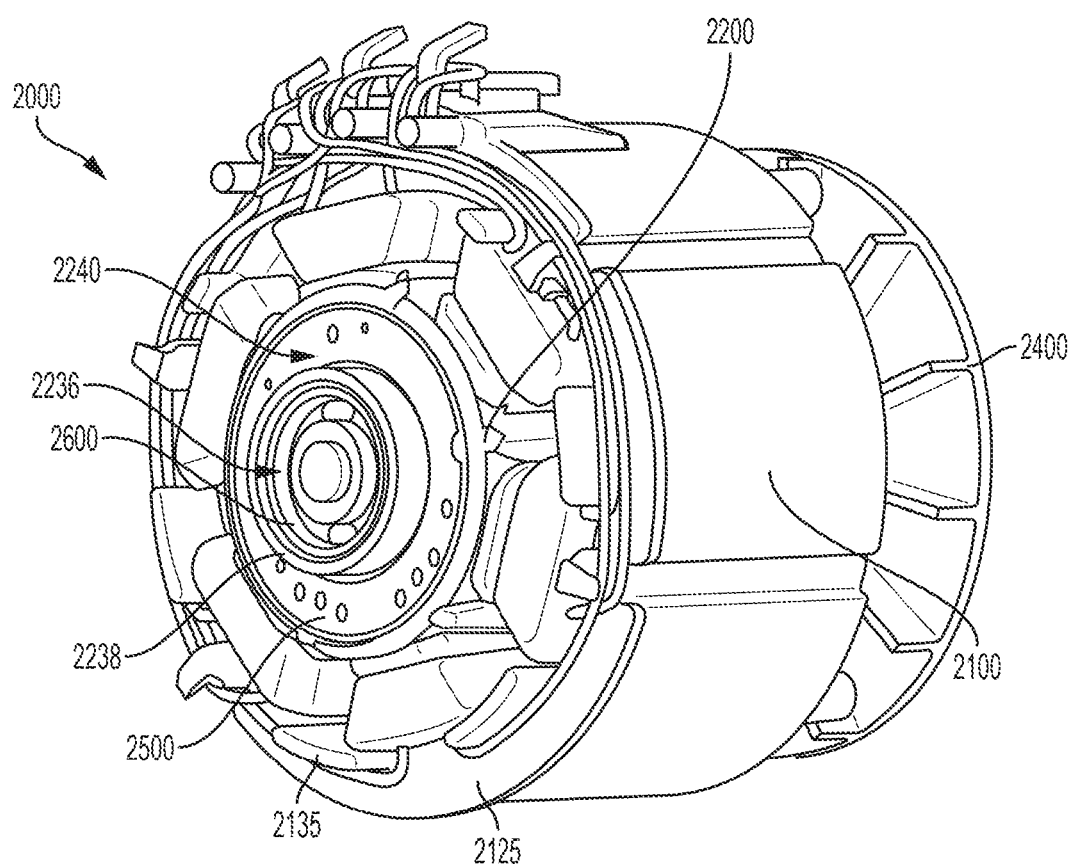
FIG. 49 is a rear perspective view of the motor of FIG. 48.

FIGS. 48 and 49 are front and rear perspective views of a brushless DC motor 2000 according to another embodiment. Like the motors 200, 300, 1000, the motor 2000 may be incorporated into the tool 100 of FIG. 1 and is an example of the motor 126 in the block diagram of FIG. 2. Additionally, like the motors 200, 300, 1000, the motor 2000 may also be incorporated into other types of power tools, as described above. The motor 2000 includes a stator 2100, a rotor 2200 that drives a shaft 2300, a fan 2400, and a position sensor board assembly 2500. The motor 2000 may be constructed similar to the motor 200, however, the position sensor board assembly 2500 is provided on a rear side of the motor 2000 and the fan 2400 is provided on a front side of the motor 2000. The stator 2100 may be constructed in a similar way as stator 1100. The stator 2100 also includes a stator frame 2125 including a front stator end cap 2130 and a rear stator end cap 2135. The front stator end cap 2130 and the rear stator end cap 2130 may be integrally formed as a single piece (i.e., the stator frame 2125) or, alternatively, may be two separate pieces that together form the stator frame 2125. The stator frame 2125 may be formed by an injection molding process, for example, by injecting a resin material into a mold including a stator lamination stack 2105 (see FIG. 53). Accordingly, the stator frame 2125 may be a monolithic structure formed of hardened resin.

Figure 50:
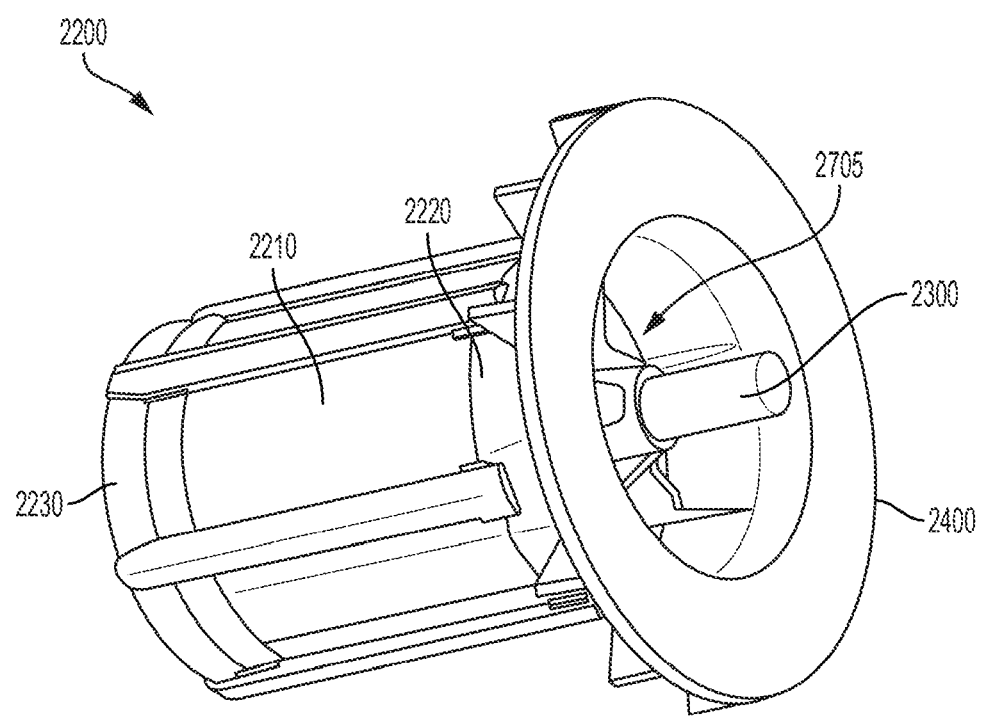
FIG. 50 is a perspective view of a rotor of the motor of FIG. 48.
Figure 51:
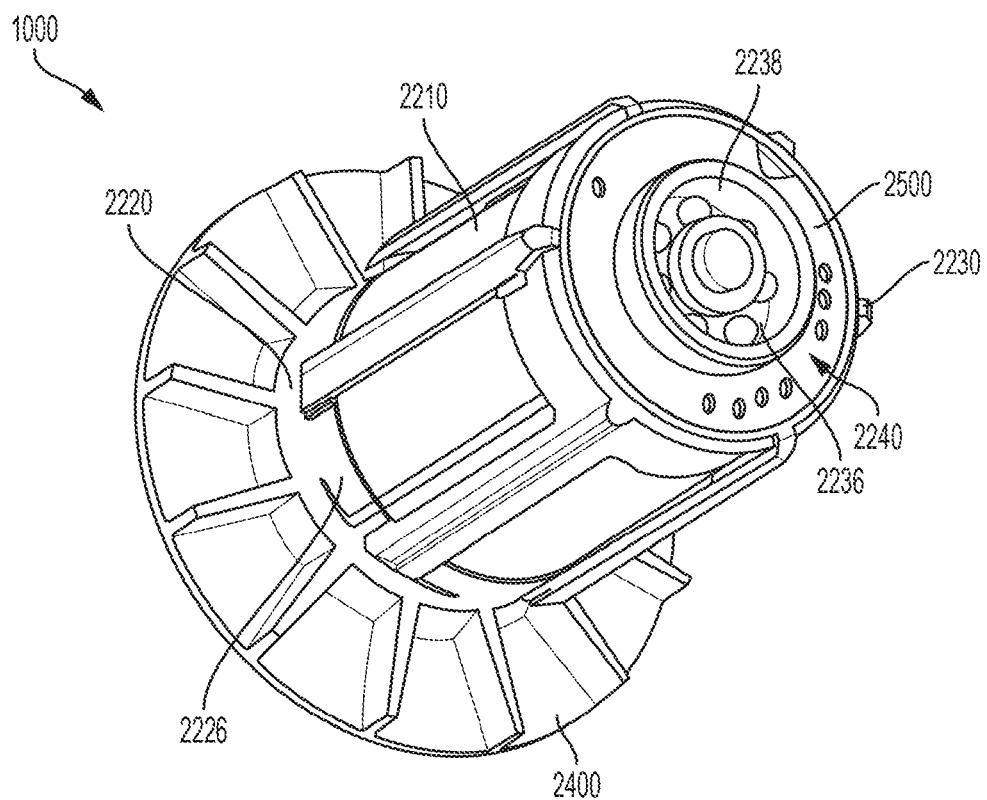
FIG. 51 is a rear perspective view of the rotor of FIG. 50.
Figure 52:
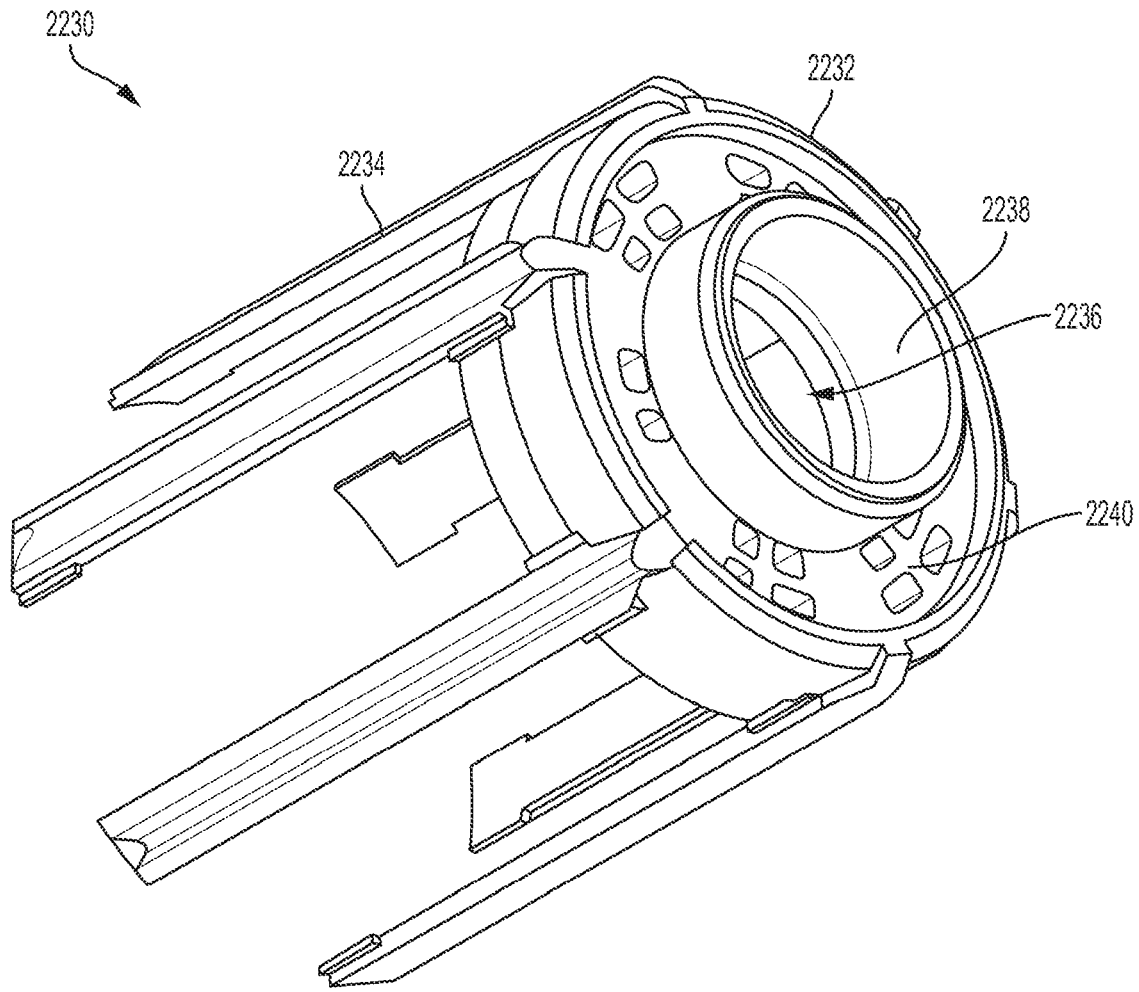
FIG. 52 is a perspective view of a rotor end cap of the rotor of FIG. 50.

FIGS. 50 and 51 are front and rear perspective views of the rotor 2200 and the fan 2400. The rotor 2200 includes a rotor core 2210, a rotor frame 2220, and a rotor end cap 2230. The rotor core 2210 is similar to the rotor core 1210 and includes rotor laminations that form a rotor stack that retains rotor magnets in magnet apertures and the motor shaft 2300 in a central aperture. The rotor frame 2220 is constructed similar to the rotor frame 1220 (as shown in FIG. 44) including a first face portion 2222, a magnet housing portion 2224, and an end portion 2226 integrally formed during an injection molding process, where the end portion 2226 includes the fan 2400. Accordingly, the rotor frame 2220 may be a monolithic structure formed of hardened resin. However, the first face portion 2222 (also referred to as a face plate) is provided on a rear side of the rotor 2200 and the end portion 2226 is provided on a front side of the rotor 2200. The end portion 2226 further includes a second face portion 2225. The first face portion 2222 and the second face portion 2225 abut opposite axial ends of the rotor stack and retain the magnets within the magnet apertures of the rotor stack. Similar to the second face portion 1225, the second face portion 2225 may be referred to as a rotor end cap (e.g., a front rotor end cap), which rotates with the rotor core 2210. Similar to the other fans disclosed herein, the fan 2400 is rotated when the rotor is driven to generate an airflow used to cool, for example, the motor 2000 and other tool components. FIG. 52 is a perspective view of the rear rotor end cap 2230. The rotor end cap 2230 includes an annular portion 2232 and end cap legs 2234 extending axially from the annular portion 2232. Similar to the legs 440, end cap legs 2234 close the gaps between adjacent stator teeth, at an inner radial end of the stator 2100, and provide a sealed air-gap for the rotor core 2210 (see gaps 730, stator teeth 345, and sealed air-gap 870 in FIGS. 32 and 33). The end cap legs 2234 extend along the length of the rotor core 2210 and terminate at the rear stator end cap 2135.

The rotor end cap 2230 also includes a recess in the form of an annular channel 2240 within the annular portion 2232 to house the position sensor board assembly 2500. Hall sensors 128 are attached to a motor-facing side of the position sensor board assembly 2500 facing the rotor core 2210. As described above with respect to motor 200, the annular channel 2240 has a diameter that is less than an inner diameter of the stator frame 2125. The position sensor board assembly 2500 may be constructed similar to the position sensor board assembly 540. In addition, the rotor end cap 2230 of the rotor 2200 includes an opening 2236 for a rear bearing. More particularly, the rotor end cap 2230 includes the opening 2236 with an L-shaped channel (L-channel) 2238 to receive a rear bearing 2600 (see FIG. 53). The L-channel 2238 extends partially outward from the rear axial end of the annular channel 2240. As such, the rear bearing 2600 is located partially within a stator envelope 2120 (see FIG. 53) and partially outside the stator envelope 2120 of the motor 2000. The rear bearing 2600 rotatably couples the rotor end cap 2230 to the shaft 2300. The outer race of the rear bearing 2600 may be positioned within a recess located at the rear of the power tool housing 102 to secure the motor 1000 within the power tool 100.

Figure 53:
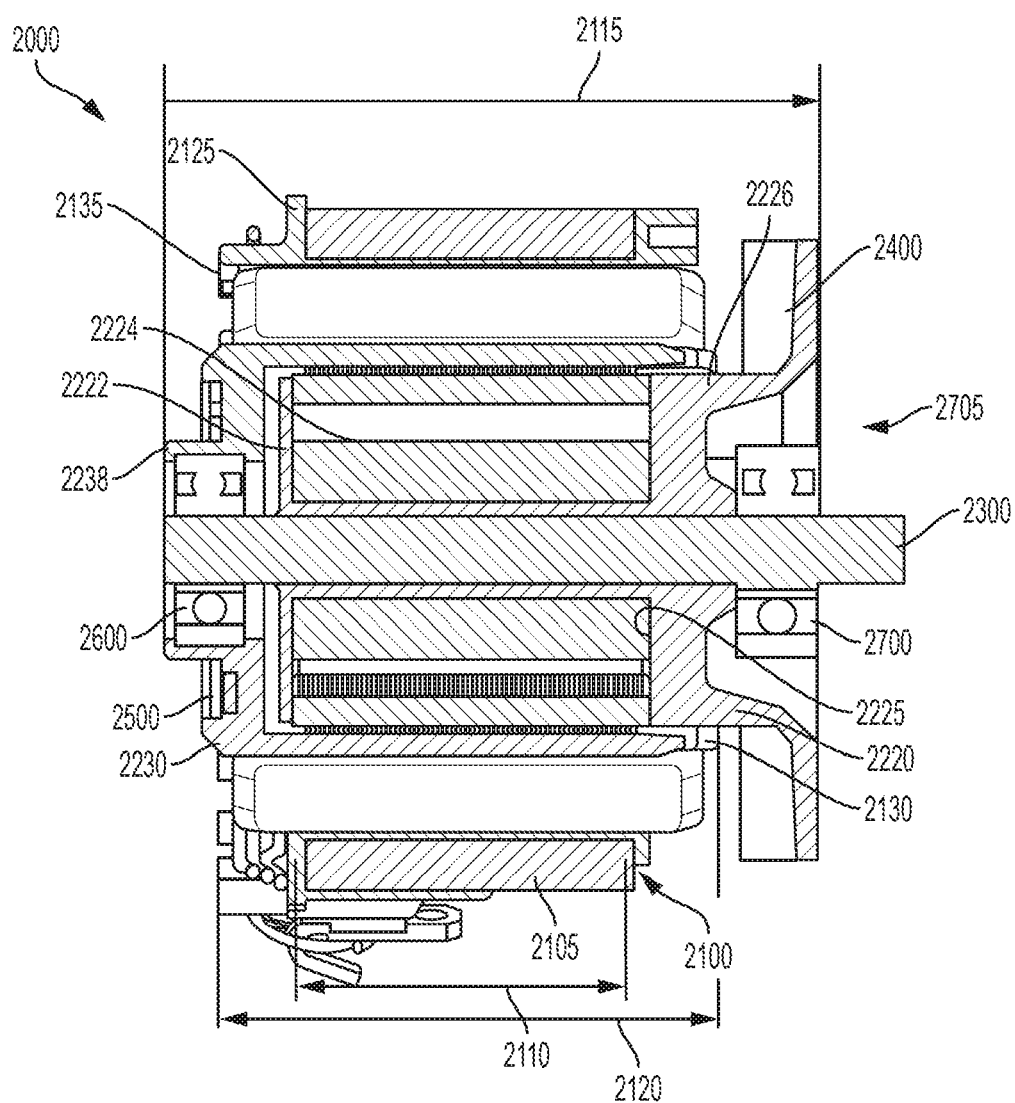
FIG. 53 is a cross section of the motor of FIG. 42.

FIG. 53 is a cross-sectional view of the motor 2000. The motor 2000 may also include a front bearing 2700 in a front opening 2705 of the fan 2400 that rotatably couples the shaft 2300 to the gear case 900. FIG. 53 also illustrates the stator envelope 2120 of the motor 2000, which extends between the axial ends of the stator frame 2125 (i.e., between the axial end faces of the front stator end cap 2130 and the rear stator end cap 2135). In some embodiments, the first face portion 2222 and the second face portion 2225 may be entirely within the stator envelope 2120, while the end portion 1226 may be partially within and partially outside the stator envelope 2120. In some embodiments, the rear bearing 2600, the L-channel 2238, the rotor end cap 2230, and the position sensor board assembly 2500 (including the Hall sensors 128) may be partially within and partially outside the stator envelope 2120. In some embodiments, the position sensor board assembly 2500 including the Hall sensors 128 may be entirely within the stator envelope 2120. In some embodiments, the Hall sensors 128 may be entirely within the stator envelope 2120 while the position sensor board assembly 2500 may be partially within and partially outside the stator envelope 2120. In some embodiments, the Hall sensors 128 may be partially within and partially outside the stator envelope 2120, while the position sensor board assembly 2500 may be entirely outside the stator envelope 2120. In some embodiments, the Hall sensors 128 may be entirely within the stator envelope 2120 while the position sensor board assembly 2500 may be entirely outside the stator envelope 2120. The front bearing 2700 may be entirely outside the stator envelope 2120.

In the illustrated embodiment, the stator 2100 includes a stator lamination stack 2105 having a predetermined number of stator laminations 710. FIG. 55 illustrates one embodiment of the stator lamination 710 that may be included in the stator 2100 of the motor 2000. The stator lamination stack 2105 defines a stack length 2110 in the axial direction extending between axial ends of the stator lamination stack 2105. In addition, the front bearing 2700 and the rear bearing 2600 define a bearing-to-bearing length 2115 in the axial direction between the axial ends of the front bearing 2700 and the rear bearing 2600. In some embodiments, the bearing-to-bearing length 2115 is 47.95 millimeters. However, this length varies based on the stack length 2110. The stack length 2110 may vary for each motor 2000 based on the desired motor characteristics. For example, the stack length 2110 may vary between about 10 millimeters and 45 millimeters based on the output requirements of the motor 2000. In some embodiments, the stator 2100 (including the stator frame 2125), the rotor 2200, the rotor frame 2220, the rotor end cap 2230, the fan 2400, the position sensor board assembly 2500, the front bearing 2700, and the rear bearing 2600 may be located entirely within the bearing-to-bearing length 2115. In some embodiments, a difference between the bearing-to-bearing length 2115 and the stack length 2110 is 24 millimeters or is less than 24 millimeters. In some embodiments, the difference between the bearing-to-bearing length 2115 and the stack length 2110 is less than 23 millimeters, less than 25 millimeters, less than 26 millimeters, less than 27 millimeters, between 22 millimeters and 24 millimeters, between 22 millimeters and 27 millimeters, between 24 millimeters and 27 millimeters, between 23 millimeters and 25 millimeters, or another range between 22 millimeters and 27 millimeters. This difference may be adjusted in the range, for example, by reducing the axial thickness of one or both of the bearings 2600,2700, or of the end portion 2226.

In some embodiments, the bearing-to-bearing length 2115 may be in a range of 27 millimeters to 60 millimeters, depending on the stack length 2110, an axial fan length of the fan 2400, and a board thickness (in the axial direction) of the position sensor board assembly 2500. Here, a difference between the bearing-to-bearing length 2115 and a sum of the stack length 2110, the axial fan length of the fan 2400, and the board thickness of the position sensor board assembly 2500 is 12 millimeters or less than 12 millimeters. In some embodiments, this difference is less than 11 millimeters, less than 13 millimeters, less than 14 millimeters, less than 15 millimeters, less than 16 millimeters, less than 20 millimeters, between 10 millimeters and 12 millimeters, between 12 millimeters and 20 millimeters, between 11 millimeters and 13 millimeters, between 11 millimeters and 18 millimeters, or another range between 11 millimeters and 20 millimeters. This difference may be adjusted in the range, for example, by reducing the axial thickness of one or both of the bearings 2600,2700. Thus, the configuration of the embodiments provides an axially compact motor design.

Figure 54:
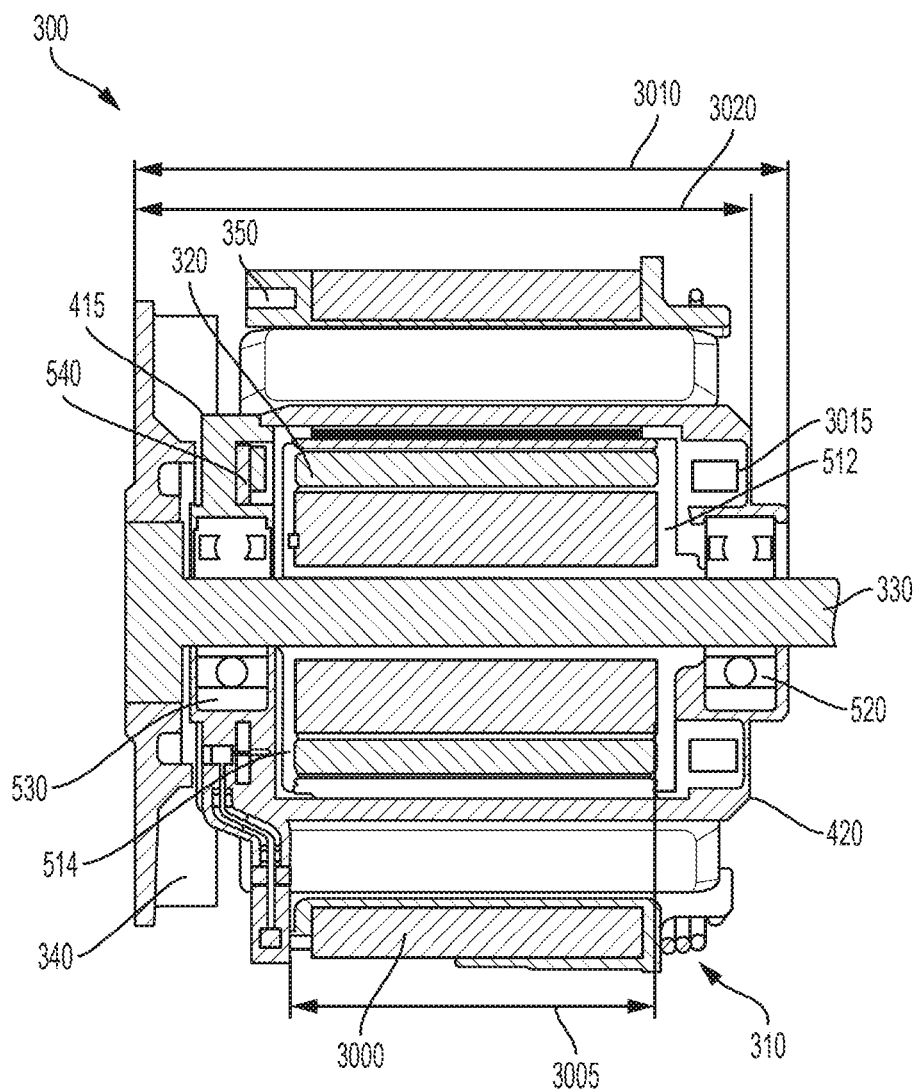
FIG. 54 is a cross section of a motor incorporated in the power tool of FIG. 1 according to another embodiment.

FIG. 54 is another cross-sectional view of the motor 300. In the illustrated embodiment, the stator 310 includes stator lamination stack 3000 having a predetermined number of stator laminations 710. The stator lamination stack 3000 defines a stack length 3005 in the axial direction extending between axial ends of the stator lamination stack 3000. In addition, the front bearing 520 and the fan 340 define a bearing-to-fan length 3010 in the axial direction between the axial ends of the front bearing 520 and the fan 340. Further, the fan 340 and a front face 3015 of the front end cap 420 define a fan-to-end cap length 3020 in the axial direction between the axial ends of the fan 340 and the front face 3015 of the front end cap 420. As illustrated, the front face 3015 is axially inward, closer to the rotor laminations, than the axial end of front the bearing 520.

In some embodiments, the bearing-to-fan length 3010 is 47.5 millimeters and the fan-to-end cap length 3020 is 44.5 millimeters. However, these lengths vary based on the stack length 3005. The stack length 3005 may vary for each motor 300 based on the desired motor characteristics. For example, the stack length 3005 may vary based on the output requirements of the motor 300. In some embodiments, the stator 310 (including the stator frame 350), the rotor 320, the rotor enclosure 415, the fan 340, the position sensor board assembly 540, the front bearing 520, and the rear bearing 530 may be located entirely within the bearing-to-fan length 3010. In some embodiments, the stator 310 (including the stator frame 350), the rotor core 410, the first face portion 512, the second face portion 514, the fan 340, the position sensor board assembly 540, and the rear bearing 530 may be located entirely within the fan-to-end cap length 3020, while the L-channel 534 and the front bearing 520 may be located partially within and partially outside the fan-to-end cap length 3020. In some embodiments, a difference between the bearing-to-fan length 3010 and the stack length 3005 is 23.5 millimeters or less than 23.5 millimeters. In some embodiments, the difference between the bearing-to-fan length 3010 and the stack length 3005 is less than 22.5 millimeters, less than 24.5 millimeters, less than 25.5 millimeters, less than 26.5 millimeters, between 21.5 millimeters and 23.5 millimeters, between 23.5 millimeters and 25.5 millimeters, between 22.5 millimeters and 24.5 millimeters, or another range between 22.5 millimeters and 26.5 millimeters. This difference may be adjusted in the range, for example, by reducing the axial thickness of one or both of the bearings 520,530, of the fan 340, or of the rotor end caps 420,430. In some embodiments, a difference between the fan-to-end cap length 3020 and the stack length 3005 is 20.5 millimeters or less than 20 millimeters. In some embodiments, a difference between the fan-to-end cap length 3020 and the stack length 3005 is less than 19.5 millimeters, less than 21.5 millimeters, less than 22.5 millimeters, less than 23.5 millimeters, between 18.5 millimeters and 23.5 millimeters, between 20.5 millimeters and 23.5 millimeters, between 19.5 millimeters and 21.5 millimeters, or another range between 18.5 millimeters and 23.5 millimeters. This difference may be adjusted in the range, for example, by reducing the axial thickness of the bearing 520, of the fan 340, or of the rotor end caps 420,430.

In some embodiments, the bearing-to-fan length 3010 may be in a range of 27 millimeters to 60 millimeters, depending on the stack length 3005, an axial fan length of the fan 340, and a board thickness (in the axial direction) of the position sensor board assembly 540. Here, a difference between the bearing-to-fan length 3010 and a sum of the stack length 3005, the axial fan length of the fan 340, and the board thickness of the position sensor board assembly 540 is 12 millimeters or less than 12 millimeters. In some embodiments, this difference is less than 11 millimeters, less than 13 millimeters, less than 14 millimeters, less than 15 millimeters, less than 16 millimeters, less than 20 millimeters, between 10 millimeters and 12 millimeters, between 12 millimeters and 20 millimeters, between 11 millimeters and 13 millimeters, between 11 millimeters and 18 millimeters, or another range between 11 millimeters and 20 millimeters. This difference may be adjusted in the range, for example, by reducing the axial thickness of one or both of the bearings 520, 530. Thus, the configuration of the embodiments provides an axially compact motor design.

Thus, the invention provides, among other things, a brushless motor having one or more of a reduced length, a sealed air-gap, and improved wiring. Various features and advantages of the invention are set forth in the following claims.

We claim:

1. A power tool, comprising:
   a housing;
   a controller within the housing; and
   a brushless motor within the housing and controlled by the controller, the brushless motor including:
   a stator assembly including a stator core having stator laminations with an annular portion and inwardly extending stator teeth, wherein the stator assembly defines a stator envelope in an axial direction extending between axial ends of stator end caps of the stator assembly,
   a rotor assembly including a rotor core having rotor laminations and defining a central aperture that extends in the axial direction and that receives a shaft, and
   a position sensor board assembly including an annular board portion having an outer diameter that is less than an inner diameter of a first end cap of the stator end caps and including position sensors and configured to provide position information of the rotor core to the controller,
   wherein the rotor assembly and the position sensor board assembly are provided at least partially within the stator envelope.

2. The power tool of claim 1, wherein the position sensor board assembly further includes a plurality of legs extending radially outward from the annular board portion.

3. The power tool of claim 2, wherein the stator end caps include a plurality of end cap teeth, and wherein at least one leg of the plurality of legs extends through a gap formed between adjacent end cap teeth.

4. The power tool of claim 2, wherein the shaft extends through the annular board portion.

5. The power tool of claim 2, wherein one of the stator end caps includes a plurality of mounts, and wherein the plurality of legs further include holes aligned with the plurality of mounts.

6. The power tool of claim 1, wherein the position sensors are Hall sensors.

7. A power tool, comprising:
   a housing;
   a controller within the housing; and
   a brushless motor within the housing and controlled by the controller, the brushless motor comprising:
   a stator assembly including a stator core having stator laminations with an annular portion and inwardly extending stator teeth,
   a first end cap on a first side of the brushless motor, the first end cap including inwardly extending end cap teeth,
   a second end cap provided on a second side of the brushless motor,
   a rotor assembly including a rotor core having rotor laminations and defining a central aperture that receives a shaft that extends in an axial direction through the central aperture, and a fan supported by the shaft on the second side of the brushless motor, and
   a position sensor board assembly supported by the first end cap, the position sensor board assembly including an annular board portion with a plurality of legs extending radially outward from the annular board portion and the position sensor board assembly configured to provide position information of the rotor core to the controller,
   wherein the annular board portion has a first axial position along the axial direction and the inwardly extending end cap teeth have a second axial position along the axial direction, and the first axial position at least partially overlaps with the second axial position along the axial direction.

8. The power tool of claim 7, wherein the shaft extends through the annular board portion of the position sensor board assembly.

9. The power tool of claim 7, wherein at least one leg of the plurality of legs extends through a gap formed between adjacent teeth of the inwardly extending end cap teeth on the first end cap.

10. The power tool of claim 7, wherein the annular board portion has an outer diameter that is less than an inner diameter of the first end cap.

11. The power tool of claim 7, wherein a stator envelope extends in the axial direction between axial ends of the first end cap and the second end cap, and wherein the position sensor board assembly is within the stator envelope.

12. The power tool of claim 7, wherein the first end cap includes a plurality of mounts, and wherein the plurality of legs further include holes aligned with the plurality of mounts.

13. The power tool of claim 7, wherein the position sensor board assembly includes Hall sensors.

14. The power tool of claim 7, wherein the fan is integrally formed on the rotor assembly during an injection molding process.

15. A brushless direct current motor, comprising:
 a stator core having stator laminations with an annular portion and inwardly extending stator teeth;
 a stator end cap including inwardly extending end cap teeth;
 a rotor core having rotor laminations and defining a central aperture that receives an output shaft that extends in an axial direction through the central aperture; and
 a position sensor board assembly supported by the stator end cap, wherein the position sensor board assembly includes position sensors and an annular board portion with legs extending radially outward from the annular board portion,
 wherein the position sensor board assembly is configured to provide position information of the rotor core to a motor controller, and
 wherein the annular board portion has a first axial position along the axial direction and the inwardly extending end cap teeth have a second axial position along the axial direction, and the first axial position at least partially overlaps with the second axial position along the axial direction.

16. The brushless direct current motor of claim 15, wherein the legs of the position sensor board assembly are circumferentially positioned on the annular board portion to align with gaps between adjacent teeth of the inwardly extending end cap teeth.

17. The brushless direct current motor of claim 15, wherein the annular board portion has an outer diameter that is less than an inner diameter of the stator end cap.

18. The brushless direct current motor of claim 15, wherein the stator end cap is a first stator end cap and the brushless direct current motor further includes a second stator end cap defining a stator envelope in the axial direction extending between axial ends of the first and second stator end caps, and wherein the position sensor board assembly is within the stator envelope.

19. The brushless direct current motor of claim 15, wherein the stator end cap includes a plurality of mounts and the legs of the position sensor board assembly further include holes aligned with the plurality of mounts.

20. The brushless direct current motor of claim 15, wherein the position sensors are Hall sensors.

* * * * *